US012727005B2

(12) United States Patent
Matsumura et al.

(10) Patent No.: US 12,727,005 B2
(45) Date of Patent: Sep. 1, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 253 days.

(21) Appl. No.: 18/726,654

(22) PCT Filed: Jan. 7, 2022

(86) PCT No.: PCT/JP2022/000412
§ 371 (c)(1),
(2) Date: Jul. 3, 2024

(87) PCT Pub. No.: WO2023/132072
PCT Pub. Date: Jul. 13, 2023

(65) Prior Publication Data
US 2025/0089068 A1 Mar. 13, 2025

(51) Int. Cl.
*H04W 72/232* (2023.01)
*H04L 5/00* (2006.01)

(52) U.S. Cl.
CPC ......... *H04W 72/232* (2023.01); *H04L 5/0053* (2013.01)

(58) Field of Classification Search
None
See application file for complete search history.

(56) References Cited

U.S. PATENT DOCUMENTS 11,395,303 B2 * 7/2022 Yi ......................... H04L 5/0044
11,564,235 B2 * 1/2023 Sakhnini ........... H04W 72/0453
(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Brian S Roberts
(74) *Attorney, Agent, or Firm* — Osha Bergman Watanabe & Burton LLP

(57) ABSTRACT

A terminal according to one aspect of the present disclosure includes a receiving section that receives control information for mapping one or more TCI states to a codepoint of one transmission configuration indication (TCI) field and that receives one or more pieces of downlink control information (DCI) for indicating a first TCI state applicable to a plurality of types of first signals and a second TCI state applicable to a plurality of types of second signals, and a control section that applies the first TCI state to the first signals and that applies the second TCI state to the second signals, based on the control information and the codepoint of the TCI field included in the DCI. The first signal and the second signal are at least one of two physical downlink control channels (PDCCHs) linked to each other, a single frequency network (SFN) PDCCH, an SFN physical downlink shared channel (PDSCH), physical uplink shared channel (PUSCH) repetition transmission, and physical uplink control channel (PUCCH) repetition transmission. According to one aspect of the present disclosure, it is possible to appropriately perform TCI state indication.

4 Claims, 41 Drawing Sheets

(56) References Cited

U.S. PATENT DOCUMENTS

| | | | | |
|---|---|---|---|---|
| 2023/0199795 | A1* | 6/2023 | Zhu | H04L 5/0091 370/329 |
| 2024/0372602 | A1* | 11/2024 | Kang | H04B 7/06964 |

OTHER PUBLICATIONS

International Search Report issued in corresponding International Application No. PCT/JP2022/000412, mailed on Jul. 26, 2022 (3 pages).

Written Opinion issued in corresponding International Application No. PCT/JP2022/000412, mailed on Jul. 26, 2022 (3 pages).

Xiaomi; "Enhancements on multi-beam operation"; 3GPP TSG RAN WG1 #107-e, R1-2111540; e-Meeting; Nov. 11-19, 2021 (8 pages).

* cited by examiner

RRH#1
$-f_D$
RRH#2
$-f_D$
MOVING OBJECT (INCLUDING UE THEREIN)
MOVEMENT PATH

RRH#1
$+f_D$
$-f_D$
RRH#2
$+f_D$
$-f_D$
MOVING OBJECT (INCLUDING UE THEREIN)
MOVEMENT PATH scheme 0 scheme 1 scheme 2

BBU
BBU
TRP#0
TRP#1
TRP#2
TRP#3
TRP#4
TRP#5
TRP#6
TRP#7
TRP#8
TRP#9
TRP#10
TRP#11
TRP#12
TRP#13
TRP#14
TRP#15
RRH#0
RRH#1
RRH#2
RRH#3
RRH#4
RRH#5
RRH#6
RRH#7
UE
MOVEMENT PATH
MOVING OBJECT (INCLUDING UE THEREIN)

TRS1-1
TRS1-2
TRS1-3
TRS1-4
TIME
DOPPLER SHIFTS ARE UNEQUAL
TRS2-1
TRS2-2
TRS2-3
TRS2-4
TIME

FIG. 4A

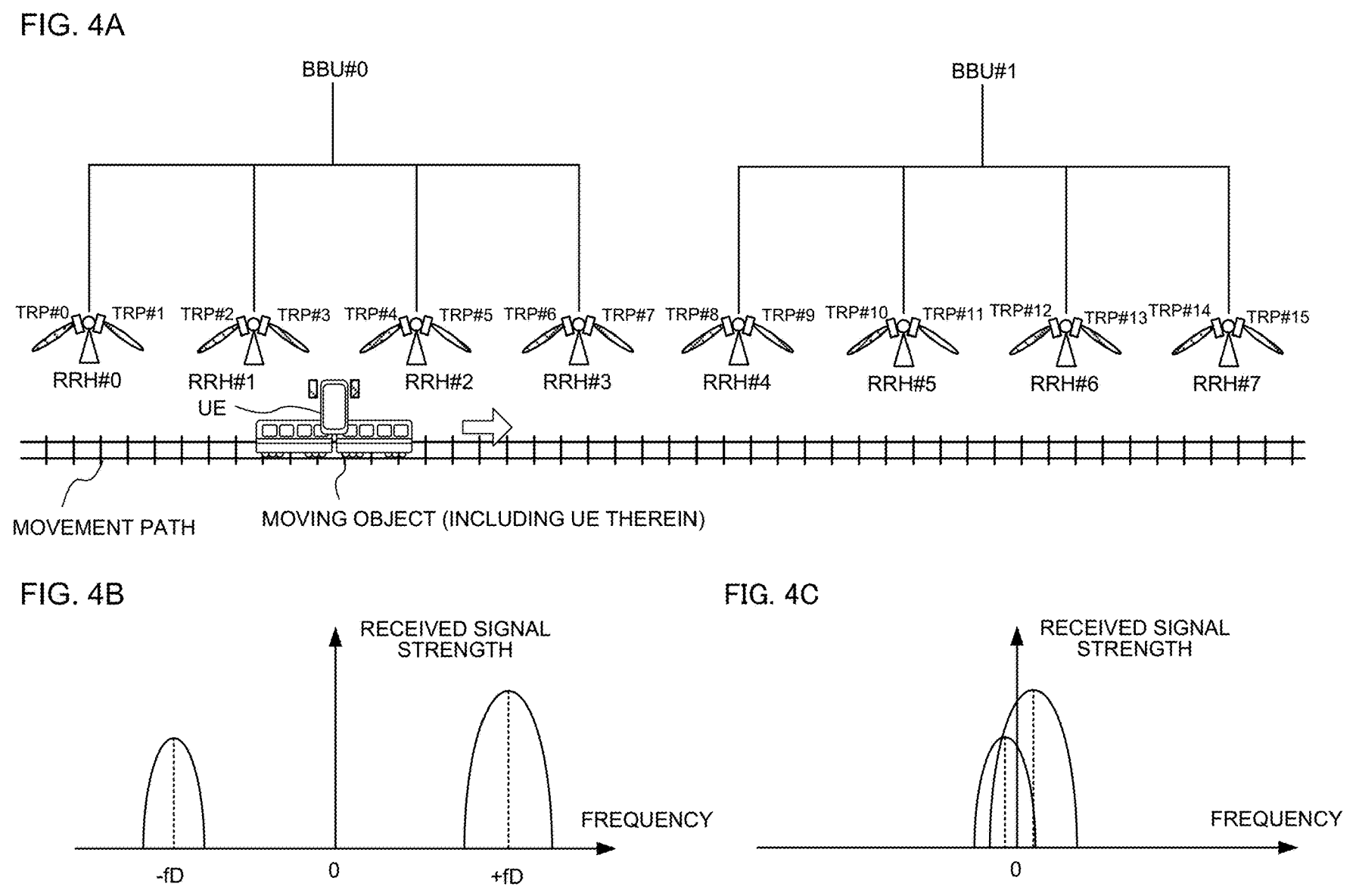

BBU#0
BBU#1
TRP#0 TRP#1 RRH#0
TRP#2 TRP#3 RRH#1
TRP#4 TRP#5 RRH#2
TRP#6 TRP#7 RRH#3
TRP#8 TRP#9 RRH#4
TRP#10 TRP#11 RRH#5
TRP#12 TRP#13 RRH#6
TRP#14 TRP#15 RRH#7
UE
MOVING OBJECT (INCLUDING UE THEREIN)
MOVEMENT PATH

FIG. 4B

RECEIVED SIGNAL STRENGTH
FREQUENCY
-fD
0
+fD

FIG. 4C

RECEIVED SIGNAL STRENGTH
FREQUENCY
0

FIG. 6A configuration for DL&UL (RRC)

SSB/ CSI-RS/ SRS activation for DL&UL (MAC CE)

active TCI pool for DL&UL joint indication indication for DL&UL (DCI)

Figures 6A, 6B:
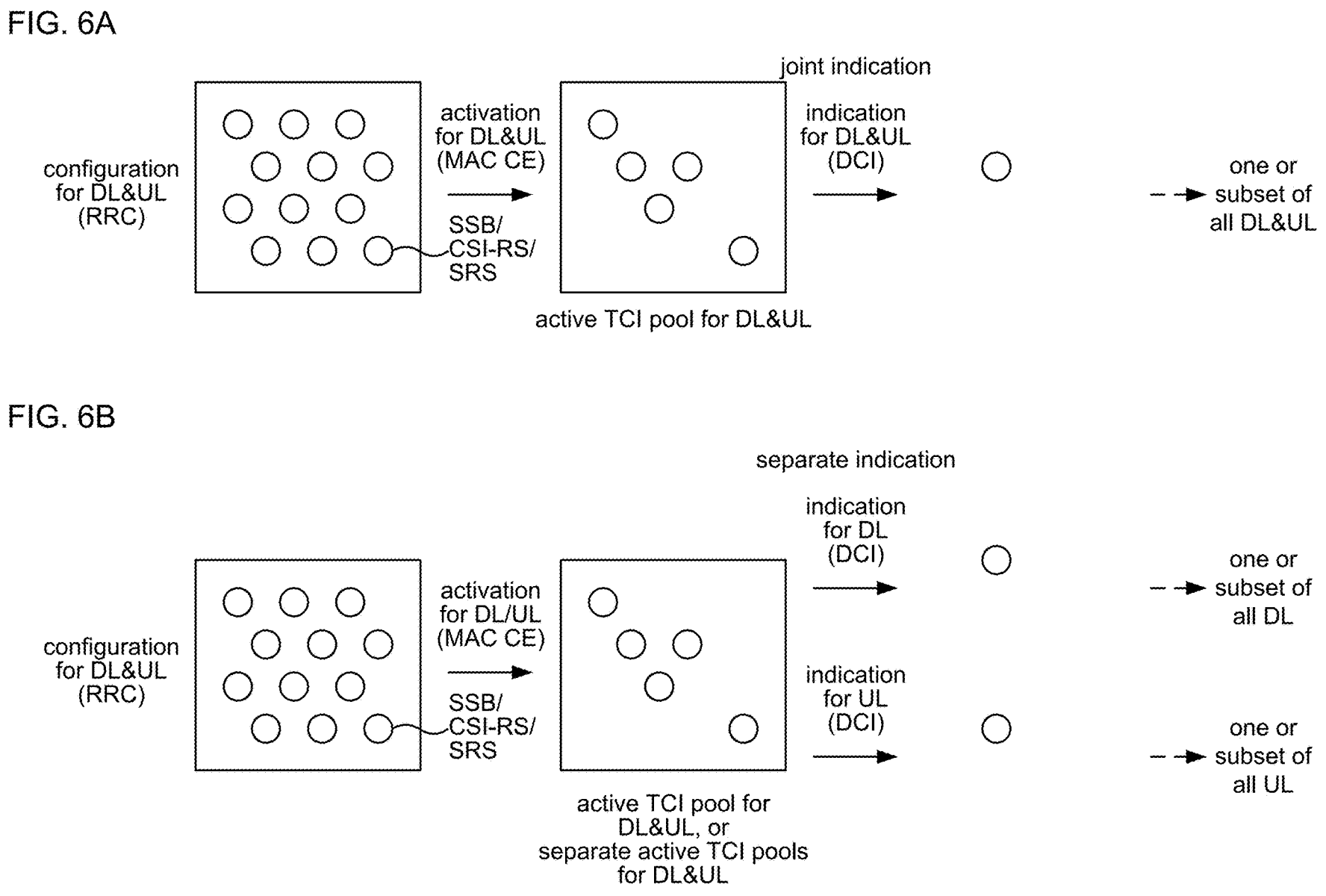

one or subset of all DL&UL

FIG. 6B configuration for DL&UL (RRC)

SSB/ CSI-RS/ SRS activation for DL/UL (MAC CE)

active TCI pool for DL&UL, or separate active TCI pools for DL&UL separate indication indication for DL (DCI)

one or subset of all DL indication for UL (DCI)

one or subset of all UL

FIG. 10A

| TCI field codepoint | DL/UL joint TCI state |
|---|---|
| 000 | TCI state #0 |
| 001 | TCI state #1 |
| 010 | TCI state #2 |
| 011 | TCI state #3 |
| 100 | TCI state #4 |
| 101 | TCI state #5 |
| 110 | TCI state #6 |
| 111 | TCI state #7 |

FIG. 10B

| TCI field codepoint | DL TCI state | UL TCI state |
|---|---|---|
| 000 | TCI state #0 | - |
| 001 | TCI state #1 | - |
| 010 | - | TCI state #2 |
| 011 | - | TCI state #3 |
| 100 | TCI state #4 | TCI state #5 |
| 101 | TCI state #6 | TCI state #7 |
| 110 | TCI state #8 | TCI state #9 |
| 111 | TCI state #10 | TCI state #11 |

BEAM INDICATION
FIRST TCI STATE (FIRST TRP)
SECOND TCI STATE (SECOND TRP)

BEAM INDICATION #1
FIRST TCI STATE (FIRST TRP, FIRST CORESET)
BEAM INDICATION #2
SECOND TCI STATE (SECOND TRP, SECOND CORESET)

| TCI field codepoint | 1st DL/UL joint TCI state | 2nd DL/UL joint TCI state |
|---|---|---|
| 000 | TCI state #0 | TCI state #1 |
| 001 | TCI state #2 | TCI state #3 |
| 010 | TCI state #4 | TCI state #5 |
| 011 | TCI state #6 | TCI state #7 |
| 100 | TCI state #1 | TCI state #0 |
| 101 | TCI state #3 | TCI state #2 |
| 110 | TCI state #5 | TCI state #4 |
| 111 | TCI state #7 | TCI state #6 |

RRC configured DL/UL TCI pool
TCI state
MAC CE
activate TCI states
DL/UL TCI state
DCI
1st DL/UL TCI state
2nd DL/UL TCI state RRC configured DL/UL TCI pool
TCI state
MAC CE
activate TCI states
DL TCI state
UL TCI state
DCI
1st DL TCI state
2nd DL TCI state
1st UL TCI state
2nd UL TCI state

| TCI field codepoint | 1st DL/UL joint TCI state | 2nd DL/UL joint TCI state |
|---|---|---|
| 000 | TCI state #0 | TCI state #1 |
| 001 | TCI state #2 | TCI state #3 |
| 010 | TCI state #4 | TCI state #5 |
| 011 | TCI state #6 | TCI state #7 |
| 100 | TCI state #1 | TCI state #0 |
| 101 | TCI state #3 | TCI state #2 |
| 110 | TCI state #5 | TCI state #4 |
| 111 | TCI state #7 | TCI state #6 |

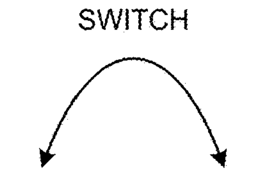

| TCI field codepoint | 1st TCI state | | 2nd TCI state | |
|---|---|---|---|---|
| | DL TCI state | UL TCI state | DL TCI state | UL TCI state |
| 000 | TCI state #0 | - | TCI state #1 | - |
| 001 | TCI state #1 | - | - | TCI state #2 |
| 010 | - | TCI state #2 | TCI state #1 | - |
| 011 | - | TCI state #3 | - | TCI state #0 |
| 100 | TCI state #4 | TCI state #5 | TCI state #4 | TCI state #5 |
| 101 | TCI state #6 | TCI state #7 | TCI state #6 | TCI state #7 |
| 110 | TCI state #8 | TCI state #9 | TCI state #4 | TCI state #5 |
| 111 | TCI state #10 | TCI state #11 | TCI state #6 | TCI state #7 |

FIG. 15

| TCI field codepoint | 1st TCI state | 2nd TCI state | |
|---|---|---|---|
| | DL/UL joint TCI state | DL TCI state | UL TCI state |
| 000 | TCI state #0 | TCI state #1 | - |
| 001 | TCI state #2 | - | TCI state #2 |
| 010 | TCI state #4 | TCI state #1 | - |
| 011 | TCI state #6 | - | TCI state #0 |
| 100 | TCI state #0 | TCI state #4 | TCI state #5 |
| 101 | TCI state #2 | TCI state #6 | TCI state #7 |
| 110 | TCI state #4 | TCI state #4 | TCI state #5 |
| 111 | TCI state #6 | TCI state #6 | TCI state #7 |

FIG. 16

| TCI field codepoint | 1st TCI state | | 2nd TCI state | |
|---|---|---|---|---|
| | DL | UL | DL | UL |
| 000 | DL TCI state #0 | - | DL TCI state #1 | - |
| 001 | DL TCI state #1 | UL TCI state #2 | - | UL TCI state #3 |
| 010 | DL TCI state #0 | - | DL UL TCI state #4 | |
| 011 | DL UL TCI state #1 | | - | UL TCI state #2 |
| 100 | DL UL TCI state #4 | | DL TCI state #4 | UL TCI state #5 |
| 101 | DL UL TCI state #6 | | UL TCI state #6 | UL TCI state #7 |
| 110 | DL UL TCI state #8 | | DL UL TCI state #4 | |
| 111 | DL UL TCI state #10 | | DL UL TCI state #6 | |

FIG. 17

PDCCH#1-1
(BEAM INDICATION DCI)
UE
PDSCH#1
PDCCH#2-1
PDCCH#2-2
PDSCH#2
TRP#1
TRP#2

PDCCH#1-1
(BEAM INDICATION DCI)
UE
PDSCH#1
PDCCH#2-1
PDSCH#2
TRP#1
TRP#2

FIG. 19A

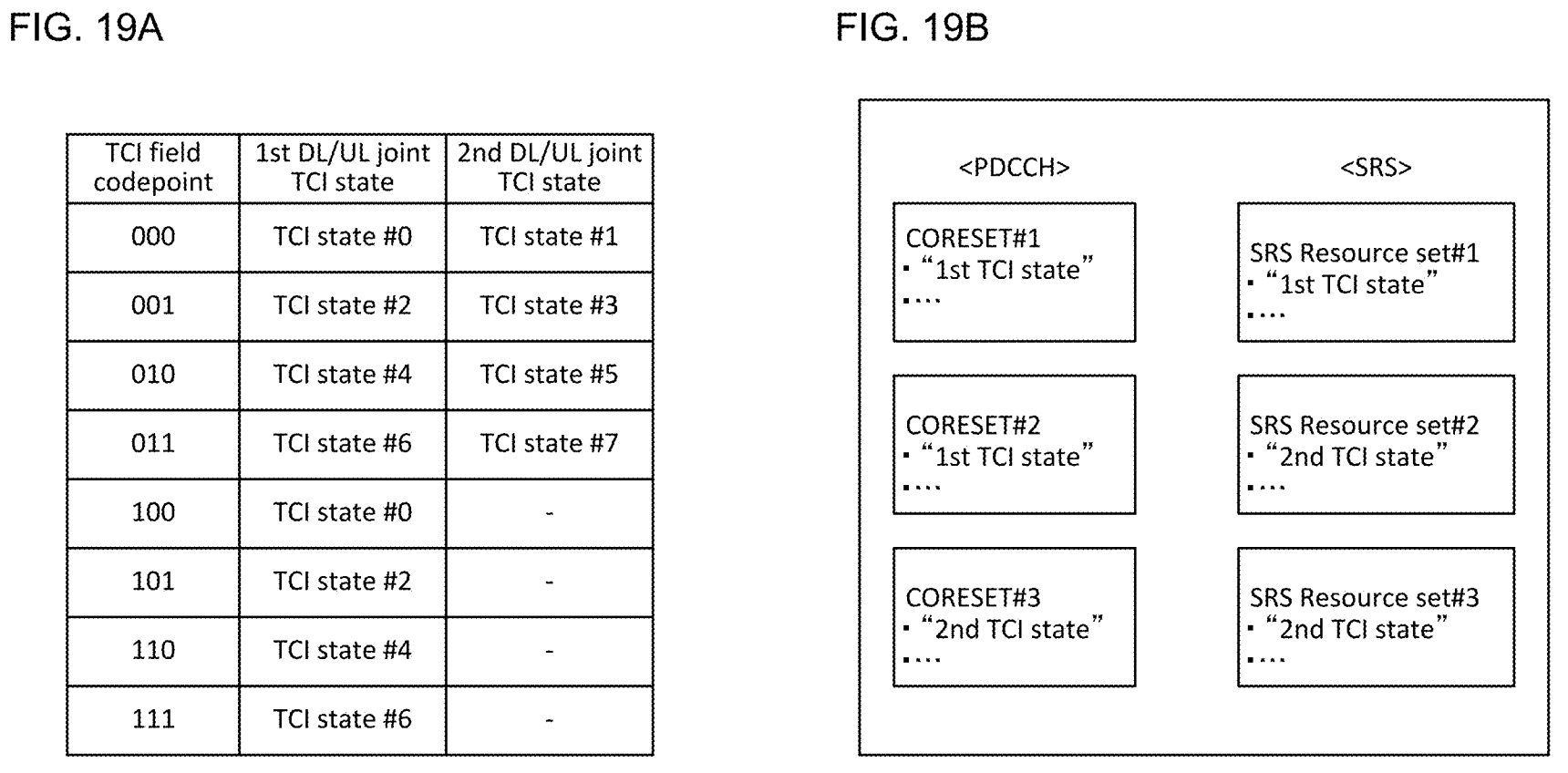

| TCI field codepoint | 1st DL/UL joint TCI state | 2nd DL/UL joint TCI state |
|---|---|---|
| 000 | TCI state #0 | TCI state #1 |
| 001 | TCI state #2 | TCI state #3 |
| 010 | TCI state #4 | TCI state #5 |
| 011 | TCI state #6 | TCI state #7 |
| 100 | TCI state #0 | - |
| 101 | TCI state #2 | - |
| 110 | TCI state #4 | - |
| 111 | TCI state #6 | - |

FIG. 19B

| TCI field codepoint | 1st DL/UL joint TCI state | 2nd DL/UL joint TCI state |
|---|---|---|
| 000 | TCI state #0 | TCI state #1 |
| 001 | TCI state #2 | TCI state #3 |
| 010 | TCI state #4 | TCI state #5 |
| 011 | TCI state #6 | TCI state #7 |
| 100 | TCI state #0 | - |
| 101 | TCI state #2 | - |
| 110 | TCI state #4 | - |
| 111 | TCI state #6 | - |

PUSCH-Config
- "1st TCI state", "2nd TCI state"
- ...

| DCI field | Indication |
|---|---|
| 0 | 1st TCI state |
| 1 | 2nd TCI state |

| TCI field codepoint | 1st DL/UL joint TCI state | 2nd DL/UL joint TCI state |
|---|---|---|
| 000 | TCI state #0 | TCI state #1 |
| 001 | TCI state #2 | TCI state #3 |
| 010 | TCI state #4 | TCI state #5 |
| 011 | TCI state #6 | TCI state #7 |
| 100 | TCI state #0 | - |
| 101 | TCI state #2 | - |
| 110 | TCI state #4 | - |
| 111 | TCI state #6 | - |

PUCCH-Config
- PUCCH resource (resource group) #1: "1st TCI state"
- PUCCH resource (resource group) #2: "2nd TCI state"
- ....

For TRP#1
RRC
configured
DL/UL TCI pool
TCI state
MAC CE
activate TCI
states

For TRP#2
RRC
configured
DL/UL TCI pool
TCI state
MAC CE
activate TCI
states

FIG. 26A

For TRP#1

| TCI field codepoint | DL/UL joint TCI state |
|---|---|
| 000 | TCI state #0 |
| 001 | TCI state #1 |
| 010 | TCI state #2 |
| 011 | TCI state #3 |
| 100 | TCI state #4 |
| 101 | TCI state #5 |
| 110 | TCI state #6 |
| 111 | TCI state #7 |

FIG. 26B

For TRP#2

| TCI field codepoint | DL/UL joint TCI state |
|---|---|
| 000 | TCI state #8 |
| 001 | TCI state #9 |
| 010 | TCI state #10 |
| 011 | TCI state #11 |
| 100 | TCI state #12 |
| 101 | TCI state #13 |
| 110 | TCI state #14 |
| 111 | TCI state #15 |

FIG. 30

| | | | | | |
|---|---|---|---|---|---|
| R | Serving Cell ID | | | BWP ID | Octet 1 |
| $C_3$ | | $C_2$ | $C_1$ | $C_0$ | Octet 2 |
| $C_7$ | | $C_6$ | $C_5$ | $C_4$ | Octet 3 |
| R | TCI state $ID_{0,1}$ | | | | Octet 4 |
| R | TCI state $ID_{0,2}$ | | | | Octet 5 |
| R | TCI state $ID_{0,3}$ | | | | Octet 6 (Optional) |
| R | TCI state $ID_{0,4}$ | | | | Octet 7 (Optional) |
| ⋮ | | | | | |
| R | TCI state $ID_{N,1}$ | | | | Octet M−3 |
| R | TCI state $ID_{N,2}$ | | | | Octet M−2 |
| R | TCI state $ID_{N,3}$ | | | | Octet M−1 (Optional) |
| R | TCI state $ID_{N,4}$ | | | | Octet M (Optional) |

FIG. 34A

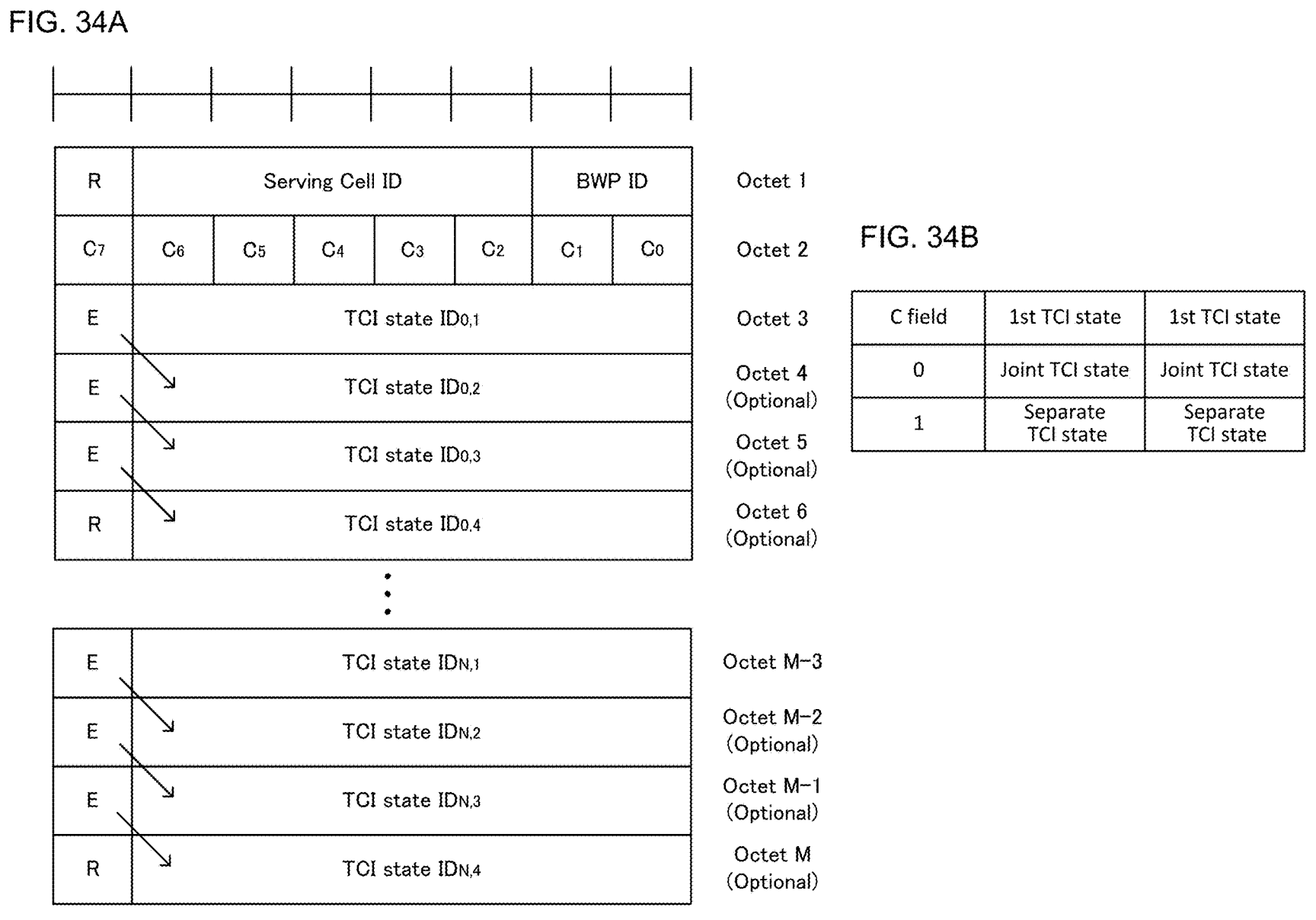

| | | | | | | | | |
|---|---|---|---|---|---|---|---|---|
| R | Serving Cell ID | | | | | BWP ID | | Octet 1 |
| $C_7$ | $C_6$ | $C_5$ | $C_4$ | $C_3$ | $C_2$ | $C_1$ | $C_0$ | Octet 2 |
| E | TCI state $ID_{0,1}$ | | | | | | | Octet 3 |
| E | TCI state $ID_{0,2}$ | | | | | | | Octet 4 (Optional) |
| E | TCI state $ID_{0,3}$ | | | | | | | Octet 5 (Optional) |
| R | TCI state $ID_{0,4}$ | | | | | | | Octet 6 (Optional) |

⋮

| | | |
|---|---|---|
| E | TCI state $ID_{N,1}$ | Octet M−3 |
| E | TCI state $ID_{N,2}$ | Octet M−2 (Optional) |
| E | TCI state $ID_{N,3}$ | Octet M−1 (Optional) |
| R | TCI state $ID_{N,4}$ | Octet M (Optional) |

FIG. 34B

| C field | 1st TCI state | 1st TCI state |
|---|---|---|
| 0 | Joint TCI state | Joint TCI state |
| 1 | Separate TCI state | Separate TCI state |

| C field | 1st TCI state | 1st TCI state |
| --- | --- | --- |
| 00 | Joint TCI state | Joint TCI state |
| 01 | Joint TCI state | Separate TCI state |
| 10 | Separate TCI state | Joint TCI state |
| 11 | Separate TCI state | Separate TCI state |

FIG. 36

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is studied that a user terminal (terminal, User Equipment (UE)) controls transmission/reception processing, based on information related to quasi-co-location (QCL) (QCL assumption/Transmission Configuration Indication (TCI) state/spatial relation).

It is studied that a configured/activated/indicated TCI state is applied to a plurality of types of signals (channels/RSs). However, there is a case where a TCI state indication method is indefinite. Unless the TCI state indication method is definite, degradation in communication quality, reduction in throughput, and the like may occur.

Thus, an object of the present disclosure is to provide a terminal, a radio communication method, and a base station that can appropriately perform TCI state indication.

Solution to Problem

A terminal according to one aspect of the present disclosure includes a receiving section that receives control information for mapping one or more TCI states to a codepoint of one transmission configuration indication (TCI) field and that receives one or more pieces of downlink control information (DCI) for indicating a first TCI state applicable to a plurality of types of first signals and a second TCI state applicable to a plurality of types of second signals, and a control section that applies the first TCI state to the first signals and that applies the second TCI state to the second signals, based on the control information and the codepoint of the TCI field included in the DCI. The first signal and the second signal are at least one of two physical downlink control channels (PDCCHs) linked to each other, a single frequency network (SFN) PDCCH, an SFN physical downlink shared channel (PDSCH), physical uplink shared channel (PUSCH) repetition transmission, and physical uplink control channel (PUCCH) repetition transmission.

Advantageous Effects of Invention

According to one aspect of the present disclosure, it is possible to appropriately perform TCI state indication.

BRIEF DESCRIPTION OF DRAWINGS

FIGS. 4A to 4C are diagrams to show an example of a Doppler pre-compensation scheme.

FIGS. 6A and 6B are diagrams to show examples of a common beam.

FIGS. 10A and 10B are diagrams to show examples of indication of a joint/separate TCI state.

FIGS. 13A and 13B are diagrams to show examples of a TCI field included in DCI.

FIG. 15 is a diagram to show an example of switching of TCI state-related correspondence.

FIG. 16 is a diagram to show an example of TCI state-related correspondence according to a first embodiment.

FIG. 17 is a diagram to show another example of the TCI state-related correspondence according to the first embodiment.

FIGS. 19A and 19B are diagrams to show examples of a method for applying an indicated TCI state.

FIGS. 26A and 26B are diagrams to show TCI state-related correspondences according to the fourth embodiment.

FIG. 30 is a diagram to show an example of a structure of a MAC CE according to Embodiment 6-2-1.

FIGS. 34A and 34B are diagrams to show examples of a structure of a MAC CE according to Embodiment 6-2-7.

FIG. 36 is a diagram to show another example of the structure of the MAC CE according to Embodiment 6-2-8.

Figures 1A, 1B:
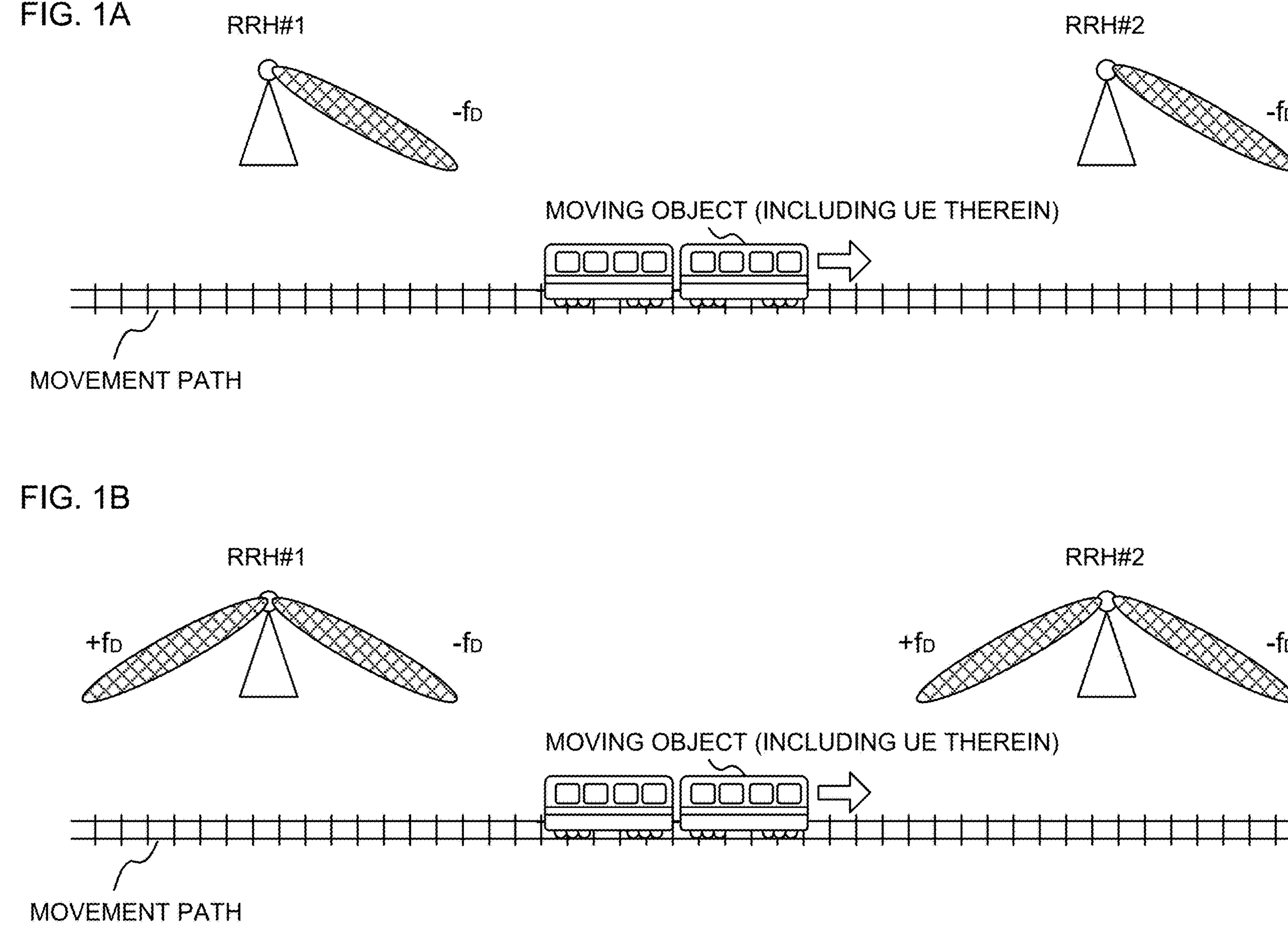
FIGS. 1A and 1B are diagrams to show examples of communication between a moving object and a transmission point (for example, an RRH).

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (expressed as a signal/channel) in a UE, based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have a different parameter(s) (or a parameter set(s)) that can be assumed to be the same, and such parameters (which may be referred to as QCL parameters) are described below:

- QCL type A (QCL-A): Doppler shift, Doppler spread, average delay, and delay spread
- QCL type B (QCL-B): Doppler shift and Doppler spread
- QCL type C (QCL-C): Doppler shift and average delay
- QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a certain channel/signal, and this RS may be referred to as a QCL source of QCL type X in the TCI state.

For the PDCCH and the PDSCH, a QCL type A RS may always be configured, and a QCL type D RS may be configured additionally. It is difficult to estimate a Doppler shift, a delay, and the like by using DMRS one-shot reception, and thus the QCL type A RS is used for improvement in channel estimation accuracy. The QCL type D RS is used for receive beam determination in DMRS reception.

For example, TRS 1-1, TRS 1-2, TRS 1-3, and TRS 1-4 are transmitted, and TRS 1-1 is notified as a QCL type C/D RS by a TCI state of the PDSCH. The TCI state is notified, thereby allowing the UE to use, for DMRS reception/channel estimation for the PDSCH, information obtained from a result of past periodic reception/measurement of TRS 1-1. In this case, a QCL source for the PDSCH is TRS 1-1, and a QCL target is the DMRS for the PDSCH.

(Default TCI State/Default Spatial Relation/Default PL-RS)

In Rel. 16, the PDSCH may be scheduled by DCI having a TCI field. A TCI state for the PDSCH is indicated by the TCI field. The TCI field in DCI format 1-1 is 3 bits, and the TCI field in DCI format 1-2 is up to 3 bits.

In an RRC connected mode, if a first TCI-in-DCI information element (higher layer parameter "tci-PresentInDCI") is set to "enabled" for a CORESET for scheduling the PDSCH, the UE assumes that the TCI field is present in DCI format 1_1 for a PDCCH transmitted in the CORESET.

If the UE is configured with a second TCI-in-DCI information element (higher layer parameter "tci-PresentInDCI-1-2") for a CORESET for scheduling the PDSCH, the UE assumes that the TCI field with a DCI field size indicated by the second TCI-in-DCI information element is present in DCI format 1_2 for a PDSCH transmitted in the CORESET.

In Rel. 16, the PDSCH may be scheduled by DCI not having the TCI field. A DCI format of the DCI may be DCI format 1_0 or DCI format 1_1/1_2 in a case where an TCI-in-DCI information element (higher layer parameter "tci-PresentInDCI" or "tci-PresentInDCI-1-2") is not configured (enabled). When the PDSCH is scheduled by the DCI not having the TCI field and if time offset between reception of DL DCI (DCI for scheduling a PDSCH (scheduling DCI)) and a corresponding PDSCH (PDSCH scheduled by the DCI) is greater than or equal to a threshold value (timeDurationForQCL), the UE assumes that a TCI state or QCL assumption for the PDSCH is the same as a TCI state or QCL assumption (default TCI state) for the CORESET (for example, the scheduling DCI).

In an RRC connected mode, in both a case where an TCI-in-DCI information element (higher layer parameters "tci-PresentInDCI" and "tci-PresentInDCI-1-2") is set to "enabled" and a case where the TCI-in-DCI information element is not configured, when time offset between reception of DL DCI (DCI for scheduling a PDSCH) and a corresponding PDSCH (PDSCH scheduled by the DCI) is less than a threshold value (timeDurationForQCL) (application condition, first condition), a TCI state (default TCI state) for the PDSCH may, in a case of non-cross carrier scheduling, be a TCI state with the lowest CORESET ID in the latest slot in an active DL BWP of that CC (for a specific UL signal). Otherwise, the TCI state (default TCI state) of the PDSCH may be the TCI state of the lowest TCI state ID of the PDSCHs in the active DL BWP in a scheduled CC.

In Rel. 15, separate MAC CEs, specifically, a MAC CE for activation/deactivation of a PUCCH spatial relation and a MAC CE for activation/deactivation of an SRS spatial relation, are needed. The PUSCH spatial relation follows the SRS spatial relation.

In Rel. 16, at least one of a MAC CE for activation/deactivation of a PUCCH spatial relation and a MAC CE for activation/deactivation of an SRS spatial relation need not necessarily be used.

If neither a spatial relation nor a PL-RS for a PUCCH is configured in FR2 (application condition, second condition), default assumptions of a spatial relation and a PL-RS (default spatial relation and default PL-RS) are used for the PUCCH. If neither a spatial relation nor a PL-RS for an SRS (SRS resource for the SRS or SRS resource corresponding to an SRI in DCI format 0_1 for scheduling a PUSCH) is configured in FR2 (application condition, second condition), the default assumptions of a spatial relation and a PL-RS (default spatial relation and default PL-RS) are used for the PUSCH scheduled by DCI format 0_1 and the SRS.

If a CORESET is configured in the active DL BWP in the CC (application condition), the default spatial relation and the default PL-RS may be the TCI state or the QCL assumption of the CORESET having the lowest CORESET ID in the active DL BWP. If no CORESET is configured in the active DL BWP in the CC, the default spatial relation and the default PL-RS may be the active TCI state having the lowest ID of the PDSCHs in the active DL BWP.

In Rel. 15, the spatial relation of a PUSCH scheduled in DCI format 0_0 follows the spatial relation of the PUCCH resource having the lowest PUCCH resource ID among active spatial relations of the PUCCHs in the same CC. Even when no PUCCH is transmitted in an SCell, a network need update all the PUCCH spatial relations in the SCell.

In Rel. 16, no PUCCH configuration for a PUSCH scheduled by DCI format 0_0 is needed. When no active PUCCH spatial relation is present or no PUCCH resource is present for a PUSCH scheduled by DCI format 0_0 in the active UL BWP in the CC (application condition, second condition), the default spatial relation and the default PL-RS are used for the PUSCH.

An application condition of a default spatial relation/default PL-RS for SRS may include an enable default beam pathloss for SRS information element (higher layer parameter enableDefaultBeamPlForSRS) is set as enabled. An application condition of a default spatial relation/default PL-RS for PUCCH may include an enable default beam pathloss for PUCCH information element (higher layer parameter enableDefaultBeamPlForPUCCH) is set as enabled. An application condition of a default spatial relation/default PL-RS for PUSCH scheduled by DCI format 0_0 may include an enable default beam pathloss for PUSCH scheduled by DCI format 0_0 information element (higher layer parameter enableDefaultBeamPlForPUSCH0_0) is set as enabled.

In Rel. 16, when an RRC parameter (parameter for enabling a default beam PL for PUCCH (enableDefaultBeamPL-ForPUCCH), parameter for enabling a default beam PL for PUSCH (enableDefaultBeamPL-ForPUSCH0_0), or parameter for enabling a default beam PL for SRS (enableDefaultBeamPL-ForSRS)) is configured for the UE, and a spatial relation or a PL-RS is not configured for the UE, the UE applies a default spatial relation/PL-RS.

The above threshold value may be referred to as a time length (time duration) for QCL, "timeDurationForQCL," "Threshold," "Threshold for offset between a DCI indicating a TCI state and a PDSCH scheduled by the DCI," "Threshold-Sched-Offset," "beamSwitchTiming," a schedule offset threshold value, a scheduling offset threshold value, or the like. The above threshold value may be reported by the UE as a UE capability (for each subcarrier spacing).

When offset (scheduling offset) between reception of DL DCI and a PDSCH corresponding to the DL DCI is less than a threshold value "timeDurationForQCL," at least one TCI state configured for a serving cell with a scheduled PDSCH includes "QCL type D," the UE is configured with an information element for enabling 2 default TCIs (enableTwoDefaultTCIStates-r16), and at least one TCI codepoint (codepoint of a TCI field in the DL DCI) indicates two TCI states, the UE assumes that a DMRS port for the PDSCH or PDSCH transmission occasion in the serving cell is QCLed (quasi co-located) with an RS related to a QCL parameter associated with two TCI states corresponding to the lowest codepoint of TCI codepoints including two different TCI states (2 default QCL assumption determination rule). The information element for enabling 2 default TCIs indicates that Rel-16 operation with two default TCI states for a PDSCH in a case where at least one TCI codepoint is mapped to two TCI states is enabled.

As a default TCI state of a PDSCH in Rel. 15/16, specifications of a default TCI state for single TRP, a default TCI state for multi-DCI-based multi-TRP, and a default TCI state for single DCI-based multi-TRP are drafted.

As a default TCI state of an aperiodic CSI-RS (A (aperiodic)-CSI-RS) in Rel. 15/16, specifications of a default TCI state for single TRP, a default TCI state for multi-DCI-based multi-TRP, and a default TCI state for single DCI-based multi-TRP are drafted.

In Rel. 15/16, specifications of default spatial relations and default PL-RSs for respective ones of PUSCH/PUCCH/SRS are drafted.

(Multi-TRP)

For NR, it is studied that one or a plurality of transmission/reception points (TRPs) (multi-TRP (multi TRP (MTRP))) perform DL transmission to a UE by using one or a plurality of panels (multi-panel). It is also studied that the UE performs UL transmission to the one or plurality of TRPs by using one or a plurality of panels.

Note that the plurality of TRPs may correspond to the same cell identifier (ID) or may correspond to different cell IDs. The cell ID may be a physical cell ID or a virtual cell ID.

The multi-TRP (for example, TRPs #1 and #2) may be connected via ideal/non-ideal backhaul to exchange information, data, and the like. Each TRP of the multi-TRP may transmit a different codeword (Code Word (CW)) and a different layer. As one mode of multi-TRP transmission, non-coherent joint transmission (NCJT) may be employed.

In NCJT, for example, TRP #1 performs modulation mapping on a first codeword, performs layer mapping, and transmits a first PDSCH in layers of a first number (for example, two layers) by using first precoding. TRP #2 performs modulation mapping on a second codeword, performs layer mapping, and transmits a second PDSCH in layers of a second number (for example, two layers) by using second precoding.

Note that a plurality of PDSCHs (multi-PDSCH) transmitted by NCJT may be defined to partially or entirely overlap in terms of at least one of the time and frequency domains. In other words, the first PDSCH from a first TRP and the second PDSCH from a second TRP may overlap in terms of at least one of the time and frequency resources.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a certain QCL type (for example, QCL type D).

A plurality of PDSCHs (which may be referred to as multi-PDSCH (multiple PDSCHs)) from the multi-TRP may be scheduled by using one piece of DCI (single DCI, single PDCCH) (single master mode, multi-TRP based on single DCI (single-DCI based multi-TRP)).

The plurality of PDSCHs from the multi-TRP may be separately scheduled by using a plurality of pieces of DCI (multi-DCI, multi-PDCCH (multiple PDCCHs)) (multi-master mode, multi-TRP based on multi-DCI (multi-DCI based multi-TRP)).

For URLLC for multi-TRP, it is studied to support PDSCH (transport block (TB) or codeword (CW)) repetition over multi-TRP. It is studied to support a scheme of repetition over multi-TRP in the frequency domain, the layer (space) domain, or the time domain (URLLC schemes, for example, schemes 1, 2a, **2*b*, 3, and 4). In scheme 1, multi-PDSCH from multi-TRP is space division multiplexed (SDMed). In schemes 2a and 2*b***, PDSCHs from multi-TRP are frequency division multiplexed (FDMed). In scheme 2a, a redundancy version (RV) is the same for the multi-TRP. In scheme 2b, an RV may be the same or may be different for the multi-TRP. In schemes 3 and 4, multi-PDSCH from multi-TRP is time division multiplexed (TDMed). In scheme 3, multi-PDSCH from multi-TRP is transmitted in one slot. In scheme 4, multi-PDSCH from multi-TRP is transmitted in different slots.

According to such a multi-TRP scenario, more flexible transmission control using a channel with high quality is possible.

To support intra-cell (with the same cell ID) and inter-cell (with different cell IDs) multi-TRP transmission based on a plurality of PDCCHs, one control resource set (CORESET) in PDCCH configuration information (PDCCH-Config) may correspond to one TRP in RRC configuration information for linking a plurality of pairs of a PDCCH and a PDSCH with a plurality of TRPs.

When at least one of conditions 1 and 2 below is satisfied, the UE may determine that it is multi-TRP based on multi-DCI. In this case, a TRP may be interpreted as a CORESET pool index.

{Condition 1}

One CORESET pool index is configured.

{Condition 2}

Two different values (for example 0 and 1) of a CORESET pool index are configured.

When the following condition is satisfied, the UE may determine that it is multi-TRP based on single DCI. In this case, two TRPs may be interpreted as two TCI states indicated by a MAC CE/DCI.

{Condition}

To indicate one or two TCI states for one codepoint of a TCI field in DCI, an "enhanced TCI states activation/deactivation for UE-specific PDSCH MAC CE" is used.

DCI for common beam indication may be a UE-specific DCI format (for example, DL DCI format (for example, 1_1, 1_2)), may be a UL DCI format (for example, 0_1, 0_2), or may be a UE-group common DCI format.

(Multi-TRP PDCCH)

For reliability of a multi-TRP PDCCH based on a non-single frequency network (SFN), study 1 to study 3 below are under study.

{Study 1} Coding/rate matching is based on one repetition, and the same code bit is repeated in another repetition.

{Study 2} Respective repetitions have the same number of control channel elements (CCEs) and the same code bit, and correspond to the same DCI payload.

{Study 3} Two or more PDCCH candidates are explicitly linked to each other. The UE recognizes the link before decoding.

Choice 1-2, choice 1-3, choice 2, and choice 3 below for PDCCH repetition are under study.

{Choice 1-2}

Two sets of PDCCH candidates (in a given search space (SS) set) are associated with two respective TCI states of a CORESET. Here, the same CORESET, the same SS set, and PDCCH repetition in different monitoring occasions are used.

{Choice 1-3}

Two sets of PDCCH candidates are associated with two respective SS sets. Both of the SS sets are associated with a CORESET, and each SS set is associated with only one TCI state of the CORESET. Here, the same CORESET and two SS sets are used.

{Choice 2}

One SS set is associated with two different CORESETs.

{Choice 3}

Two SS sets are associated with two respective CORESETs.

Thus, it is studied that two PDCCH candidates in two SS sets for PDCCH repetition are supported and the two SS sets are explicitly linked to each other.

(SFN PDCCH)

With respect to a PDCCH/CORESET defined in Rel. 15, one TCI state without a CORESET pool index (CORESETPoolIndex) (which may be referred to as TRP information (TRP Info)) is configured for one CORESET.

With respect to PDCCH/CORESET enhancement defined in Rel. 16, a CORESET pool index is configured for each CORESET in multi-DCI based multi-TRP.

For Rel. 17 (or later versions), enhancement 1 and enhancement 2 below related to a PDCCH/CORESET are under study.

In a case where a plurality of antennas (small antennas, transmission/reception points) having the same cell ID form a single frequency network (SFN), up to two TCI states can be configured/activated for one CORESET by using higher layer signaling (RRC signaling/MAC CE) (enhancement 1). The SFN contributes to at least one of operation and reliability enhancement of an HST (high speed train).

In PDCCH repetition transmission (which may be simply referred to as “repetition”), two PDCCH candidates in two search space sets are linked to each other, and each search space set is associated with a corresponding CORESET (enhancement 2). The two search space sets may be associated with the same or different CORESETs. One (up to one) TCI state can be configured/activated for one CORESET by using higher layer signaling (RRC signaling/MAC CE).

If the two search space sets are associated with different CORESETs having different TCI states, the transmission may mean multi-TRP repetition transmission. If the two search space sets are associated with the same CORESET (CORESETs with the same TCI state), the transmission may mean single-TRP repetition transmission.

(HST)

In LTE, arrangement in a tunnel for an HST (high speed train) is difficult. A large antenna performs transmission to the outside/inside of the tunnel. For example, transmission power of the large antenna is about 1 to 5 W. For handover, it is important to perform transmission to the outside of the tunnel before the UE enters the tunnel. For example, transmission power of a small antenna is about 250 mW. A plurality of small antennas (transmission/reception points) having the same cell ID and being separated with a distance of 300 m form a single frequency network (SFN). All small antennas in the SFN transmit the same signals at the same time on the same PRB. Assume that a terminal performs transmission/reception to/from one base station. Actually, the plurality of transmission/reception points transmit identical DL signals. In high-speed movement, transmission/reception points in units of several km form one cell. The handover is performed when moving to another cell. Therefore, frequency of the handover can be reduced.

In NR, it is assumed that a beam transmitted from a transmission point (for example, an RRH) is used to perform communication with a terminal (also described hereinafter as a UE) included in a moving object (HST (high speed train)), such as a train moving at a high speed. In existing systems (for example, Rel. 15), communication with the moving object performed by transmitting a unidirectional beam from the RRH is supported (see FIG. 1A).

FIG. 1A shows a case where RRHs are arranged along a movement path (or direction of movement, direction of travel, travel path) of the moving object and where a beam is formed from each RRH towards the direction of travel of the moving object. The RRH for forming the unidirectional beam may be referred to as a unidirectional RRH. In an example shown in FIG. 1A, the moving object receives a negative Doppler shift (−fD) from each RRH.

Note that FIG. 1A shows a case where the beam is formed towards the direction of travel of the moving object, but is not limited to this, and the beam may be formed towards a direction opposite to the direction of travel, or the beam may be formed towards any direction regardless of the direction of travel of the moving object.

In Rel. 16 (or later versions), it is also assumed that a plurality of (for example, two or more) beams are transmitted from the RRH. For example, it is assumed that beams are formed towards both a direction of travel of the moving object and the opposite direction (see FIG. 1B).

FIG. 1B shows a case where RRHs are installed along a movement path of the moving object and where beams are formed from each RRH towards both the direction of travel of the moving object and a direction opposite to the direction of travel. The RRH for forming a multi-directional (for example, bi-directional) beam may be referred to as a bi-directional RRH.

In this HST, the UE performs communication in a manner similar to that in a single TRP. In base station implementation, transmission from a plurality of TRPs (same cell IDs) can be performed.

In an example in FIG. 1B, when two RRHs (here, RRH #1 and RRH #2) use the SFN, the moving object switches, in the middle of the two RRHs, from a signal with a received negative Doppler shift, to a signal with a received positive Doppler shift that causes power increase. In this case, a maximum width of a Doppler shift change requiring compensation is a change from −fD to +fD, and doubles as compared with that of the unidirectional RRH.

Note that in the present disclosure, the positive Doppler shift may be interpreted as information related to a positive Doppler shift, a Doppler shift in a positive direction, or Doppler information in a positive direction. The negative Doppler shift may be interpreted as information related to a negative Doppler shift, a Doppler shift in a negative direction, or Doppler information in a negative direction.

Here, as HST schemes, scheme 0 to scheme 2 (HST scheme 0 to HST scheme 2) below will be compared with each other.

Figure 2A:
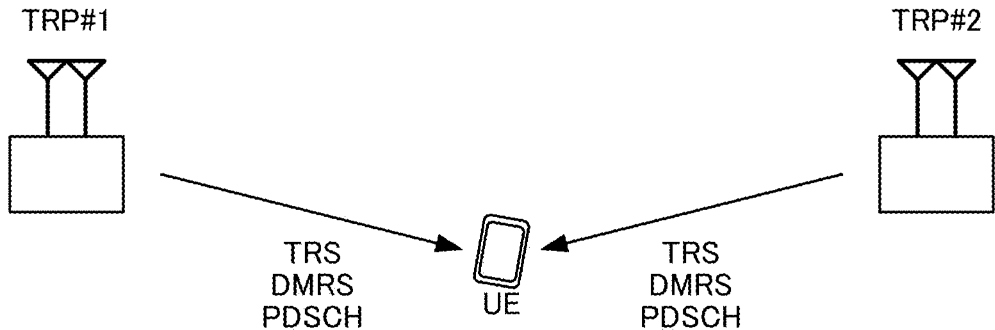
FIGS. 2A to 2C are diagrams to show examples of scheme 0 to scheme 2 related to an SFN.

In scheme 0 in FIG. 2A, a tracking reference signal (TRS), a DMRS, and a PDSCH are transmitted in common with two TRPs (RRHs) (by using the same time and frequency resources) (normal SFN, transparent SFN, HST-SFN).

In scheme 0, the UE receives a DL channel/signal by using the equivalent of the single TRP, and thus a TCI state for the PDSCH is one.

Note that in Rel. 16, an RRC parameter for distinction between transmission using the single TRP and transmission using the SFN is defined. When reporting corresponding UE capability information, the UE may distinguish, based on the RRC parameter, between reception of the DL channel/signal with the single TRP and reception of the PDSCH with assumption of the SFN. On the other hand, the UE may perform transmission/reception using the SFN by assuming the single TRP.

Figure 2B:
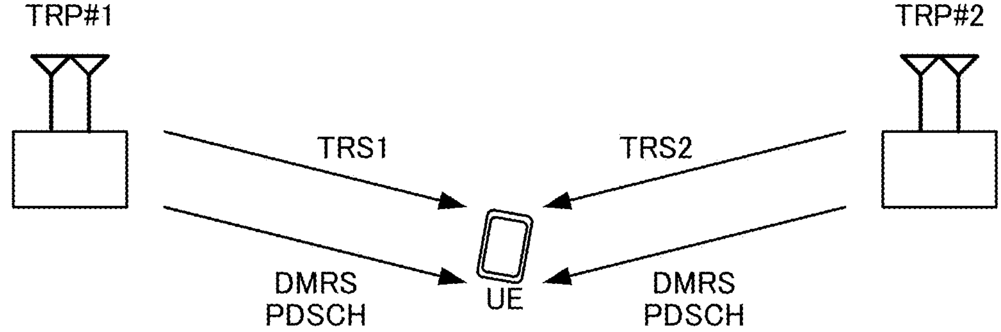

In scheme 1 in FIG. 2B, the TRS is transmitted in a TRP-specific manner (by using a time/frequency resource varying depending on a TRP). In this example, TRS 1 is transmitted from TRP #1, and TRS 2 is transmitted from TRP #2.

In scheme 1, the UE receives a DL channel/signal from each TRP by using a TRS from each TRP, and thus TCI states for the PDSCH are two.

Figure 2C:
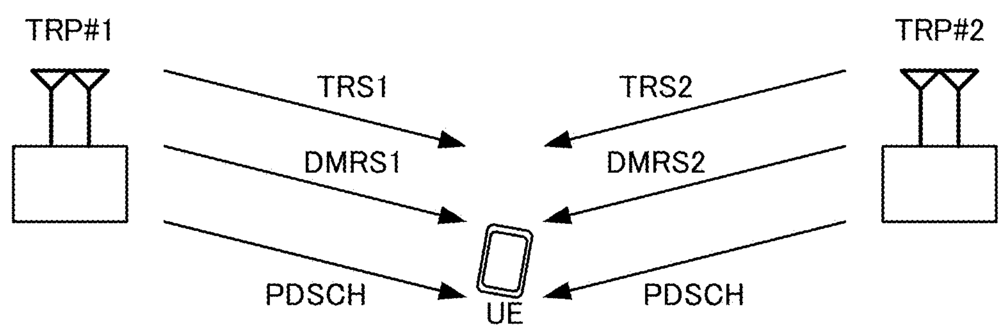

In scheme 2 in FIG. 2C, the TRS and the DMRS are transmitted in a TRP-specific manner. In this example, TRS 1 and DMRS 1 are transmitted from TRP #1, and TRS 2 and DMRS 2 are transmitted from TRP #2. Scheme 1 and scheme 2 can suppress a quick change of a Doppler shift and can appropriately estimate/compensate the Doppler shift, as compared with scheme 0. The DMRS in scheme 2 increases more than the DMRS in scheme 1, and thus maximum throughput in scheme 2 is lower than that in scheme 1.

In scheme 0, the UE performs switching between the single TRP and the SFN, based on higher layer signaling (RRC information element/MAC CE).

The UE may perform switching between scheme 1/scheme 2/NW pre-compensation scheme, based on the higher layer signaling (RRC information element/MAC CE).

In scheme 1, two TRS resources are configured for respective ones of a direction of travel of the HST and the opposite direction.

Figures 3A, 3B:
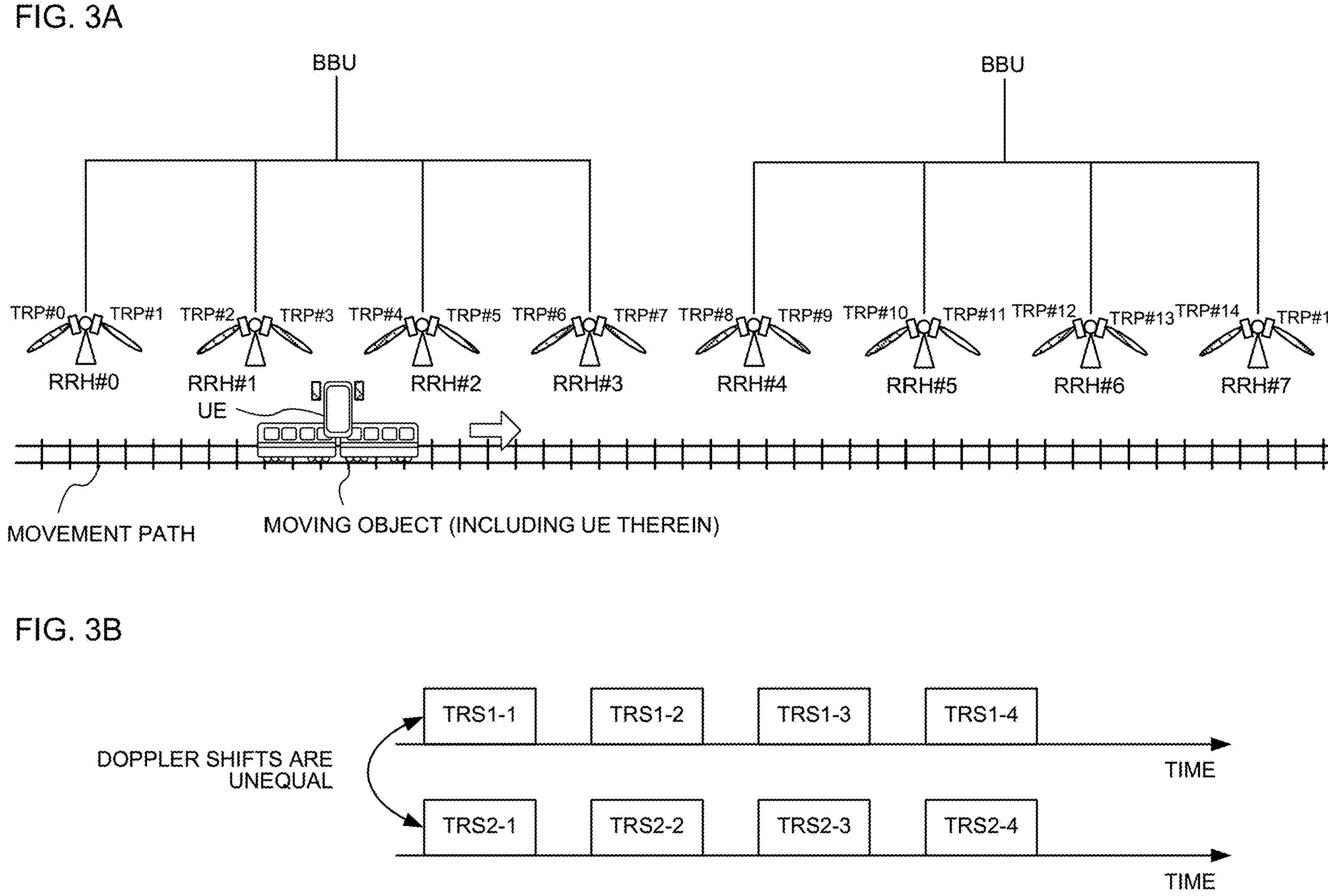
FIGS. 3A and 3B are diagrams to show an example of scheme 1.

In an example in FIG. 3A, TRPs (TRPs #0, #2, . . . ) for transmitting DL signals towards the opposite direction of the HST transmit a first TRS (TRS arriving from in front of the HST) in identical time and frequency resources (SFN). TRPs (TRPs #1, #3, . . . ) for transmitting DL signals towards the direction of travel of the HST transmit a second TRS (TRS arriving from behind the HST) in identical time and frequency resources (SFN). The first TRS and the second TRS may be transmitted/received by using different frequency resources.

In an example in FIG. 3B, TRSs 1-1 to 1-4 are transmitted as the first TRS, and TRSs 2-1 to 2-4 are transmitted as the second TRS.

Considering beam management, the first TRS is transmitted by using 64 beams and 64 time resources, and the second TRS is transmitted by using 64 beams and 64 time resources. It is conceivable that a beam of the first TRS and a beam of the second TRS are equal to each other (QCL type D RSs are equal to each other). Multiplexing the first TRS and the second TRS in identical time resources and different frequency resources can enhance resource use efficiency.

In an example in FIG. 4A, RRHs #0 to #7 are arranged along a movement path of the HST. RRHs #0 to #3 and RRHs #4 to #7 are connected to base band unit (BBU) #0 and BBU #1, respectively. Each RRH is a bi-directional RRH, and forms beams towards both the direction of travel and the opposite direction on the movement path by using each transmission/reception point (TRP).

In a received signal in an example in FIG. 4B (single TRP (SFN)/scheme 1), when the UE receives a signal/channel transmitted from TRP #2n−1 (n is an integer being 0 or more) (beam in the direction of travel of the HST, beam from behind the UE), negative Doppler shift (in this example, −fD) occurs. When the UE receives a signal/channel transmitted from TRP #2n (n is an integer being 0 or more) (beam in a direction opposite to the direction of travel of the HST, beam from in front of the UE), positive Doppler shift (in this example, +fD) occurs.

For Rel. 17 (or later versions), it is studied that a base station performs a Doppler pre-(preliminary) compensation (correction) scheme (Pre-Doppler Compensation scheme, Doppler pre-Compensation scheme, network (NW) pre-compensation scheme (NW pre-compensation scheme, HST NW pre-compensation scheme), TRP pre-compensation scheme, TRP-based pre-compensation scheme) in downlink (DL) signal/channel transmission from a TRP to a UE in an HST. The TRP performs Doppler compensation beforehand when performing DL signal/channel transmission to the UE, thereby allowing an impact of Doppler shift in DL signal/channel reception in the UE to be reduced. In the present disclosure, the Doppler pre-compensation scheme may be a combination of scheme 1 and Doppler shift pre-compensation by the base station.

For the Doppler pre-compensation scheme, it is studied that a TRS from each TRP is transmitted without Doppler pre-compensation for the TRS and a PDSCH from each TRP is transmitted with Doppler pre-compensation for the PDSCH.

In the Doppler pre-compensation scheme, a TRP for forming a beam towards the direction of travel on the movement path and a TRP for forming a beam towards the direction opposite to the direction of travel on the movement path perform DL signal/channel transmission to the UE in the HST after performing Doppler compensation. In this example, TRP #2n−1 performs positive Doppler compensation, and TRP #2n performs negative Doppler compensation, thereby reducing an impact of Doppler shift in signal/channel reception by the UE (FIG. 4C).

Note that in a situation shown in FIG. 4C, the UE receives a DL channel/signal from each TRP by using a TRS from each TRP, and thus TCI states for the PDSCH may be two.

Furthermore, for Rel. 17 (or later versions), dynamic switching, with a TCI field (TCI state field), between the single TRP and the SFN is under study. For example, one or two TCI states are configured/indicated in each TCI codepoint (codepoint of the TCI field, DCI codepoint) by using an RRC information element/MAC CE (for example, Enhanced TCI States Activation/Deactivation for UE-specific PDSCH MAC CE)/DCI (TCI field). The UE may judge that a PDSCH from the single TRP is received when one TCI state is configured/indicated. The UE may judge that a PDSCH from the SFN using multi-TRP is received when two TCI states are configured/indicated.

(Simultaneous Beam Update of Plurality of CCs)

In Rel. 16, one MAC CE can update beam indices (TCI states) of a plurality of CCs.

The UE can be configured with up to two applicable CC lists (for example, applicable-CC-list) by RRC. When two applicable CC lists are configured, the two applicable CC lists may correspond to inter-band CA in FR1 and inter-band CA in FR2.

An activation MAC CE for a TCI state of a PDCCH activates TCI states associated with the same CORESET ID in all the BWPs/CCs in an applicable CC list.

An activation MAC CE for a TCI state of a PDSCH activates TCI states in all the BWPs/CCs in the applicable CC list.

An activation MAC CE for a spatial relation of an A-SRS/SP-SRS activates spatial relations associated with the same SRS resource ID in all the BWPs/CCs in the applicable CC list.

Figure 5:
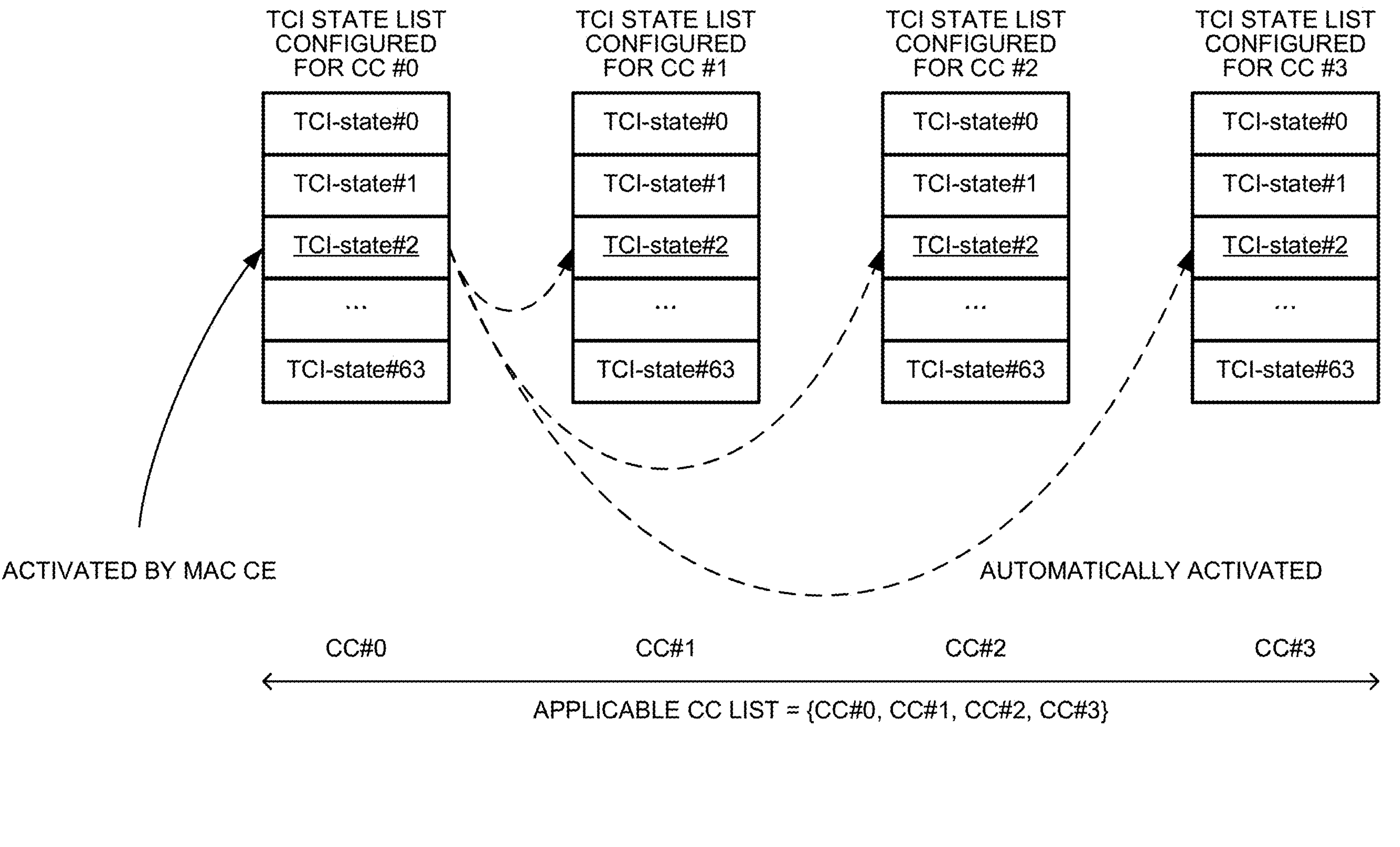
FIG. 5 is a diagram to show an example of simultaneous beam update over a plurality of CCs.

In an example in FIG. 5, the UE is configured with an applicable CC list indicating CCs #0, #1, #2, and #3 and a list indicating 64 TCI states for a CORESET or a PDSCH in each of the CCs. When one TCI state in CC #0 is activated by a MAC CE, corresponding TCI states are activated in CCs #1, #2, and #3.

It is studied that such simultaneous beam update is applicable only to a single-TRP case.

For a PDSCH, the UE may be based on Procedure A below.

{Procedure A}

The UE receives an activation command for mapping up to eight TCI states to a codepoint in a DCI field (TCI field) in one CC/DL BWP or in one set of CCs/BWPs. When one set of TCI state IDs is activated for one set of CCs/DL BWPs, an applicable CC list is determined by a CC(s) indicated in an activation command, and a set of TCI states being the same is applied to all the DL BWPs in the indicated CC. Only if the UE is not provided with a plurality of different values of CORESET pool indices (CORESET-PoolIndex) in a CORESET information element (Control-ResourceSet) and is not provided with at least one TCI codepoint mapped to two TCI states, the one set of TCI state IDs can be activated for one set of CCs/DL BWPs.

For a PDCCH, the UE may be based on Procedure B below.

{Procedure B}

If the UE is provided with up to two lists of cells for simultaneous TCI state activation by a simultaneous TCI update list (at least one of simultaneousTCI-UpdateList-r16 and simultaneousTCI-UpdateListSecond-r16), by a simultaneous TCI cell list (simultaneousTCI-CellList), the UE applies, to CORESETs with an index p in all the configured DL BWPs in all the configured cells in one list determined based on a serving cell index provided by a MAC CE command, an antenna port quasi co-location (QCL) provided by TCI states with the same activated TCI state ID value. Only if the UE is not provided with a plurality of different values of CORESET pool indices (CORESET-PoolIndex) in a CORESET information element (Control-ResourceSet) and is not provided with at least one TCI codepoint mapped to two TCI states, the UE can be provided with a simultaneous TCI cell list for simultaneous TCI state activation.

For a semi-persistent (SP)/aperiodic (AP)-SRS, the UE may be based on Procedure C below.

{Procedure C}

When an SP configured by an SRS resource information element (higher layer parameter SRS-Resource) or spatial relation information (spatialRelationInfo) for an AP-SRS resource is activated/updated by a MAC CE for one set of CCs/BWPs, an applicable CC list is indicated by a simultaneous spatial update list (higher layer parameter smiultaneousSpatial-UpdateList-r16 or simultaneousSpatial-UpdateListSecond-r16), and the spatial relation information is applied to SPs or AP-SRS resources with the same SRS resource ID in all the BWPs in the indicated CC. Only if the UE is not provided with a plurality of different values of CORESET pool indices (CORESETPoolIndex) in a CORESET information element (ControlResourceSet) and is not provided with at least one TCI codepoint mapped to two TCI states, the SP configured by the SRS resource information element (higher layer parameter SRS-Resource) or spatial relation information (spatialRelationInfo) for the AP-SRS resource is activated/updated by an MAC CE for the one set of CCs/BWPs.

The simultaneous TCI cell list (simultaneousTCI-CellList) and simultaneous TCI update lists (at least one of simultaneousTCI-UpdateList1-r16 and simultaneousTCI-UpdateList2-r16) are lists of serving cells for which a TCI relationship can be updated simultaneously by using a MAC CE. simultaneousTCI-UpdateList1-r16 and simultaneousTCI-UpdateList2-r16 do not include the same serving cell.

The simultaneous spatial update list (at least one of higher layer parameters simultaneousSpatial-UpdatedList1-r16 and simultaneousSpatial-UpdatedList2-r16) is a list of serving cells for which a spatial relationship can be updated simultaneously by using a MAC CE. simultaneousSpatial-UpdatedList1-r16 and simultaneousSpatial-UpdatedList2-r16 do not include the same serving cell.

Here, the simultaneous TCI update lists and the simultaneous spatial update lists are configured by RRC, a CORESET pool index of a CORESET is configured by RRC, and a TCI codepoint mapped to TCI state(s) is indicated by a MAC CE.

(Unified/Common TCI Framework)

With a unified TCI framework, UL and DL channels can be controlled by a common framework. A unified TCI framework may indicate a common beam (common TCI state) and apply the common beam to all the UL and DL channels instead of defining a TCI state or a spatial relation for each channel as in Rel. 15, or apply a common beam for UL to all the UL channels while applying a common beam for DL to all the DL channels.

One common beam for both DL and UL or a common beam for DL and a common beam for UL (two common beams in total) are studied.

The UE may assume the same TCI state (joint TCI state, joint TCI pool, joint common TCI pool, joint TCI state set) for UL and DL. The UE may assume respective different TCI states (separate TCI states, separate TCI pools, UL separate TCI pool and DL separate TCI pool, separate common TCI pools, UL common TCI pool and DL common TCI pool) for UL and DL.

By beam management based on a MAC CE (MAC CE level beam indication), default UL and DL beams may be aligned. A default TCI state of a PDSCH may be updated to match to a default UL beam (spatial relation).

By beam management based on DCI (DCI level beam indication), a common beam/unified TCI state may be indicated from the same TCI pool (joint common TCI pool, joint TCI pool, set) for both UL and DL. X (>1) TCI states may be activated by a MAC CE. UL/DL DCI may select one from the X active TCI states. The selected TCI state may be applied to channels/RSs of both UL and DL.

The TCI pool (set) may be a plurality of TCI states configured by an RRC parameter or a plurality of TCI states (active TCI states, active TCI pool, set) activated by a MAC CE among the plurality of TCI states configured by the RRC parameter. Each TCI state may be a QCL type A/D RS. As the QCL type A/D RS, an SSB, a CSI-RS, or an SRS may be configured.

The number of TCI states corresponding to each of one or more TRPs may be defined. For example, the number N (1) of TCI states (UL TCI states) applied to a UL channel/RS and the number M (1) of TCI states (DL TCI states) applied to a DL channel/RS may be defined. At least one of N and M may be notified/configured/indicated for the UE via higher layer signaling/physical layer signaling.

In the present disclosure, description "N=M=X (X is an arbitrary integer)" may mean that X TCI states (joint TCI states) (corresponding to X TRPs) common to UL and DL are notified/configured/indicated for the UE.

Description "N=X (X is an arbitrary integer), M=Y (Y is an arbitrary integer, Y may be equal to X)" may mean that X UL TCI states (corresponding to X TRPs) and Y DL TCI states (corresponding to Y TRPs) are notified/configured/indicated for the UE. The UL TCI state and the DL TCI state may mean a TCI state common to UL and DL (in other words, a joint TCI state), or may mean TCI states for respective ones of UL and DL (in other words, separate TCI states).

For example, description "N=M=1" may mean that one TCI state common to UL and DL is notified/configured/indicated for the UE, the TCI state being for a single TRP (joint TCI state for a single TRP).

For example, description "N=1, M=1" may mean that one UL TCI state and one DL TCI state for a single TRP are separately notified/configured/indicated for the UE (separate TCI state for a single TRP).

For example, description "N=M=2" may mean that a plurality of (two) TCI states common to UL and DL are notified/configured/indicated for the UE, the plurality of TCI states being for a plurality of (two) TRPs (joint TCI states for multiple TRPs).

For example, description "N=2, M=2" may mean that a plurality of (two) UL TCI states and a plurality of (two) DL TCI states for a plurality of (two) TRPs are notified/configured/indicated for the UE (separate TCI states for multiple TRPs).

For example, description "N=2, M=1" may mean that two TCI states common to UL and DL are notified/configured/indicated for the UE. In this case, the UE may use the two configured/indicated TCI states as UL TCI states, and may use one TCI state of the two configured/indicated TCI states as a DL TCI state.

For example, description "N=2, M=1" may mean that two UL TCI states and one DL TCI state are notified/configured/indicated as separate TCI states for the UE.

Note that in the above examples, cases where N and M values are 1 or 2 are described, but the N and M values may be 3 or more, and N and M may be different from each other.

A case of M>1/N>1 may indicate at least one of a TCI state indication for multi-TRP and a plurality of TCI state indications for inter-band CA.

In an example in FIG. 6A, an RRC parameter (information element) configures a plurality of TCI states for both DL and UL. The MAC CE may activate a plurality of TCI states among the plurality of configured TCI states. DCI may indicate one of the plurality of activated TCI states. The DCI may be UL/DL DCI. The indicated TCI state may be applied to at least one (or all) of UL/DL channels/RSs. One piece of DCI may indicate both a UL TCI and a DL TCI.

In the example in FIG. 6A, one dot may be one TCI state applied to both UL and DL or may be two respective TCI states applied to UL and DL.

At least one of the plurality of TCI states configured by the RRC parameter and the plurality of TCI states activated by the MAC CE may be referred to as a TCI pool (common TCI pool, joint TCI pool, TCI state pool). The plurality of TCI states activated by the MAC CE may be referred to as an active TCI pool (active common TCI pool).

Note that, in the present disclosure, a higher layer parameter (RRC parameter) that configures a plurality of TCI states may be referred to as configuration information that configures a plurality of TCI states or simply as "configuration information." In the present disclosure, one of a plurality of TCI states being indicated by using DCI may be receiving indication information indicating one of a plurality of TCI states included in DCI or may simply be receiving "indication information."

In an example in FIG. 6B, an RRC parameter configures a plurality of TCI states for both DL and UL (joint common TCI pool). A MAC CE may activate a plurality of TCI states (active TCI pool) among the plurality of configured TCI states. Respective (different, separate) active TCI pools for UL and DL may be configured/activated.

DL DCI or a new DCI format may select (indicate) one or more (for example, one) TCI states. The selected TCI state(s) may be applied to one or more (or all) DL channels/RSs. The DL channel(s) may be a PDCCH/PDSCH/CSI-RS(s). The UE may determine the TCI state of each of the DL channels/RSs by using operation of a TCI state (TCI framework) of Rel. 16. UL DCI or a new DCI format may select (indicate) one or more (for example, one) TCI states. The selected TCI state(s) may be applied to one or more (or all) UL channels/RSs. The UL channel(s) may be a PUSCH/SRS/PUCCH(s). Thus, different pieces of DCI may indicate a UL TCI and a DL DCI separately.

Existing DCI format 1_1/1_2 may be used for indication of a common TCI state.

The DCI format for indicating the TCI state may be a specific DCI format. For example, the specific DCI format may be DCI format 1_1/1_2 (defined in Rel. 15/16/17).

The DCI format (DCI format 1_1/1_2) for indicating the TCI state may be a DCI format without DL assignment. In the present disclosure, the DCI format may be interpreted as a DCI format without DL assignment, a DCI format (DCI format 1_1/1_2) that does not schedule a PDSCH, a DCI format (DCI format 1_1/1_2) not including one or more specific fields, a DCI format (DCI format 1_1/1_2) in which one or more specific fields are set to a fixed value, or the like, and vice versa.

For the DCI format without DL assignment (DCI format not including one or more specific fields), the specific field(s) may be field(s) other than a TCI field, an indicator field of a DCI format, a carrier indicator field, a bandwidth part (BWP) indicator field, a time domain resource assignment (TDRA) field, a Downlink Assignment Index (DAI) field (if configured), a transmission power control (TPC) command field (for a PUCCH to be scheduled), a PUCCH resource indicator field, and a PDSCH-to-HARQ-ACK feedback timing indication (PDSCH-to-HARQ feedback timing indicator) field (if present). The specific field(s) may be set as a reserved field, or may be ignored.

For the DCI format without DL assignment (DCI format in which one or more specific fields are set to a fixed value), the specific field(s) may be a redundancy version (RV) field, a modulation and coding scheme (MCS) field, a new data indicator field, and a frequency domain resource assignment (FDRA) field.

RV fields may all be set to 1. MCS fields may all be set to 1. NDI fields may all be set to 0. FDRA fields of type 0 may all be set to 0. FDRA fields of type 1 may all be set to 1. FDRA fields for dynamic switching (higher layer parameter "dynamicSwitch") may all be set to 0.

A common TCI framework may include separate TCI states for DL and UL.

(MAC CE)

Figure 7:
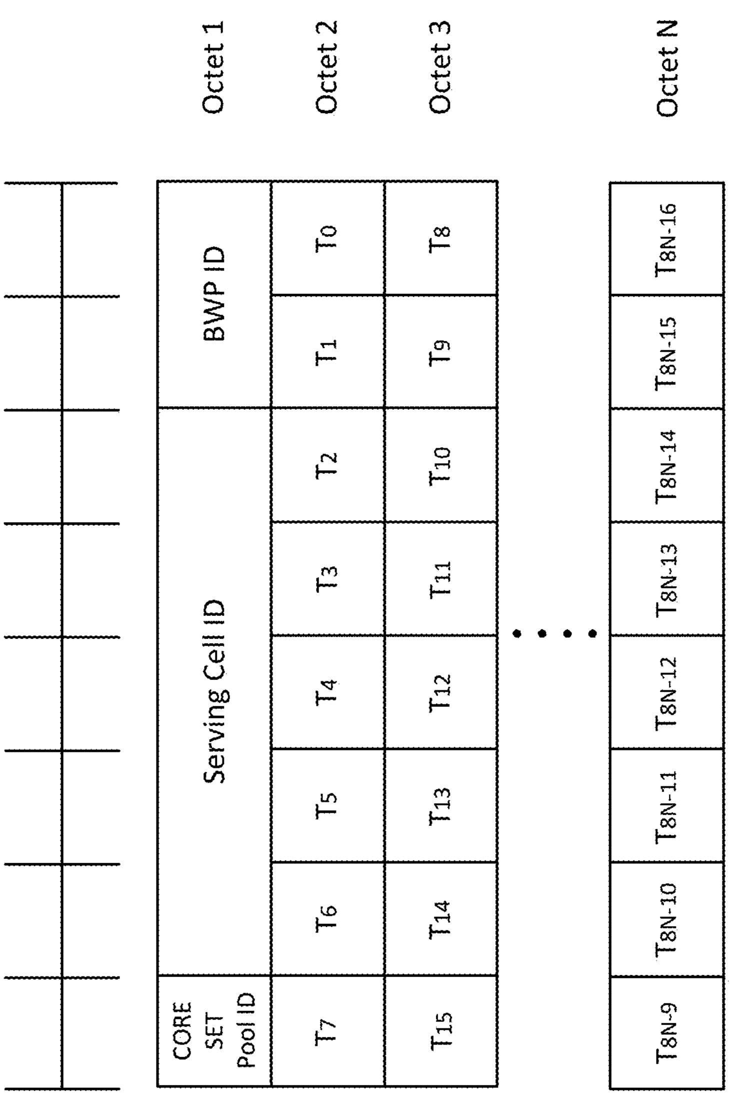
FIG. 7 is a diagram to show an example of a MAC CE defined in Rel. 16.

In Rel. 16, a MAC CE (TCI states Activation/Deactivation for UE-specific PDSCH MAC CE) is used for TCI state activation/deactivation for a UE-specific PDSCH (see FIG. 7).

The MAC CE is identified by a MAC sub-header having a Logical Channel ID (LCID).

The MAC CE may be used in an environment in which a single TRP or multi-DCI-based multi-TRP are used.

The MAC CE may include a serving cell ID field, a BWP ID field, a field (Ti) for indicating TCI state activation/deactivation, and a CORESET pool ID field.

The serving cell ID field may be a field for indicating a serving cell to which the MAC CE is applied. The BWP ID field may be a field for indicating a DL BWP to which the MAC CE is applied.

The CORESET pool ID field may be a field indicating that correspondence (mapping) between an activated TCI state and a codepoint of a TCI field (codepoint of a DCI TCI) indicated by DCI set with field Ti is specific to ControlResourceSetId configured with a CORESET pool ID.

Figure 8:
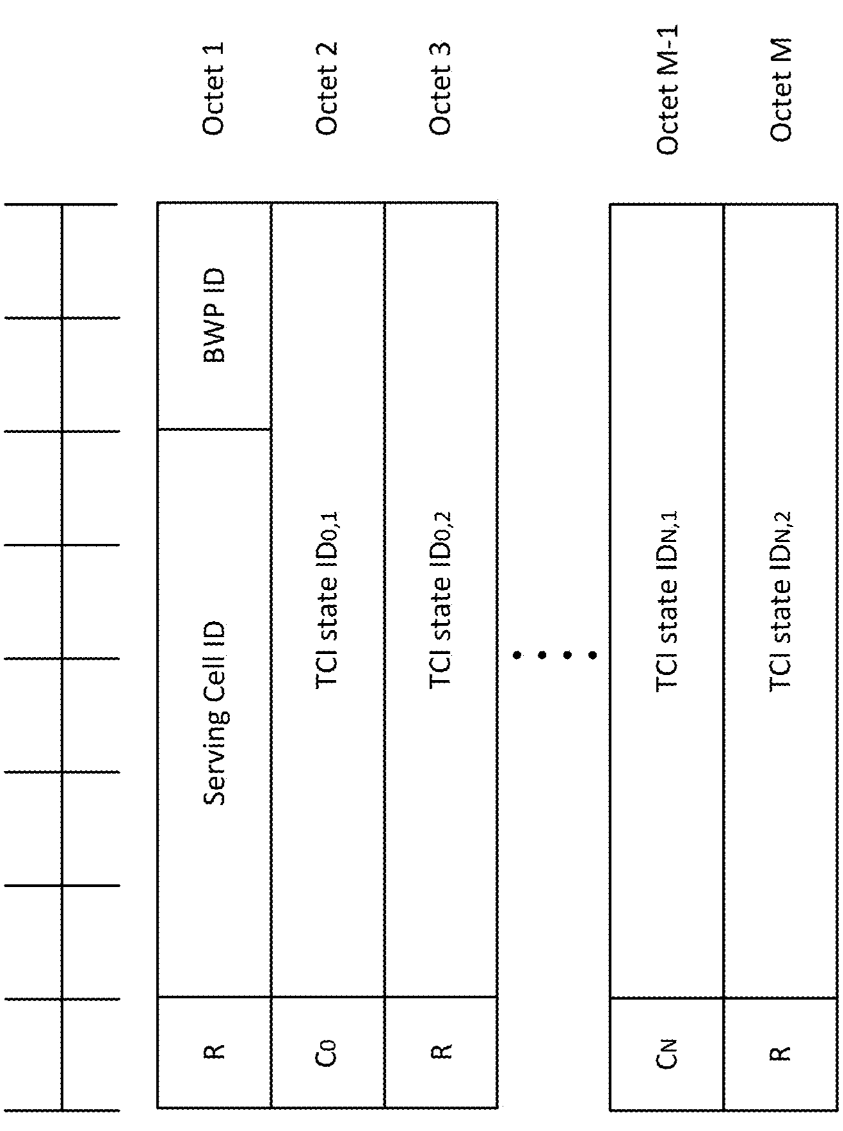
FIG. 8 is a diagram to show another example of the MAC CE defined in Rel. 16.

In Rel. 16, a MAC CE (Enhanced TCI states Activation/Deactivation for UE-specific PDSCH MAC CE) is used for TCI state activation/deactivation for a UE-specific PDSCH (see FIG. 8).

The MAC CE is identified by a MAC PDU sub-header having an eLCID.

The MAC CE may be used in an environment in which single DCI-based multi-TRP are used.

The MAC CE may include a serving cell ID field, a BWP ID field, a field for indicating a TCI state identified by TCI-StateID (TCI state IDi,j (i is an integer from 0 to N, and j is 1 or 2)), a field (Ci) indicating whether TCI state IDi,2 is present in a corresponding octet, and a reserved bit field (set to R, 0).

"i" may correspond to an index of a codepoint of a TCI field indicated by DCI. "TCI state IDi,j" may indicate the j th TCI state of a codepoint of the i th TCI field.

Figure 9:
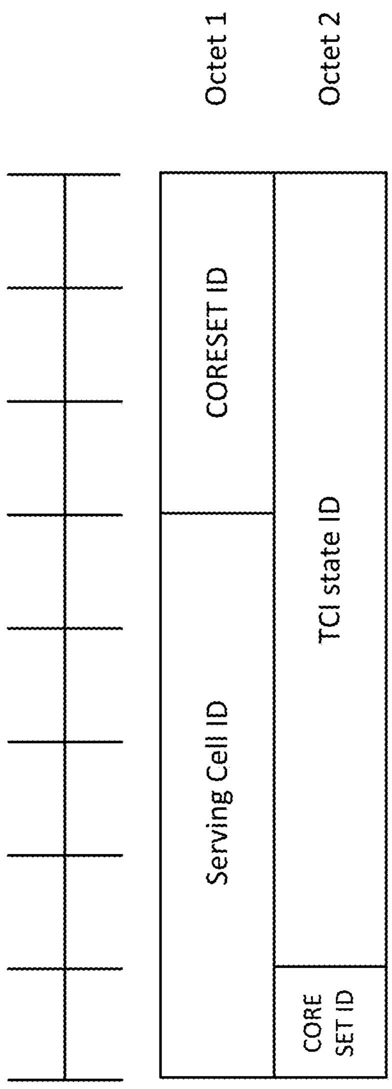
FIG. 9 is a diagram to show another example of the MAC CE defined in Rel. 16.

In Rel. 16, a MAC CE (TCI state Indication for UE-specific PDCCH MAC CE) is used for TCI state activation/deactivation for a UE-specific PDCCH/CORESET (see FIG. 9).

The MAC CE is identified by a MAC sub-header having an LCID.

The MAC CE may include a serving cell ID field, a field indicating a CORESET (CORESET ID) for which a TCI state is indicated, and a field (TCI state ID) for indicating a TCI state applicable to a CORESET identified by a CORESET ID.

(Beam Application Time (BAT))

For DCI-based beam indication in Rel. 17, studies 1 and 2 below are under study with respect to application time to indicate a beam/unified TCI state.

{Study 1}

It is studied that a first slot to which indicated TCI is applied is after at least Y symbols from a last symbol of an acknowledgement (ACK) for joint or separate DL/UL beam indication. It is studied that a first slot to which indicated TCI is applied is after at least Y symbols from a last symbol of an ACK/negative acknowledgement (NACK) for joint or separate DL/UL beam indication. The Y symbols may be configured by a base station, based on a UE capability reported by the UE. The UE capability may be reported in a symbol unit.

The ACK may be an ACK for a PDSCH scheduled by beam indication DCI. The PDSCH may not be scheduled by the beam indication DCI. The ACK in this case may be an ACK for the beam indication DCI.

For DCI-based beam indication in Rel. 17, it is studied that at least one Y symbol is configured for the UE for each BWP/CC.

When SCS varies between a plurality of CCs, a Y symbol value also varies, and thus there is a possibility that the application time varies between the plurality of CCs.

{Study 2}

For a case of CA, application time for the beam indication may follow any one of options 1 to 3 below.

- {Option 1} Both of the first slot and Y symbols are determined on a carrier with the lowest SCS, from among one or more carriers to which the beam indication is applied.
- {Option 2} Both of the first slot and Y symbols are determined on a carrier with the lowest SCS, from among one or more carriers to which the beam indication is applied and a UL carrier that delivers the ACK.
- {Option 3} Both of the first slot and Y symbols are determined on a UL carrier that delivers the ACK.

It is studied that as a CC simultaneous beam update function in Rel. 17, a beam is common to a plurality of CCs in the CA. According to study 2, the application time is common to the plurality of CCs.

The application time (Y symbols) for the beam indication for the CA may be determined on a carrier with the lowest SCS, from among carriers to which the beam indication is applied. MAC CE-based beam indication in Rel. 17 (when only a single TCI codepoint is activated) may follow a Rel-16 application timeline for MAC CE activation.

Based on these studies, it is studied that operation below is defined in a specification.

{Operation}

When the UE transmits a last symbol of a PUCCH with HARQ-ACK information corresponding to DCI for communicating TCI state indication, application of an indicated TCI state with a Rel-17 TCI state may be started from a first slot being a slot after at least Y symbols from the last symbol of the PUCCH. Y may be a higher layer parameter (for example, BeamAppTime r17 [symbol]). Both of the first slot and Y symbols may be determined on a carrier with the lowest SCS, from among carriers to which the beam indication is applied. At a certain timing, the UE may assume one indicated TCI state with a Rel-17 TCI state for DL and UL, or may assume one indicated TCI state with a Rel-17 TCI state for UL (separately from DL).

In place of Y [symbol], X [ms] may be used.

For the application time, it is studied that the UE reports at least one of UE capability 1 and UE capability 2 below.

{UE Capability 1}

Minimum application time for each SCS (minimum value of Y symbols between a last symbol of a PUCCH that delivers an ACK and a first slot to which a beam is applied).

{UE Capability 2}

A minimum time gap between a last symbol of a beam indication PDCCH (DCI) and a first slot to which a beam is applied. A gap between the last symbol of the beam indication PDCCH (DCI) and the first slot to which the beam is applied may satisfy the UE capability (minimum time gap).

UE capability 2 may be an existing UE capability (for example, timeDurationForQCL).

A relationship between indication of a beam and a channel/RS to which the beam is applied may satisfy at least one of UE capability 1 and UE capability 2.

(Analysis)

As mentioned above, for Rel. 17 (or later versions), it is studied that one or more TCI states (common TCI states) are indicated for the UE by using a TCI state field (TCI field, up to 3 bits) included in a DCI format (for example, DCI format 1_1/1_2 without/with DL assignment).

FIG. 10A is a diagram to show an example of indication of a joint TCI state. As shown in FIG. 10A, in the indication of the joint TCI state, one joint TCI state (DL/UL joint TCI state) may correspond to one TCI field codepoint. The UE may judge, based on an indicated TCI field codepoint, a TCI state (DL/UL joint TCI state) to be applied to a DL channel/signal and a UL channel/signal.

FIG. 10B is a diagram to show an example of indication of a separate TCI state. As shown in FIG. 10B, in the indication of the separate TCI state, one or two TCI states correspond to one TCI field codepoint. Respective ones of the two TCI states may be a DL (separate) TCI state and a UL (separate) TCI state. The UE judges, based on an indicated TCI field codepoint, a TCI state to be applied to a DL channel/signal and a TCI state to be applied to a UL channel/signal. When a TCI field codepoint corresponding to only one TCI state (for example, codepoint "000" in FIG. 10B) is notified to the UE, for the UE, a non-indicated TCI state (for example, in the case of codepoint "000" in FIG. 10B, a UL TCI state) may continue/indicate a UL TCI state applied until the notification.

Figure 11:
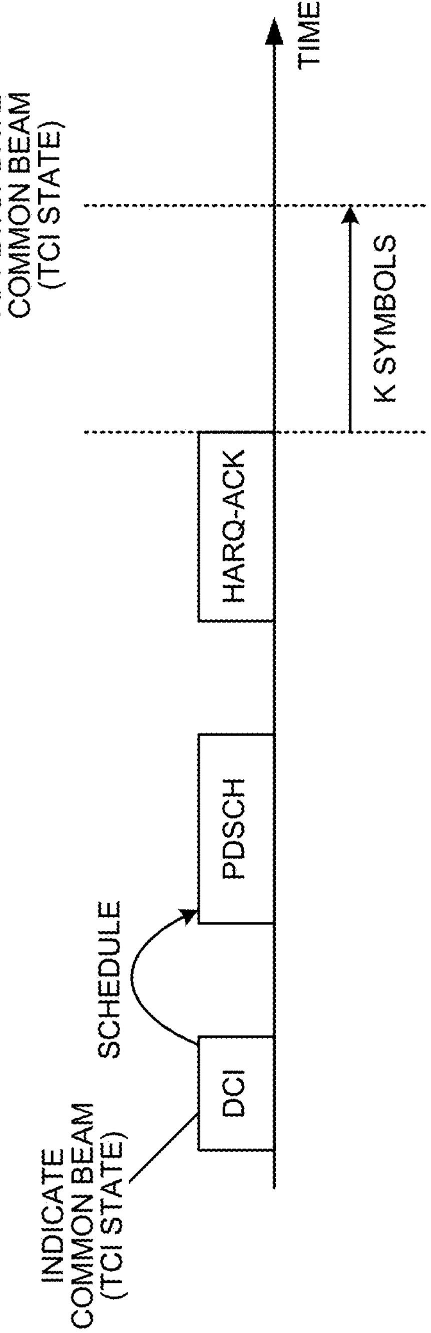
FIG. 11 is a diagram to show an example of a timing until application of an indicated TCI state.

For Rel. 17 (or later versions), a timeline related to time from TCI state indication (which may be referred to as "beam indication") to application of an indicated TCI state is under study. A timing from reception of the beam indication until application of the TCI state (which may be referred to as a beam application timing (BAT)) may be a timing until a lapse of specific time (for example, a lapse of K symbols) from completion of transmission of a HARQ-ACK for a PDSCH scheduled by DCI for indicating the TCI state (see FIG. 11). The timing may be a first slot after at least specific time (for example, K symbols). In the present disclosure, the BAT, K symbols, Y symbols, and X [ms] may be interchangeably interpreted.

This K may be determined based on higher layer signaling (RRC parameter) based on capability information (UE Capability Information, for example, "timeDurationForQCL-rel18") reported by the UE. Note that the BAT for specific subcarrier spacing may be configured for a plurality of (for example, all) CCs/BWPs in which a common TCI state ID of a common TCI state in carrier aggregation (CA) is configured.

However, in signal/channel transmission/reception using multi-TRP, there is a case where a study of configuration/indication/application of the common TCI state is insufficient. More specifically, for signal/channel transmission/reception using multi-TRP, a study is insufficiently performed with respect to a method for configuring/indicating a TCI state, mapping between a configured/indicated TCI state and respective channels/signals, and a timeline until application of the TCI state (BAT). Unless a study of a method for configuring/indicating/applying the TCI state is sufficient, degradation in communication quality, reduction in throughput, and the like may occur.

Thus, the inventors of the present invention came up with the idea of a method for appropriately configuring/indicating/applying a TCI state even when a TCI state is applied to a plurality of types of signals/channels in signal/channel transmission/reception using multi-TRP.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, a sequence, a list, a set, a group, a cluster, a subset, and the like may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), an RRC message, and a configuration may be interchangeably interpreted.

The MAC signaling may use, for example, a MAC control element (MAC CE), a MAC Protocol Data Unit (PDU), or the like. In the present disclosure, a MAC CE, an update command, and an activation/deactivation command may be interchangeably interpreted.

The broadcast information may be, for example, a master information block (MIB), a system information block (SIB), minimum system information (Remaining Minimum System Information (RMSI), SIB1), other system information (OSI), or the like.

In the present disclosure, a beam, a spatial domain filter, spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

In the present disclosure, a panel, a UE panel, a panel group, a beam, a beam group, a precoder, an Uplink (UL) transmission entity, a transmission/reception point (TRP), a base station, spatial relation information (SRI), a spatial relation, an SRS resource indicator (SRI), a control resource set (CORESET), a Physical Downlink Shared Channel (PDSCH), a codeword (CW), a transport block (TB), a reference signal (RS), a base station, an antenna port for a certain signal (for example, a demodulation reference signal (DMRS) port), a DMRS, an antenna port group for a certain signal (for example, a DMRS port group), a group for multiplexing (for example, a code division multiplexing (CDM) group, a reference signal group, or a CORESET group), a Physical Uplink Control Channel (PUCCH) group, a PUCCH resource group, a resource (for example, a reference signal resource or an SRS resource), a resource set (for example, a reference signal resource set), a CORESET pool, a CORESET subset, a downlink Transmission Configuration Indication state (TCI state) (DL TCI state), an uplink TCI state (UL TCI state), a unified TCI state, a common TCI state, quasi-co-location (QCL), QCL assumption, a redundancy version (RV), and a layer (multi-input multi-output (MIMO) layer, transmission layer, spatial layer) may be interchangeably interpreted. A panel Identifier (ID) and a panel may be interchangeably interpreted. In the present disclosure, a TRP ID and a TRP may be interchangeably interpreted.

The panel may be related to at least one of a group index of an SSB/CSI-RS group, a group index of group-based beam report, and a group index of an SSB/CSI-RS group for group-based beam report.

A panel Identifier (ID) and a panel may be interchangeably interpreted. In other words, a TRP ID and a TRP, a CORESET group ID and a CORESET group, and the like may be interchangeably interpreted.

In the present disclosure, a TRP, a transmission point, a panel, a DMRS port group, a CORESET pool, and one of two TCI states associated with one codepoint of a TCI field may be interchangeably interpreted.

In the present disclosure, it may be assumed that a single PDCCH (DCI) is supported when multi-TRP uses ideal backhaul. It may be assumed that multi-PDCCH (DCI) is supported when multi-TRP uses non-ideal backhaul.

Note that the ideal backhaul may be referred to as DMRS port group type 1, reference signal related group type 1, antenna port group type 1, CORESET pool type 1, and the like. The non-ideal backhaul may be referred to as DMRS port group type 2, reference signal related group type 2, antenna port group type 2, CORESET pool type 2, and the like. The names are not limited to these.

In the present disclosure, a single TRP, a single-TRP system, single-TRP transmission, and a single PDSCH may be interchangeably interpreted. In the present disclosure, multi-TRP (multiple TRPs), a multi-TRP system, multi-TRP transmission, and multi-PDSCH may be interchangeably interpreted. In the present disclosure, single DCI, a single PDCCH, multi-TRP based on single DCI, and two TCI states in at least one TCI codepoint being activated may be interchangeably interpreted.

In the present disclosure, a single TRP, a channel using a single TRP, a channel using one TCI state/spatial relation, multi-TRP being not enabled by RRC/DCI, a plurality of TCI states/spatial relations being not enabled by RRC/DCI, and one CORESET pool index (CORESETPoolIndex) value being not configured for any CORESET and any codepoint of a TCI field being not mapped to two TCI states may be interchangeably interpreted.

In the present disclosure, multi-TRP, a channel using multi-TRP, a channel using a plurality of TCI states/spatial relations, multi-TRP being enabled by RRC/DCI, a plurality of TCI states/spatial relations being enabled by RRC/DCI, and at least one of multi-TRP based on single DCI and multi-TRP based on multi-DCI may be interchangeably interpreted. In the present disclosure, multi-TRP based on multi-DCI and one CORESET pool index (CORESETPoolIndex) value being configured for a CORESET may be interchangeably interpreted. In the present disclosure, multi-TRP based on single DCI and at least one codepoint in a TCI field being mapped to two TCI states may be interchangeably interpreted.

In the present disclosure, TRP #1 (first TRP) may correspond to CORESET pool index=0, or may correspond to a first TCI state of two TCI states corresponding to one codepoint of a TCI field. TRP #2 (second TRP) TRP #1 (first TRP) may correspond to CORESET pool index=1, or may correspond to a second TCI state of the two TCI states corresponding to one codepoint of the TCI field.

In the present disclosure, single DCI (sDCI), a single PDCCH, a multi-TRP system based on single DCI, sDCI-based MTRP, and two TCI states in at least one TCI codepoint being activated may be interchangeably interpreted.

In the present disclosure, multi-DCI (mDCI), multi-PDCCH, a multi-TRP system based on multi-DCI, mDCI-based MTRP, and two CORESET pool indices or CORESET pool index=1 (or a value equal to one or greater) being configured may be interchangeably interpreted.

QCL in the present disclosure may be interchangeably interpreted as QCL type D.

In the present disclosure, “TCI state A is of the same QCL type D as that of TCI state B,” “TCI state A and TCI state B are the same,” “TCI state A is QCL type D with TCI state B,” and the like may be interchangeably interpreted.

In the present disclosure, a codepoint of a DCI field ‘Transmission Configuration Indication,’ a TCI codepoint, a DCI codepoint, and a codepoint of a TCI field may be interchangeably interpreted.

In the present disclosure, a single TRP and an SFN may be interchangeably interpreted. In the present disclosure, an HST, an HST scheme, a scheme for high-speed movement, scheme 1, scheme 2, an NW pre-compensation scheme, HST scheme 1, HST scheme 2, and an HST NW pre-compensation scheme may be interchangeably interpreted.

In the present disclosure, a PDSCH/PDCCH using a single TRP may be interpreted as a single TRP-based PDSCH/PDCCH or a single TRP PDSCH/PDCCH. In the present disclosure, a PDSCH/PDCCH using an SFN may be interpreted as a PDSCH/PDCCH using multi-SFN, a PDSCH/PDCCH based on an SFN, or an SFN PDSCH/PDCCH.

In the present disclosure, DL signal (PDSCH/PDCCH) reception using an SFN may mean reception using identical time/frequency resources and/or reception of identical data (PDSCHs)/control information (PDCCHs) from a plurality of transmission/reception points. The DL signal reception using the SFN may mean reception using identical time/frequency resources and/or reception, with a plurality of TCI states/spatial domain filters/beams/QCLs, of identical data/control information.

In the present disclosure, an HST-SFN scheme, an SFN scheme in Rel. 17 (or later versions), a new SFN scheme, a new HST-SFN scheme, an HST-SFN scenario in Rel. 17 (or later versions), an HST-SFN scheme for an HST-SFN scenario, an SFN scheme for an HST-SFN scenario, scheme 1, HST-SFN scheme A/B, HST-SFN type A/B, a Doppler pre-compensation scheme, and at least one of scheme 1 (HST scheme 1) and the Doppler pre-compensation scheme may be interchangeably interpreted.

In the present disclosure, the Doppler pre-compensation scheme, a base station pre-compensation scheme, a TRP pre-compensation scheme, a pre-Doppler compensation scheme, a Doppler pre-compensation scheme, an NW pre-compensation scheme, an HST NW pre-compensation scheme, a TRP pre-compensation scheme, a TRP-based pre-compensation scheme, HST-SFN scheme A/B, and HST-SFN type A/B may be interchangeably interpreted. In the present disclosure, the pre-compensation scheme, a reduction scheme, an improvement scheme, and a correction scheme may be interchangeably interpreted.

In the present disclosure, PDCCHs/search spaces (SSs)/CORESETs having a linkage, PDCCHs/SSs/CORESETs linked to each other, and a pair of PDCCHs/SSs/CORESETs may be interchangeably interpreted. In the present disclosure, PDCCHs/SSs/CORESETs not having a linkage, PDCCHs/SSs/CORESETs not linked to each other, and a single PDCCH/SS/CORESET may be interchangeably interpreted.

In the present disclosure, two CORESETs linked to each other for PDCCH repetition and two CORESETs associated with two respective SS sets linked to each other may be interchangeably interpreted.

In the present disclosure, SFN-PDCCH repetition, PDCCH repetition, two PDCCHs linked to each other, and one piece of DCI received over two search spaces (SSs)/CORESETs linked to each other may be interchangeably interpreted.

In the present disclosure, PDCCH repetition, SFN-PDCCH repetition, PDCCH repetition for higher reliability, a PDCCH for higher reliability, a PDCCH for reliability, and two PDCCHs linked to each other may be interchangeably interpreted.

In the present disclosure, a PDCCH reception method, PDCCH repetition, SFN-PDCCH repetition, HST-SFN, and an HST-SFN scheme may be interchangeably interpreted.

In the present disclosure, a PDSCH reception method, a single DCI-based multi-TRP, and an HST-SFN scheme may be interchangeably interpreted.

In the present disclosure, single DCI-based multi-TRP repetition may be NCJT for an enhanced mobile broadband (eMBB) service (low priority, priority 0), or may be repetition for a URLLC service of an ultra-reliable and low latency communications service (high priority, priority 1).

In each embodiment of the present disclosure, a PDSCH for single DCI-based multi-TRP may be interpreted as a PDSCH to which TDM/FDM/SDM for multi-TRP (defined in Rel. 16) is applied, and vice versa.

In each embodiment of the present disclosure, a PDSCH for multi-TRP may be interpreted as a PDSCH to which TDM/FDM/SDM for single DCI-based multi-TRP (defined in Rel. 16) is applied, and vice versa.

In each embodiment of the present disclosure, a PUSCH/PUCCH/PDCCH for single DCI-based multi-TRP may be interpreted as repetition transmission (repetition) of a PUSCH/PUCCH/PDCCH for multi-TRP (defined in Rel. 17 (or later versions)), and vice versa.

In each embodiment of the present disclosure, an SFN PDSCH/PDCCH may be interpreted as an SFN PDSCH/PDCCH defined in Rel. 17 (or later versions), and vice versa.

In each embodiment of the present disclosure, use of multi-DCI-based multi-TRP being configured may mean CORESET pool index=1 being configured. Use of multi-DCI-based multi-TRP being configured may mean a CORESET pool index with two different values (for example, 0 and 1) being configured.

In each embodiment of the present disclosure, UL transmission using multiple panels may mean a UL transmission scheme by DCI enhancement, the UL transmission scheme using multiple panels of the UE.

In each embodiment of the present disclosure, if a joint TCI state/separate TCI state in a unified TCI state framework is not applicable to respective channels/signals, the default TCI state/QCL/spatial relation mentioned above may be used for determining a TCI state/QCL/spatial relation for the respective channels.

Each embodiment of the present disclosure below may be applied to transmission/reception of an arbitrary channel/signal being a target of application of the above-described unified TCI state framework defined in Rel. 17 (or later versions).

In the present disclosure, a TCI state being applied to each channel/signal/resource may mean a TCI state being applied to transmission/reception of each channel/signal/resource.

In the present disclosure, "little," "small," "short," and "low" may be interchangeably interpreted. In the present disclosure, ignore, drop, and the like may be interchangeably interpreted.

In the present disclosure, "highest (maximum)" and "lowest (minimum)" may be interchangeably interpreted. In the present disclosure, "maximum" may be interpreted as "the n th (n is an arbitrary natural number)" largest, larger, higher, or the like, and vice versa. In the present disclosure, "minimum" may be interpreted as "the n th (n is an arbitrary natural number) smallest," smaller, lower, or the like, and vice versa.

In the present disclosure, repetition, repetition transmission, and repetition reception may be interchangeably interpreted.

In the present disclosure, a channel, a signal, and a channel/signal may be interchangeably interpreted. In the present disclosure, a DL channel, a DL signal, a DL signal/channel, transmission/reception of a DL signal/channel, DL reception, and DL transmission may be interchangeably interpreted. In the present disclosure, a UL channel, a UL signal, a UL signal/channel, transmission/reception of a UL signal/channel, UL reception, and UL transmission may be interchangeably interpreted.

In the present disclosure, a first TCI state may correspond to a first TRP. In the present disclosure, a second TCI state may correspond to a second TRP. In the present disclosure, an n th TCI state may correspond to an n th TRP.

In the present disclosure, a value of a first CORESET pool index (for example, 0), a value of a first TRP index (for example, 1), and a first TCI state (first DL/UL (joint/separate) TCI state) may correspond to each other. In the present disclosure, a value of a second CORESET pool index (for example, 1), a value of a second TRP index (for example, 2), and a second TCI state (second DL/UL (joint/separate) TCI state) may correspond to each other.

Note that each embodiment of the present disclosure below mainly describes a method for two TRPs in relation to application of a plurality of TCI states in transmission/reception using multi-TRP, but the number of TRPs may be three or more (more than one), and each embodiment may be applied so as to support the number of TRPs.

(Radio Communication Method)

A UE may receive one or more beam indications. In the present disclosure, the beam indication(s) may mean DCI for indicating one or more TCI states.

{Beam Indication Method 1}

The UE may receive one beam indication. The UE may determine/judge, based on a TCI field included in the one beam indication, a plurality of TCI states (corresponding to one or more respective TRPs).

Beam indication method 1 can be suitably applied in an ideal backhaul environment (for example, single DCI-based transmission).

For beam indication method 1, a minimum BAT may be defined in a non-ideal backhaul environment (for example, multi-DCI-based transmission). For beam indication method 1, an additional BAT corresponding to at least one of a plurality of TRPs may be defined in a non-ideal backhaul environment (for example, multi-DCI-based transmission).

Figures 12A, 12B:
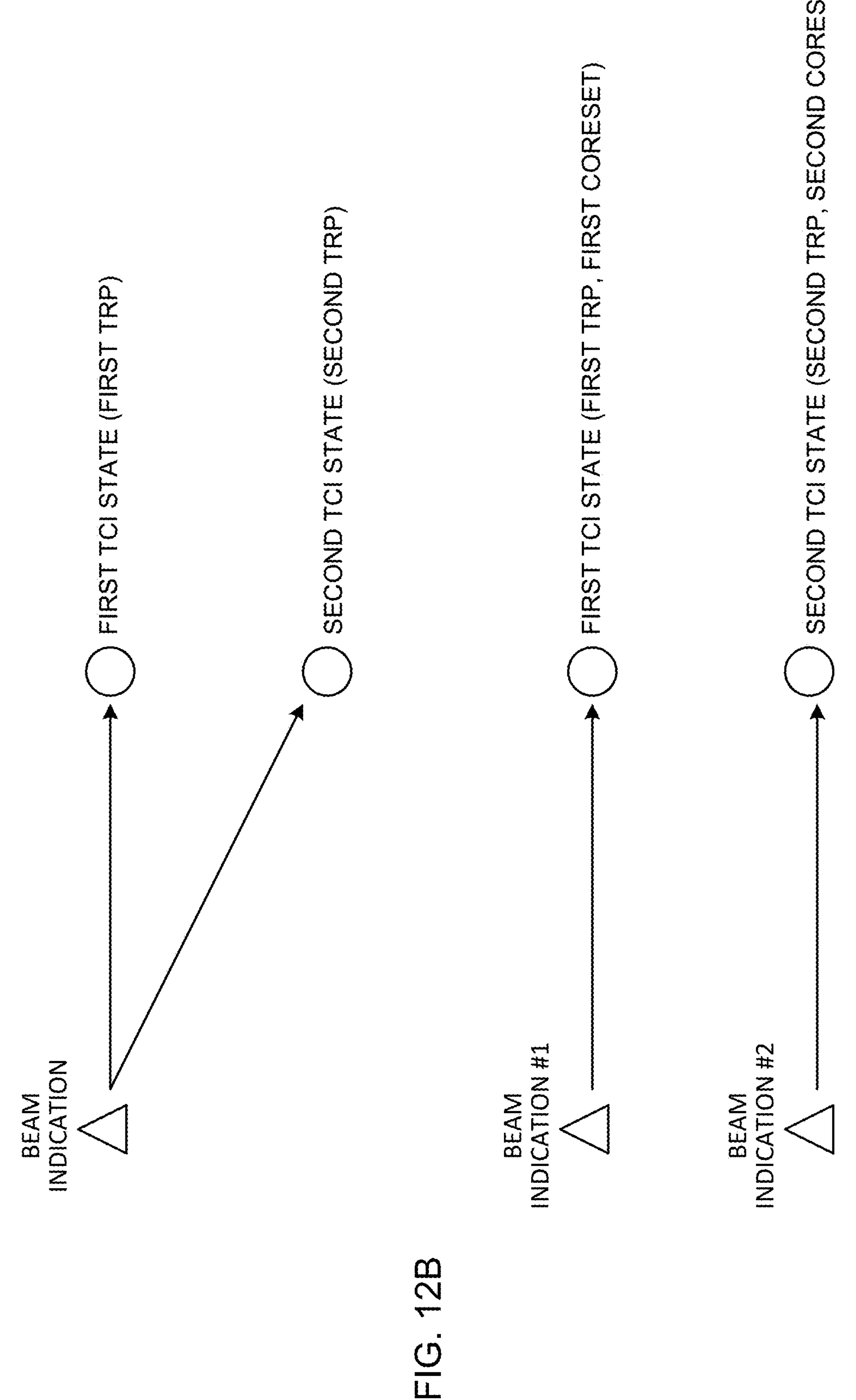
FIGS. 12A and 12B are diagrams to show beam indication method 1 and beam indication method 2, respectively.

FIG. 12A is a diagram to show an example of beam indication method 1. In FIG. 12A, the UE receives one beam indication. The one beam indication may indicate two TCI states (first TCI state and second TCI state). The UE judges the first TCI state and the second TCI state, based on one or more TCI fields included in the one beam indication. The first TCI state may correspond to a first TRP. The second TCI state may correspond to a second TRP.

{Beam Indication Method 2}

The UE may receive a plurality of (for example, two) beam indications. The UE may determine/judge, based on each of TCI fields included in the plurality of beam indications, one or more TCI states corresponding to each beam indication. For example, the UE may judge a first (DL/UL) TCI state, based on a first beam indication, and may judge a second (DL/UL) TCI state, based on a second beam indication.

The first beam indication/first TCI state may correspond to a first TRP/first CORESET pool index (for example, a CORESET pool index with a first value (for example, 0)/first CORESET (1st CORESETs). The second beam indication/second TCI state may correspond to a second TRP/second CORESET pool index (for example, a CORESET pool index with a second value (for example, 1)/second CORESET (2nd CORESETs).

Beam indication method 2 can be suitably applied in a non-ideal backhaul environment (for example, multi-DCI-based transmission).

FIG. 12B is a diagram to show an example of beam indication method 2. In FIG. 12B, the UE receives two beam indications. The UE judges the first TCI state, based on a TCI field included in a certain beam indication of the two beam indications. The UE judges the second TCI state, based on a TCI field included in another beam indication of the two beam indications.

In at least one of beam indication method 1 and beam indication method 2 above, one or more (N) UL TCI states and one or more (M) DL TCI states may be indicated for the UE.

For example, the beam indication/DCI may include a plurality of TCI fields for indicating a plurality of TCI states (for example, a DL TCI state and a UL TCI state). The UE may judge, based on the plurality of TCI fields, one or more (N) UL TCI states and one or more (M) DL TCI states.

FIG. 13A is a diagram to show an example of the TCI field included in the DCI. In FIG. 13A, the DCI includes a plurality of TCI fields for indicating TCI states (in the example in FIG. 13A, TCI field #1 and TCI field #2). The UE may judge, based on the TCI fields, one or more UL TCI states and one or more DL TCI states.

For example, the beam indication/DCI may include one TCI field for indicating a plurality of TCI states. The UE may judge, based on the plurality of TCI fields, one or more (N) UL TCI states and one or more (M) DL TCI states.

FIG. 13B is a diagram to show another example of the TCI field included in the DCI. Such correspondence between a codepoint of the TCI field and a plurality of (for example, two) TCI states as that shown in FIG. 13B may be preconfigured for the UE. The UE may judge, based on (a codepoint of) the TCI field included in the DCI, one or more UL TCI states and one or more DL TCI states. For example, when the TCI field included in the DCI indicates "100," the UE judges that a first DL/UL (joint) TCI state is TCI state #1 and that a second DL/UL (joint) TCI state is TCI state #0.

Note that in the present disclosure, the correspondence between (a codepoint of) the TCI field and the TCI states may be interpreted as control information/configuration information for mapping between (a codepoint of) the TCI field and the TCI states, and vice versa.

Note that in the example shown in FIG. 13B, the first joint TCI state and the second joint TCI state are described as TCI states corresponding to a codepoint of the TCI field, but TCI states corresponding to a TCI codepoint may be separate TCI states.

For example, the beam indication/DCI may include a plurality of TCI fields for indicating a plurality of TCI states. The UE may judge, based on the plurality of TCI fields, one or more (N) UL TCI states and one or more (M) DL TCI states.

A format of the DCI for indicating the TCI states may be a first DCI format (for example, a DCI format for scheduling a PDSCH (for example, DCI format 1_1/1_2)) and a second DCI format (for example, a DCI format for scheduling a PUSCH (for example, DCI format 0_1/0_2)).

Based on the first DCI format, a certain TCI state set (joint TCI states/separate (DL/UL) TCI states) may be indicated for the UE. Based on the second DCI format, another TCI state set may be indicated for the UE.

First Embodiment

In a first embodiment, a method for configuring/activating/indicating a TCI state will be described.

In the first embodiment, beam indication method 1 above may be used. In the first embodiment, beam indication method 2 above may be used.

A TCI state list/pool common to a plurality of TRPs (CORESET pool indices, locations/ranks of one TCI state of two TCI states (1st/2nd TCI state)) may be configured for a UE. Configuration of the TCI state list may be performed by using RRC signaling.

With respect to a plurality of (for example, all) TRPs, one or more TCI states may be activated for the UE by using a MAC CE.

The (maximum) number (for example, M) of activated TCI states may be a specific number (for example, M=8).

In a case of a joint TCI state, a DL/UL (joint) TCI state may be activated for the UE by using the MAC CE. Subsequently, a first DL/UL (joint) TCI state and a second DL/UL (joint) TCI state may be indicated for the UE by using DCI (beam indication) (see FIG. 14A).

In a case of a separate TCI state, a DL (separate) TCI state and a UL (separate) TCI state may be activated for the UE by using the MAC CE. Subsequently, a first DL (separate) TCI state and a first UL (separate) TCI state and a second DL (separate) TCI state and a second UL (separate) TCI state may be indicated for the UE by using the DCI (beam indication) (see FIG. 14B).

Figures 14A, 14B:
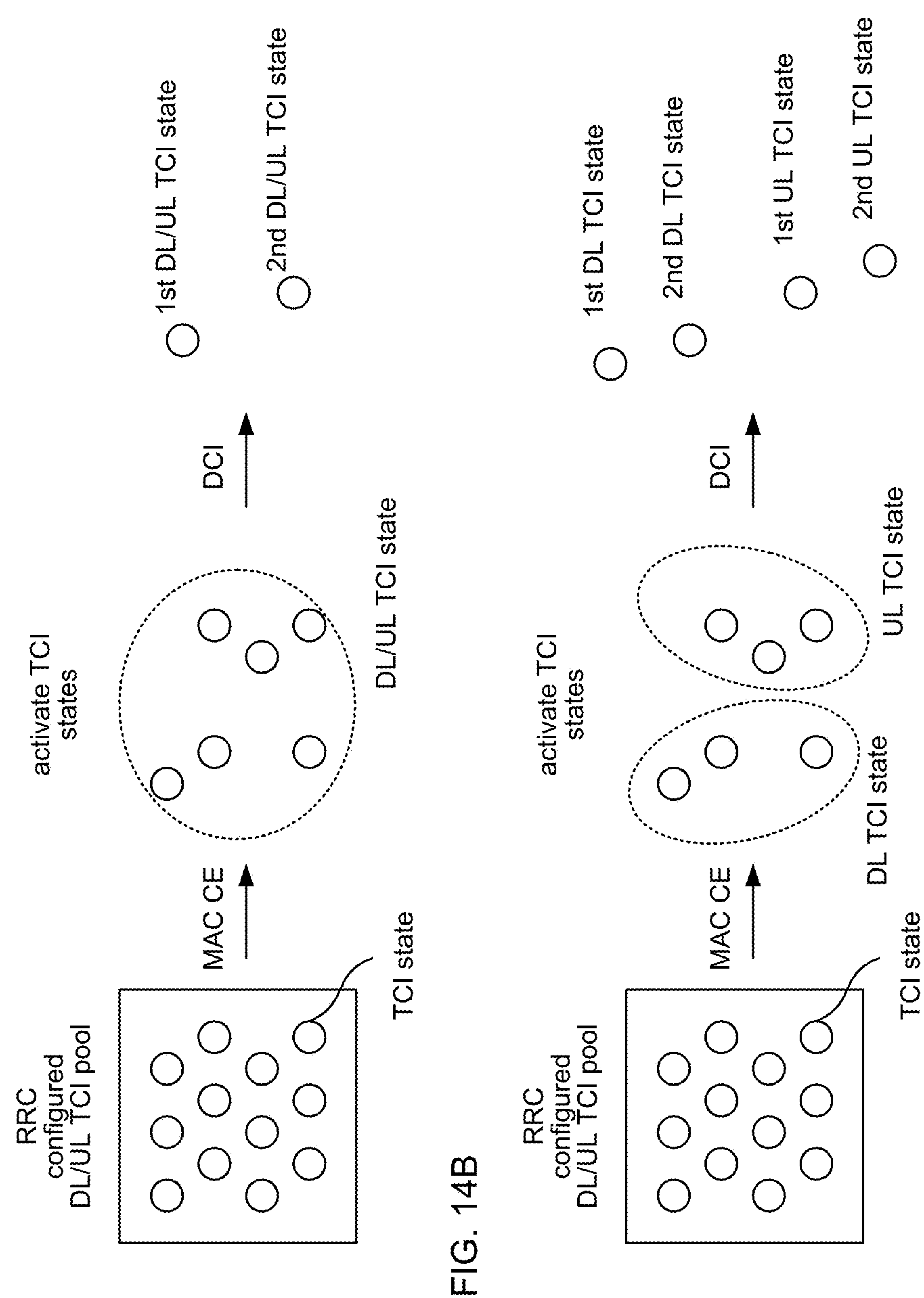
FIGS. 14A and 14B are diagrams to show examples of a joint TCI state activation/indication method and a separate TCI state activation/indication method, respectively.

Note that FIG. 14B shows an example in which different TCI states for a DL TCI state and a UL TCI state are activated for TCI states to be activated by the MAC CE, but the activated DL TCI state and UL TCI state may include a common TCI state even in a case of a separate TCI state.

<<TCI Field 1-1>>

A DCI format (for example, DCI format 1_1/1_2) may include a plurality of TCI fields (see FIG. 13A).

The plurality of TCI fields included in the DCI format may be limited to a specific condition (for example, at least one of a specific DCI format and DCI to which a Cyclic Redundancy Check (CRC) scrambled by a specific Radio Network Temporary Identifier (RNTI) is added.

For example, the specific DCI format may be a DCI format without DL assignment (for example, DCI format 1_1/1_2). The DCI format without DL assignment (for example, DCI format 1_1/1_2) does not include a specific field, and allows another reserved (unused) field/bit to be used for the second and subsequent TCI fields, and thus it is possible to configure DCI without increasing a total number of DCI payloads even in a case of a plurality of TCI fields.

<<TCI Field 1-2>>

A DCI format (for example, DCI format 1_1/1_2) may include one TCI field.

The UE may judge, based on one indicated TCI field, at least one of a first (DL/UL) TCI state and a second (DL/UL) TCI state.

A MAC CE (first MAC CE) for activating a TCI state indicated by DCI including a plurality of (for example, two) TCI fields (TCI field 1-1 above) and a MAC CE (second MAC CE) for activating a TCI state indicated by DCI including one TCI field (TCI field 1-2 above) may be separate MAC CEs.

For example, for a TCI state activated by the first MAC CE, either one joint (DL/UL) TCI state or one separate (DL/UL) TCI state may correspond to one TCI codepoint.

For example, for a TCI state activated by the second MAC CE, either a plurality of joint (DL/UL) TCI states or a plurality of separate (DL/UL) TCI states may correspond to one TCI codepoint.

In this case, the UE may judge the first TCI state, based on a TCI state corresponding to the TCI field and indicated as the first TCI state, and may judge the second TCI state, based on a TCI state corresponding to the TCI field and indicated as the second TCI state.

Thus, the above first and second MAC CEs are separate MAC CEs, thereby allowing TCI state indication to be flexibly performed based on the number of TCI fields included in DCI.

The first MAC CE and the second MAC CE may be a common MAC CE.

For example, for a TCI state activated by the MAC CE, a plurality of joint (DL/UL) TCI states/plurality of separate (DL/UL) TCI states may correspond to one TCI codepoint. When a TCI state is indicated for the UE by using a plurality of TCI fields included in one piece of DCI, the UE may judge the first TCI state, based on a TCI state corresponding to the TCI field and indicated as the first TCI state, and may judge the second TCI state, based on a TCI state corresponding to the TCI field and indicated as the second TCI state. When a TCI state is indicated for the UE by using one TCI field included in one piece of DCI, the UE may judge that a plurality of TCI states corresponding to the one TCI field are the first TCI state and the second TCI state.

Thus, the above first and second MAC CEs are a common MAC CE, thereby allowing a TCI state to be activated by using one MAC CE for reception of DCI including different numbers of TCI fields, and thus it is possible to suppress overhead.

The UE may be configured with joint TCI state-related correspondence between a TCI codepoint and a TCI state and separate TCI state-related correspondence between a TCI codepoint and a TCI state. The configuration may be performed by using higher layer signaling (RRC signaling/MAC CE).

For the UE, switching between use of joint TCI state-related correspondence between a TCI codepoint and a TCI state and use of separate TCI state-related correspondence between a TCI codepoint and a TCI state may be performed by using RRC signaling/MAC CE (refer to FIG. 15). According to this method, it is possible to perform switching between TCI state indication by DCI including one TCI field and TCI state indication including a plurality of TCI fields.

As shown in an example in FIG. 15, for example, in the joint TCI state-related correspondence, one or more (plurality of) joint TCI states may correspond to one TCI field codepoint.

As shown in the example in FIG. 15, for example, in the separate TCI state-related correspondence, one or more (plurality of) separate DL/UL TCI states may correspond to one TCI field codepoint. The one or more (plurality of) separate DL/UL TCI states corresponding to one codepoint may be at least one of a first DL TCI state, a first UL TCI state, a second DL TCI state, and a second UL TCI state.

The UE may be configured with joint/separate TCI state-related correspondence between a TCI codepoint and a TCI state (see FIG. 16). The configuration may be performed by using higher layer signaling (RRC signaling/MAC CE).

In the correspondence, a joint TCI state and a separate TCI state may correspond to one codepoint. For the UE, a joint TCI state and a separate TCI state may be indicated as a first (or second) TCI state and a second (or first) TCI state, respectively. The correspondence may be used for a case where a TCI state is indicated by DCI including one TCI field.

In an example shown in FIG. 16, a joint TCI state as the first TCI state and a separate TCI state as the second TCI state correspond to one TCI codepoint. The UE judges the first TCI state and the second TCI state, based on an indicated TCI field codepoint.

Note that the example shown in FIG. 16 describes the joint TCI state and the separate TCI state as the first TCI state and the second TCI state, respectively, but is just an example, and correspondence may be configured for the UE such that a separate TCI state and a joint TCI state correspond to one TCI codepoint as the first TCI state and the second TCI state, respectively.

The UE may be configured with joint/separate TCI state-related correspondence between a TCI codepoint and a TCI state (see FIG. 17). The configuration may be performed by using higher layer signaling (RRC signaling/MAC CE).

In the correspondence, at least one of a joint TCI state and a separate TCI state may correspond to one codepoint. In other words, the indicated first TCI state may be a joint TCI state or a separate TCI state, and the indicated second TCI state may be a joint TCI state or a separate TCI state. The correspondence may be used for a case where a TCI state is indicated by DCI including one TCI field.

In an example shown in FIG. 17, a joint TCI state or a separate TCI state (DL/UL) as the first TCI state and a joint TCI state or a separate TCI state (DL/UL) as the second TCI state correspond to one TCI codepoint. The UE judges the first TCI state and the second TCI state, based on an indicated TCI field codepoint.

For example, in the example shown in FIG. 17, when "100" is indicated for the UE as one TCI field codepoint, the UE determines (joint) DL/UL TCI state #4 as the first TCI state, and determines DL TCI state #4 and UL TCI state #5 as the second TCI state.

When a plurality of TCI states are activated and one TCI state is indicated for the UE, the UE may update/change the one indicated TCI state, and may continue/maintain a previous (indicated) TCI state for a non-indicated TCI state. Each TCI state may be a joint TCI state or a separate DL/UL TCI state. In this case, the UE may assume/judge transmission/reception using multi-TRP (plurality of TCI states).

When a plurality of TCI states are activated and one TCI state is indicated for the UE, the UE may apply only the one indicated TCI state. Each TCI state may be a joint TCI state or a separate DL/UL TCI state. In this case, the UE may judge transmission/reception using a single TRP (one TCI state) (falling back to transmission/reception using a single TRP).

The first embodiment may be applied to at least one of transmission/reception using single DCI-based multi-TRP (single DCI based M-TRP) and transmission/reception using multi-DCI-based multi-TRP (multi DCI based M-TRP).

When the first embodiment is applied to transmission/reception using multi-DCI-based multi-TRP (multi DCI based M-TRP), the first TCI state in the first embodiment may mean a TCI state of a DL channel/signal (for example, a PDCCH/PDSCH/CSI-RS) associated with a first CORESET, and the second TCI state in the first embodiment may mean a TCI state of a DL channel/signal (for example, a PDCCH/PDSCH/CSI-RS) associated with a second CORESET.

The first CORESET may be a CORESET corresponding to a CORESET with a CORESET pool index of a first value (for example, 0) or a CORESET for which a CORESET pool index is not configured (CORESET pool index is "absent"). The PDSCH/CSI-RS associated with the first CORESET may be a PDSCH/CSI-RS scheduled/activated by a PDCCH associated with the first CORESET.

The second CORESET may be a CORESET corresponding to a CORESET pool index of a second value (for example, 1). The PDSCH/CSI-RS associated with the second CORESET may be a PDSCH/CSI-RS scheduled/activated by a PDCCH associated with the second CORESET.

According to the first embodiment above, it is possible to appropriately indicate a plurality of TCI states by using one or a plurality of TCI fields.

Second Embodiment

In a second embodiment, association (mapping) between an indicated TCI state and each signal/channel will be described.

How to perform association (mapping) between an indicated plurality of TCI states and each signal/channel in operation using multi-TRP is an issue.

For example, in single DCI-based multi-TRP, at least two TCI states are necessary for a PDSCH. In multi-DCI-based multi-TRP, at least two TCI states are necessary for a PDSCH and a PDCCH. One TCI state is necessary for a signal/channel other than those (signal/channel other than the PDCCH and the PDSCH).

The UE may judge, based on beam indication (DCI), one or more TCI states to be applied to a signal/channel in multi-TRP.

Note that in the present disclosure, TCI state indication (beam indication) may be performed by using RRC signaling/MAC CE (in other words, the TCI state indication may be performed without using DCI).

Figures 18A, 18B:
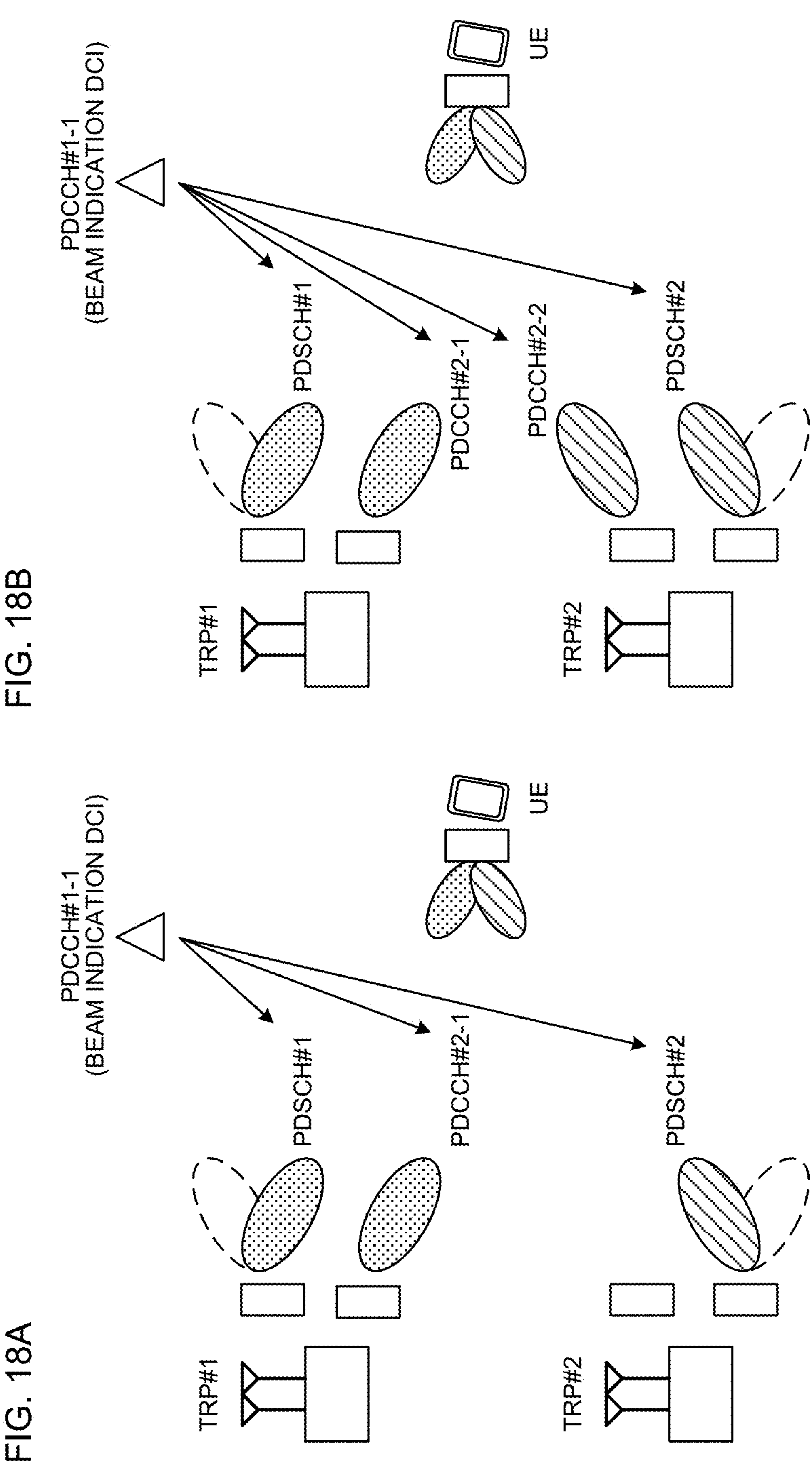
FIGS. 18A and 18B are diagrams to show examples of application of a TCI state in transmission/reception using multi-TRP.

FIGS. 18A and 18B are diagrams to show examples of application of a TCI state in transmission/reception using the multi-TRP. Note that PDSCHs and PDCCHs shown in FIGS. 18A and 18B may be transmitted from the same transmission panel/antenna of a certain TRP, or may be transmitted from different transmission panels/antennas.

FIG. 18A shows an example of scheduling of PDSCHs using the single DCI-based multi-TRP. In FIG. 18A, PDSCHs (PDSCH #1 and PDSCH #2) using multi-TRP (TRP #1 and TRP #2) are scheduled for the UE by using one PDCCH/DCI (PDCCH #2-1 corresponding to TRP #1). PDSCH #1 and PDSCH #2 correspond to TRP #1 and TRP #2, respectively.

The UE receives a PDCCH/DCI (PDCCH #1-1) as beam indication. The UE judges a first TCI state and a second TCI state indicated by the beam indication, and applies the first TCI state and the second TCI state to reception of each channel.

In the example shown in FIG. 18A, the first TCI state indicated by PDCCH #1-1 is applied to reception of PDCCH #2-1 and PDSCH #1 corresponding to TRP #1. The second TCI state indicated by PDCCH #1-1 is applied to reception of PDSCH #2 corresponding to TRP #2.

FIG. 18B shows an example of scheduling of PDSCHs using the multi-DCI-based multi-TRP. In FIG. 18B, for the UE, a PDSCH (PDSCH #1) using TRP #1 is scheduled by using a certain PDCCH/DCI (PDCCH #2-1 corresponding to TRP #1) and a PDSCH (PDSCH #2) using TRP #2 is scheduled by using another PDCCH/DCI (PDCCH #2-2 corresponding to TRP #2). PDSCH #1 and PDSCH #2 correspond to TRP #1 and TRP #2, respectively.

In FIG. 18B, the UE receives a PDCCH/DCI (PDCCH #1-1) as beam indication, in a manner similar to that in FIG. 18A. The UE judges a first TCI state and a second TCI state indicated by the beam indication, and applies the first TCI state and the second TCI state to reception of each channel.

In the example shown in FIG. 18B, the first TCI state indicated by PDCCH #1-1 is applied to reception of PDCCH #2-1 and PDSCH #1 corresponding to TRP #1. The second TCI state indicated by PDCCH #1-1 is applied to reception of PDCCH #2-2 and PDSCH #2 corresponding to TRP #2.

Correspondence (mapping) between an indicated TCI state and each channel/signal will be described below. Each channel/signal may be at least one of an arbitrary DL/UL channel and DL/UL signal. Alternatively, each channel/signal may be, for example, a channel/signal other than a PDSCH.

The UE may apply the indicated TCI state, based on at least one of a specific rule and configuration/indication.

For example, the UE may apply, to each channel/signal, a specific TCI state from among indicated first and second TCI states.

The specific TCI state may be, for example, the first TCI state (or second TCI state). When a first TCI state and a second TCI state are indicated, the UE may apply the first TCI state (or second TCI state) to transmission/reception of each channel/signal (for example, a PDCCH/CSI-RS/PUSCH/PUCCH/SRS). According to this method, it is possible to simplify UE operation.

A rule may be defined beforehand in relation to application of a TCI state for an SRS resource set. For example, when a plurality of (for example, two) SRS resource sets for codebook-based (CB-based) transmission are configured for the UE, the UE may apply a first TCI state to (transmission of an SRS associated with) a first SRS resource set, and may apply a second TCI state to (transmission of an SRS associated with) a second SRS resource set.

The UE may judge a TCI state to be applied to each channel/signal, based on configuration/indication from a network (for example, a base station).

For example, for the UE, which TCI state of the indicated first and second TCI states is applied may be configured/indicated by using RRC signaling/MAC CE/DCI.

The configuration/indication of which of the TCI states is applied may be performed for each specific resource. The specific resource may be at least one of a CORESET, a resource set, a resource, a resource group, a BWP, a component carrier (CC), and a serving cell. For the UE, which TCI state of the indicated first and second TCI states is applied may be configured/indicated for each configuration of the specific resource in each channel/signal.

According to this method, the network (base station)/UE can perform channel/signal transmission/reception by using each TRP.

FIGS. 19A and 19B are diagrams to show examples of a method for applying the indicated TCI state. For the UE, such joint TCI state-related correspondence as that shown in FIG. 19A is configured. Subsequently, TCI codepoint “010” is indicated for the UE by beam indication.

FIG. 19B shows configuration for application of the TCI state to each channel/signal. In the example shown in FIG. 19B, TCI state application for each CORESET is configured for a PDCCH, and TCI state application for each SRS resource set is configured for an SRS.

In FIG. 19B, for a TCI state to be applied to the PDCCH, application of a first TCI state in configuration of CORESET #1, application of a first TCI state in configuration of CORESET #2, and application of a second TCI state in configuration of CORESET #3 are configured. For a TCI state to be applied to the SRS, application of a first TCI state in configuration of SRS resource set #1, application of a second TCI state in configuration of SRS resource set #2, and application of a second TCI state in configuration of SRS resource set #3 are configured.

In the examples of the configurations shown in FIGS. 19A and 19B, the UE applies the indicated first TCI state, first TCI state, and second TCI state to reception of the PDCCH associated with CORESET #1, reception of the PDCCH associated with CORESET #2, and reception of the PDCCH associated with CORESET #3, respectively.

In the examples of the configurations shown in FIGS. 19A and 19B, the UE applies the indicated first TCI state, second TCI state, and second TCI state to transmission of the SRS associated with SRS resource set #1, transmission of the SRS associated with SRS resource set #2, and transmission of the SRS associated with SRS resource set #3, respectively.

FIGS. 19A and 19B above shows an example related to a joint TCI state, but the present embodiment can also be appropriately applied to a separate TCI state.

When the present embodiment is applied to the separate TCI state, a first DL TCI state may be applied as a first TCI state of a DL channel/signal, and a second DL TCI state may be applied as a second TCI state of the DL channel/signal. When the present embodiment is applied to the separate TCI state, a first UL TCI state may be applied as a first TCI state of a UL channel/signal, and a second UL TCI state may be applied as a second TCI state of the UL channel/signal.

For a channel other than a PDSCH (for example, a PUSCH), configuration/activation of a TCI state (either a first TCI state or a second TCI state) may be performed for each BWP/CC by using higher layer signaling (RRC signaling/MAC CE). In other words, the TCI state configuration/activation may be performed for each configuration of the channel (for example, PUSCH configuration (PUSCH-config)). For the channel other than the PDSCH (for example, the PUSCH), which TCI state of the first and second TCI states is applied may be configured for the UE for each BWP/CC/PUSCH configuration.

According to this, it is possible to perform switching between TRPs used by the UE, by using only higher layer signaling (RRC signaling/MAC CE). Note that, as in an existing specification, switching to a UL beam (UL TCI state) for a TRP as a switching destination may be performed based on (SRI field included in) scheduling DCI for scheduling a PUSCH.

For a channel other than a PDSCH (for example, a PUSCH), configuration/activation of a TCI state (either or both a first TCI state and/or a second TCI state) may be performed for each BWP/CC by using higher layer signaling (RRC signaling/MAC CE). In other words, the TCI state configuration/activation may be performed for each configuration of the channel (for example, PUSCH configuration (PUSCH-config)). For the channel other than the PDSCH (for example, the PUSCH), one or two TCI states of the first and second TCI states may be configured/activated for the UE for each BWP/CC/PUSCH configuration.

When a plurality of (two) TCI states (first TCI state and second TCI state) are configured/activated for the UE, any one TCI state of the configured/activated plurality of TCI states may be indicated by using scheduling DCI for scheduling the channel (for example, DCI format 0_1/0_2). The UE may apply the indicated TCI state to transmission/reception of the channel.

A new DCI field defined in Rel. 17 (or later versions) may be used for the indication of the TCI state. An existing DCI field (for example, an SRI field) may be used for the indication of the TCI state. A combination of special fields of existing DCI (for example, a combination of an SRI field and a field other than the SRI field or a combination of a plurality of fields other than the SRI field) may be used for the indication of the TCI state.

Figures 20A, 20B, 20C, 20D:
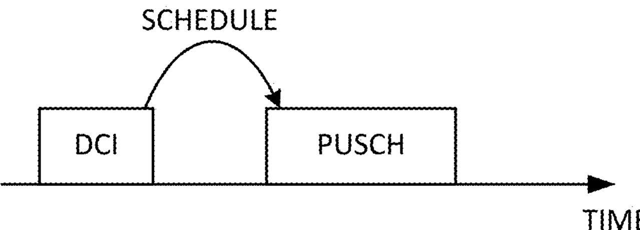
FIGS. 20A to 20D are diagrams to show examples of mapping between a PUSCH and a TCI state.

FIGS. 20A to 20D are diagrams to show examples of mapping between the PUSCH and the TCI state. In an example shown in FIG. 20A, correspondence between a TCI codepoint included in beam indication and a plurality of joint TCI states is configured/activated for the UE. As shown in FIG. 20B, a PUSCH configuration (PUSCH-config) is notified to the UE by using RRC signaling. Furthermore, in the PUSCH configuration, two TCI states (first TCI state and second TCI state) are configured. In an example shown in FIG. 20C, correspondence between (codepoint 0 or 1 of) a DCI field included in the scheduling DCI for the PUSCH and a TCI state (location/rank of the TCI state, first TCI state or second TCI state) is configured/defined.

In the example shown in FIG. 20A, TCI codepoint “010” is notified to the UE by the beam indication. The UE judges that the first TCI state and the second TCI state are TCI state #4 and TCI state #5, respectively.

In an example shown in FIG. 20D, codepoint “0” of the DCI field included in the scheduling DCI is notified to the UE, thereby notifying the UE that a TCI state to be applied to the PUSCH is the first TCI state. The UE applies the first TCI state (in other words, TCI state #4) to perform transmission of the PUSCH.

Note that FIGS. 20A to 20D show examples of configuration/indication of a joint TCI state, but can also be applied to configuration/indication of a separate TCI state.

For a channel other than a PDSCH (for example, a PUCCH), configuration/activation of a TCI state (either a first TCI state or a second TCI state) may be performed for each BWP/CC by using higher layer signaling (RRC signaling/MAC CE). In other words, the TCI state configuration/activation may be performed for each configuration of the channel (for example, PUCCH configuration (PUCCH-config)). For the channel other than the PDSCH (for example, the PUCCH), which TCI state of the first and second TCI states is applied may be configured for the UE for each BWP/CC/PUCCH configuration.

According to this, it is possible to perform switching between TRPs used by the UE, by using only higher layer signaling (RRC signaling/MAC CE). Note that, as in an existing specification, a UL beam (UL TCI state) may be switched by selecting a different PUCCH resource/PUCCH resource group, based on (PUCCH resource indicator (PRI) field included in) scheduling DCI for scheduling a PDSCH.

For a channel other than a PDSCH (for example, a PUCCH), configuration/activation of a TCI state (either or both a first TCI state and/or a second TCI state) may be performed for each BWP/CC/resource/resource group by using higher layer signaling (RRC signaling/MAC CE). In other words, the TCI state configuration/activation may be performed for each configuration of the channel (for example, PUCCH configuration (PUCCH-config)).

For the channel other than the PDSCH (for example, the PUCCH), one or two TCI states of the first and second TCI states may be configured/activated for the UE for each BWP/CC/PUCCH configuration/resource/resource group.

When a plurality of (two) TCI states (first TCI state and second TCI state) are configured/activated for the UE, any one TCI state of the configured/activated plurality of TCI states may be indicated by using scheduling DCI for scheduling the PDSCH (for example, DCI format 1_1/1_2). The UE may apply the indicated TCI state to transmission/reception of the channel.

A new DCI field defined in Rel. 17 (or later versions) may be used for the indication of the TCI state. An existing DCI field (for example, a PRI field) may be used for the indication of the TCI state. A combination of special fields of existing DCI (for example, a combination of a PRI field and a field other than the PRI field or a combination of a plurality of fields other than the PRI field) may be used for the indication of the TCI state.

Figures 21A, 21B, 21C:
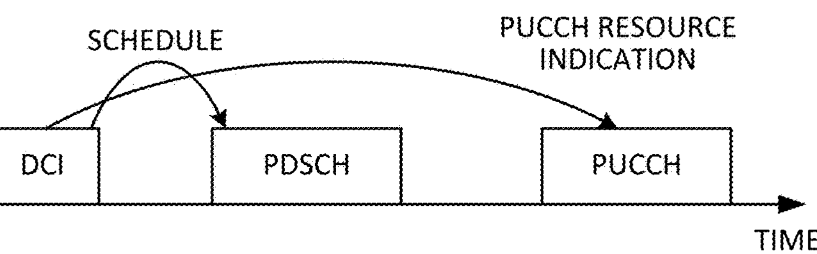
FIGS. 21A to 21C are diagrams to show examples of mapping between a PUCCH and a TCI state.

FIGS. 21A to 21C are diagrams to show examples of mapping between the PUCCH and the TCI state. In an example shown in FIG. 21A, correspondence between a TCI codepoint included in beam indication and a plurality of joint TCI states is configured/activated for the UE. As shown in FIG. 21B, a PUCCH configuration (PUCCH-config) is notified to the UE by using RRC signaling. Furthermore, in the PUCCH configuration, two TCI states (first TCI state and second TCI state) are configured. In the PUCCH configuration, PUCCH resource #1 (or PUCCH resource group #1) and a first TCI state are associated with each other, and PUCCH resource #2 (or PUCCH resource group #2) and a second TCI state are associated with each other.

In the example shown in FIG. 21A, TCI codepoint "010" is notified to the UE by the beam indication. The UE judges that the first TCI state and the second TCI state are TCI state #4 and TCI state #5, respectively.

In an example shown in FIG. 21C, PUCCH resource #1 is indicated by the scheduling DCI for the UE, and a case that a TCI state to be applied to the PUCCH is the first TCI state is notified to the UE. The UE applies the first TCI state (in other words, TCI state #4) to perform transmission of the PUCCH.

Note that FIGS. 21A to 21C show examples of configuration/indication of a joint TCI state, but can also be applied to configuration/indication of a separate TCI state.

According to the second embodiment above, it is possible to appropriately perform association/mapping between a configured/activated/indicated TCI state and each channel/signal.

Third Embodiment

In a third embodiment, a BAT will be described.

In the third embodiment, beam indication method 1 above may be used.

In the third embodiment, a plurality of TCI states (first TCI state and second TCI state) may be indicated for a UE by using beam indication (DCI).

The UE may judge/determine a timing until application of a plurality of indicated TCI states, based on at least one of Embodiment 3-1 and Embodiment 3-2 described below.

In the present disclosure, the BAT may mean a timeline (timing, time necessary for application, application time, K symbols) from reception of beam indication (DCI) until application of a TCI state indicated by the beam indication.

Embodiment 3-1

The UE may judge/determine a BAT related to the first TCI state and a BAT related to the first TCI state, based on configuration of subcarrier spacing (SCS).

For example, the UE may judge that the same BAT is applied to a BAT for a channel/signal in a BWP with configuration of the same SCS. In other words, the BAT may be determined/defined based on SCS configuration.

According to Embodiment 3-1, it is possible to simplify UE implementation.

Embodiment 3-2

The BAT related to the first TCI state (first BAT) and the BAT related to the second TCI state (second BAT) may be defined separately.

For example, the first BAT and the second BAT may be BATs of different lengths.

The BAT related to the first TCI state and the BAT related to the second TCI state will be described below as the first BAT and the second BAT, respectively, but the correspondence is not limited to this. In other words, the BAT related to the first TCI state and the BAT related to the second TCI state may be the second BAT and the first BAT, respectively.

In the present disclosure, the first BAT may be interpreted as a BAT in a case of non-cross scheduling, a BAT in a case of indication of a TCI state in a TRP to which beam indication is transmitted, a smaller (shorter) BAT, or the like, and vice versa. In the present disclosure, the second BAT may be interpreted as a BAT in a case of cross scheduling, a BAT in a case of indication of a TCI state in a TRP to which beam indication is not transmitted, a larger (longer) BAT, or the like, and vice versa.

In the present disclosure, the first BAT and the second BAT may be interchangeably interpreted. In the present disclosure, "larger," "longer," "smaller," and "shorter" may be interchangeably interpreted.

For the first BAT, the UE may judge that at a timing after at least specific time (for example, after K symbols) from (start symbol/last symbol for) reception of DCI for indicating a TCI state, application of the TCI state is started.

For the first BAT, the UE may judge that at a timing after at least specific time (for example, after K symbols) from completion of transmission (last symbol) of a HARQ-ACK (for example, an ACK) for a PDSCH scheduled by using DCI for indicating a TCI state, application of the TCI state is started.

For the first BAT, the UE may judge that at a timing after at least specific time (for example, after K symbols) from completion of transmission (last symbol) of a HARQ-ACK for DCI for indicating a TCI state, application of the TCI state is started.

This K may be determined based on higher layer signaling (RRC parameter) based on capability information (UE Capability Information, for example, "timeDuration-ForQCL-rel18") reported by the UE. Note that the BAT for specific subcarrier spacing may be configured for a plurality of (for example, all) CCs/BWPs in which a common TCI state ID of a common TCI state in carrier aggregation (CA) is configured.

The UE may judge that the second BAT is a timing of a length obtained by adding additional time to the first BAT.

Embodiment 3-2 is subdivided into Embodiment 3-2-1 to Embodiment 3-2-3 below. The UE may judge the BAT in accordance with at least one of Embodiment 3-2-1 to Embodiment 3-2-3 below.

Embodiment 3-2-1

As mentioned above, for the first BAT, the UE may judge that at a timing after at least specific time (for example, after K symbols) from (start/last symbol for) reception of DCI for indicating a TCI state, application of the TCI state is started.

As mentioned above, for the first BAT, the UE may judge that at a timing after at least specific time (for example, after K symbols) from completion of transmission (last symbol) of a HARQ-ACK (for example, an ACK) for a PDSCH scheduled by using DCI for indicating a TCI state, application of the TCI state is started.

The UE may judge that the second BAT is a timing of a length obtained by adding specific time to the first BAT.

The specific time may be indicated by a specific time resource/time unit. The specific time resource/time unit may be, for example, at least one of ms, symbol(s), slot(s), and sub-slot(s). For example, the specific time may be represented by X ms, Y symbols/slots/sub-slots (X and Y are arbitrary numbers).

The specific time may be defined beforehand by a specification, may be configured for the UE by using higher layer signaling, or may be determined based on reported UE capability information.

The specific time may be a value depending on an SCS configuration. The specific time may be a value common to a plurality of (for example, all) SCS configurations.

Embodiment 3-2-2

The UE may judge that a BAT related to a TCI state associated with a TRP (TRP index) that receives beam indication is a smaller BAT. The UE may judge that a BAT related to a TCI state not associated with the TRP (TRP index) that receives the beam indication is a larger BAT.

The UE may judge that the smaller BAT is a timing after the specific time (for example, after K symbols above) from (start/last symbol for) reception of the DCI for indicating the TCI state.

The smaller BAT may be the same as a BAT defined in Rel. 17, or may be a BAT different from the BAT (for example, a BAT represented by a new parameter, a BAT having a field size larger than a field size (number of bits) of the BAT defined in Rel. 17).

The smaller BAT/larger BAT may be indicated by a specific time resource/time unit. The specific time resource/time unit may be, for example, at least one of ms, symbol(s), slot(s), and sub-slot(s). For example, the specific time may be represented by X ms, Y symbols/slots/sub-slots (X and Y are arbitrary numbers).

The smaller BAT/larger BAT may be defined beforehand by a specification, may be configured for the UE by using higher layer signaling, or may be determined based on reported UE capability information.

The smaller BAT/larger BAT may be a value depending on an SCS configuration. The smaller BAT/larger BAT may be a value common to a plurality of (for example, all) SCS configurations.

The UE may judge that the larger BAT is a timing of a length obtained by adding specific time to the smaller BAT.

The specific time may be indicated by a specific time resource/time unit. The specific time resource/time unit may be, for example, at least one of ms, symbol(s), slot(s), and sub-slot(s). For example, the specific time may be represented by X ms, Y symbols/slots/sub-slots (X and Y are arbitrary numbers).

The specific time may be defined beforehand by a specification, may be configured for the UE by using higher layer signaling, or may be determined based on reported UE capability information.

The specific time may be a value depending on an SCS configuration. The specific time may be a value common to a plurality of (for example, all) SCS configurations.

Figure 22:
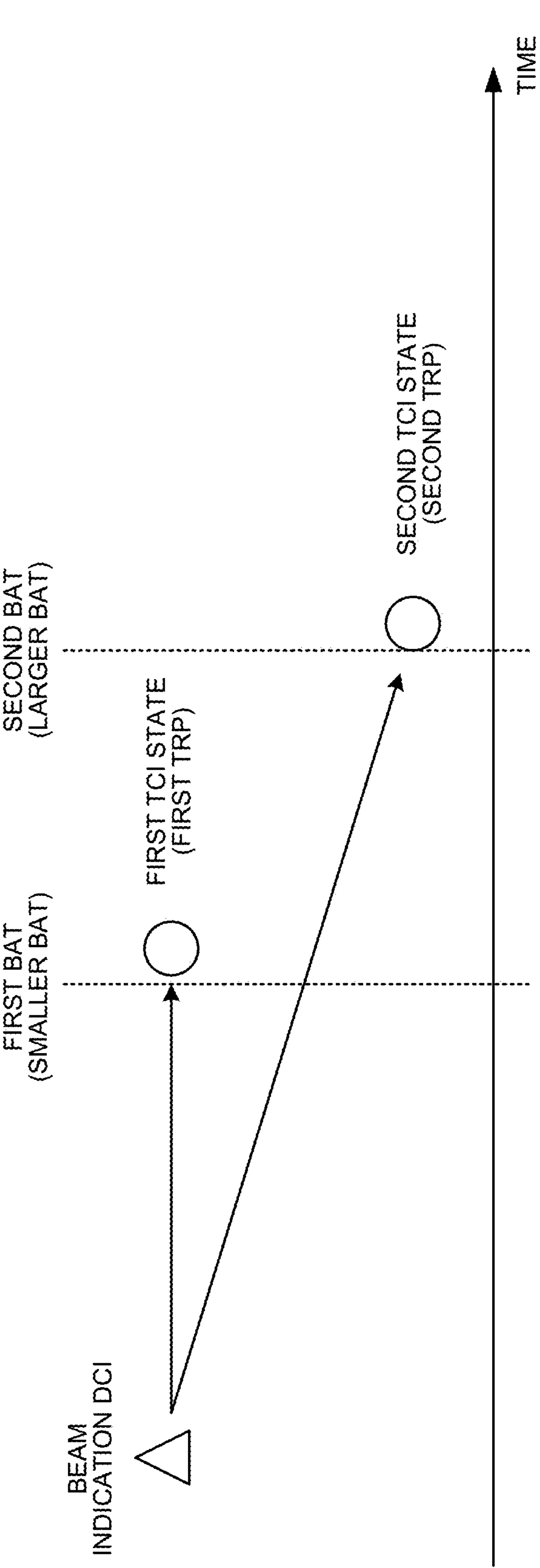
FIG. 22 is a diagram to show an example of a BAT according to Embodiment 3-2-2.

FIG. 22 is a diagram to show an example of the BAT according to Embodiment 3-2-2.

In FIG. 22, the UE receives beam indication DCI, and a first TCI state and a second TCI state are indicated for the UE. In the example shown in FIG. 22, the first TCI state is associated with a TRP to which the beam indication DCI is transmitted, and the second TCI state is not associated with the TRP to which the beam indication DCI is transmitted.

As shown in FIG. 22, the UE judges that a BAT related to the first TCI state is a smaller BAT, judges that a BAT related to the second TCI state is a larger BAT, and judges a start timing of TCI state application.

Embodiment 3-2-3

The UE may judge that a BAT related to a TCI state associated with a TRP (TRP index) that receives beam indication is a smaller BAT. The UE may judge that a BAT related to a TCI state not associated with the TRP (TRP index) that receives the beam indication is a larger BAT.

For the smaller BAT, the UE may judge that at a timing after at least specific time (for example, after K symbols) from completion of transmission (last symbol) of (PUSCH/PUCCH for communicating) a HARQ-ACK for a PDSCH scheduled by using DCI for indicating a TCI state, application of the TCI state is started.

For the smaller BAT, the UE may judge that at a timing after at least specific time (for example, after K symbols) from completion of transmission (last symbol) of (PUSCH/PUCCH for communicating) a HARQ-ACK for DCI for indicating a TCI state, application of the TCI state is started.

The smaller BAT may be the same as a BAT defined in Rel. 17, or may be a BAT different from the BAT (for example, a BAT represented by a new parameter, a BAT having a field size larger than a field size (number of bits) of the BAT defined in Rel. 17).

The smaller BAT/larger BAT may be indicated by a specific time resource/time unit. The specific time resource/time unit may be, for example, at least one of ms, symbol(s), slot(s), and sub-slot(s). For example, the specific time may be represented by X ms, Y symbols/slots/sub-slots (X and Y are arbitrary numbers).

The smaller BAT/larger BAT may be defined beforehand by a specification, may be configured for the UE by using higher layer signaling, or may be determined based on reported UE capability information.

The smaller BAT/larger BAT may be a value depending on an SCS configuration. The smaller BAT/larger BAT may be a value common to a plurality of (for example, all) SCS configurations.

The UE may judge that the larger BAT is a timing of a length obtained by adding specific time to the smaller BAT.

The specific time may be indicated by a specific time resource/time unit. The specific time resource/time unit may be, for example, at least one of ms, symbol(s), slot(s), and sub-slot(s). For example, the specific time may be represented by X ms, Y symbols/slots/sub-slots (X and Y are arbitrary numbers).

The specific time may be defined beforehand by a specification, may be configured for the UE by using higher layer signaling, or may be determined based on reported UE capability information.

The specific time may be a value depending on an SCS configuration. The specific time may be a value common to a plurality of (for example, all) SCS configurations.

Figure 23:
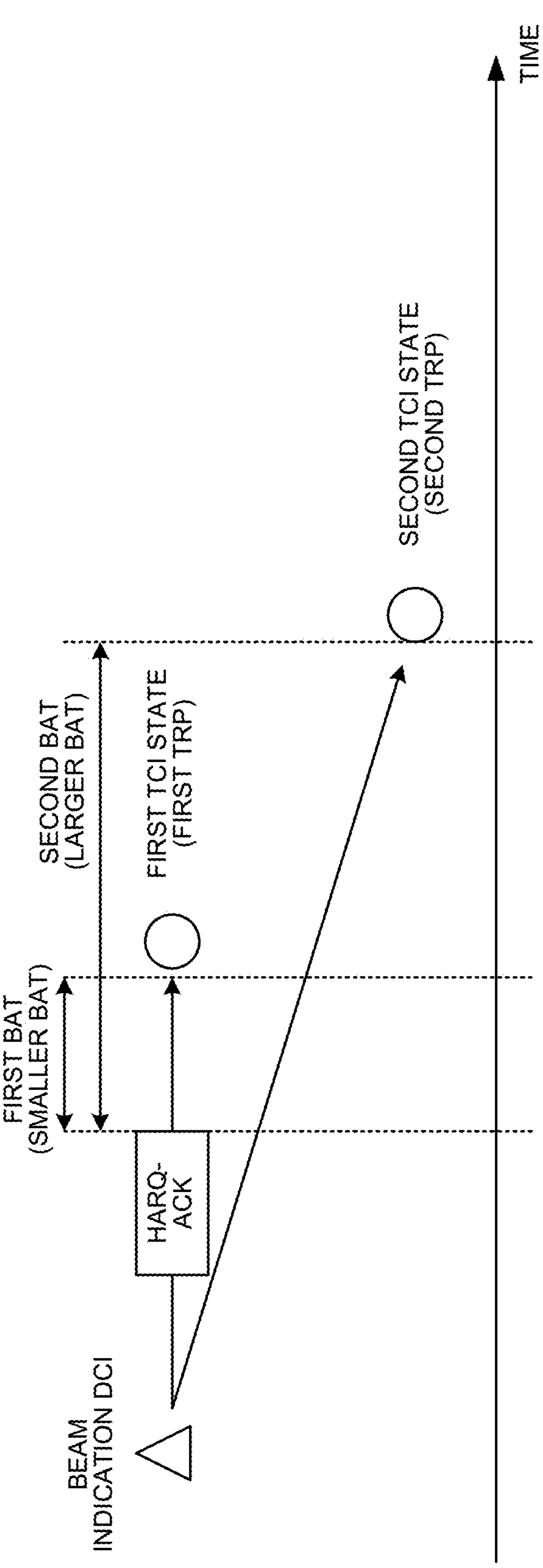
FIG. 23 is a diagram to show an example of a BAT according to Embodiment 3-2-3.

FIG. 23 is a diagram to show an example of the BAT according to Embodiment 3-2-3.

In FIG. 23, the UE receives beam indication DCI, and a first TCI state and a second TCI state are indicated for the UE. In the example shown in FIG. 23, the first TCI state is associated with a TRP to which the beam indication DCI is transmitted, and the second TCI state is not associated with the TRP to which the beam indication DCI is transmitted. The UE transmits, in a PUSCH/PUCCH, a HARQ-ACK associated with the beam indication DCI.

As shown in FIG. 23, the UE judges that a BAT related to the first TCI state is a smaller BAT, judges that a BAT related to the second TCI state is a larger BAT, and judges a timing of TCI state application. In the example shown in FIG. 23, the UE judges that time from a last symbol of (PUCCH/PUSCH for communicating) the HARQ-ACK until specific time is the smaller BAT/larger BAT.

According to the third embodiment above, it is possible to appropriately determine/judge a timing of TCI state application even when a plurality of TCI states are indicated by one beam indication.

Fourth Embodiment

In a fourth embodiment, beam indication method 2 above may be used.

In the present disclosure, a first CORESET (1st CORESETs), a CORESET with a CORESET pool index of a first value (for example, 0), a CORESET of CORESET pool index for which a CORESET pool index is not configured (is "absent"), and a CORESET associated with a first TRP may be interchangeably interpreted.

In the present disclosure, a second CORESET (2nd CORESETs), a CORESET with a CORESET pool index of a second value (for example, 1), and a CORESET associated with a second TRP may be interchangeably interpreted.

For beam indication DCI associated with the first CORESET, a TCI state indicated by the beam indication may be applied as a TCI state associated with at least one of the first CORESET and a first TCI state (TRP).

For beam indication DCI associated with the second CORESET, a TCI state indicated by the beam indication may be applied as a TCI state associated with at least one of the second CORESET and a second TCI state (TRP).

The second embodiment above may be appropriately applied even in a case where beam indication method 2 above is used and where a plurality of TCI states are indicated for a UE.

For the UE, a CORESET pool index and a plurality of TCI states (first TCI state/second TCI state) may be configured for each channel/signal/resource/resource set/CORESET/resource group.

For the UE, association between each channel/signal/resource/resource set/CORESET/resource group and a plurality of TCI states (first TCI state/second TCI state) may be configured/indicated.

The UE may apply one TCI state of the plurality of TCI states (first TCI state/second TCI state) to transmission/reception of each channel/signal, based on the above association/configuration.

For example, when the above association is not configured for the UE, the UE may apply a specific TCI state of the plurality of TCI states (for example, first (or second) TCI state) to each channel/signal/resource/resource set/CORESET/resource group.

Each channel/signal/resource/resource set/CORESET/resource group and a CORESET pool index/TRP index may be associated with each other. For each channel/signal/resource/resource set/CORESET/resource group, a CORESET pool index/TRP index may be configured.

For the UE, a TCI state list/pool common to a plurality of CORESET pool indices (TRPs) may be configured. Configuration of the TCI state list may be performed by using RRC signaling.

In this case, for the TCI state list, one or more TCI states for each CORESET pool index may be activated by using a MAC CE.

The (maximum) number (for example, M) of activated TCI states may be a specific number (for example, M=8). The (maximum) number of activated TCI states may be a common value or a different value for each of the CORESET pool indices.

Activated TCI states corresponding to different CORESET pool indices may include the same TCI state. In other words, one TCI state may correspond to a plurality of CORESET pool indices.

Activated TCI states corresponding to different CORESET pool indices may all be different TCI states. In other words, one TCI state may correspond to one CORESET pool index.

Figure 24:
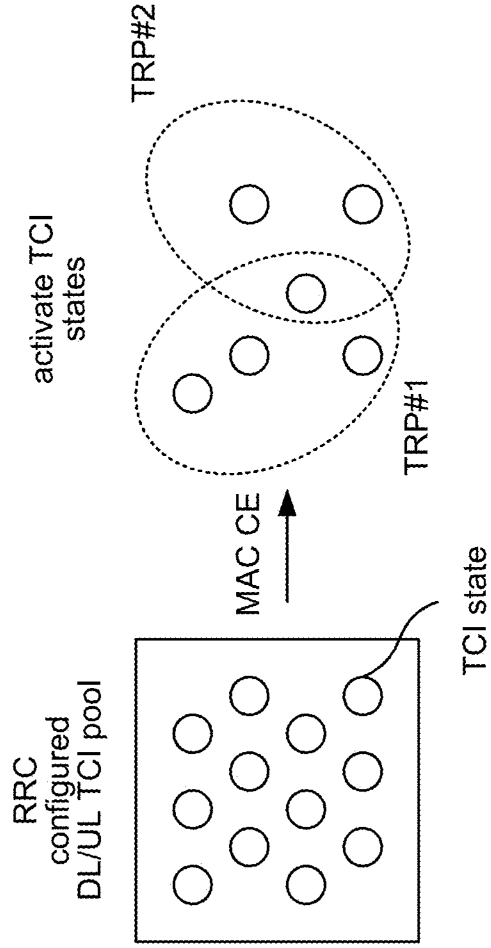
FIG. 24 is a diagram to show an example of TCI state activation according to a fourth embodiment.

FIG. 24 is a diagram to show an example of the TCI state activation according to the fourth embodiment. In the example shown in FIG. 24, a TCI state list common to a plurality of CORESET pool indices is configured by using RRC signaling. Subsequently, a TCI state for a first CORESET pool index (TRP #1) and a TCI state for a second CORESET pool index (TRP #2), from among the TCI state list, are activated by a MAC CE.

For the UE, a separate TCI state list/pool for each of the plurality of CORESET pool indices (TRPs) may be configured. Configuration of the TCI state list may be performed by using RRC signaling.

For the UE, one or more TCI states for each of the plurality of CORESET pool indices (TRPs) may be activated by using a MAC CE.

The (maximum) number (for example, M) of activated TCI states may be a specific number (for example, M=8). The (maximum) number of activated TCI states may be a common value or a different value for each of the CORESET pool indices.

A MAC CE for activating a TCI state for a certain CORESET pool index and a MAC CE for activating a TCI state for another CORESET pool index may be a common MAC CE or different MAC CEs.

Figures 25A, 25B:
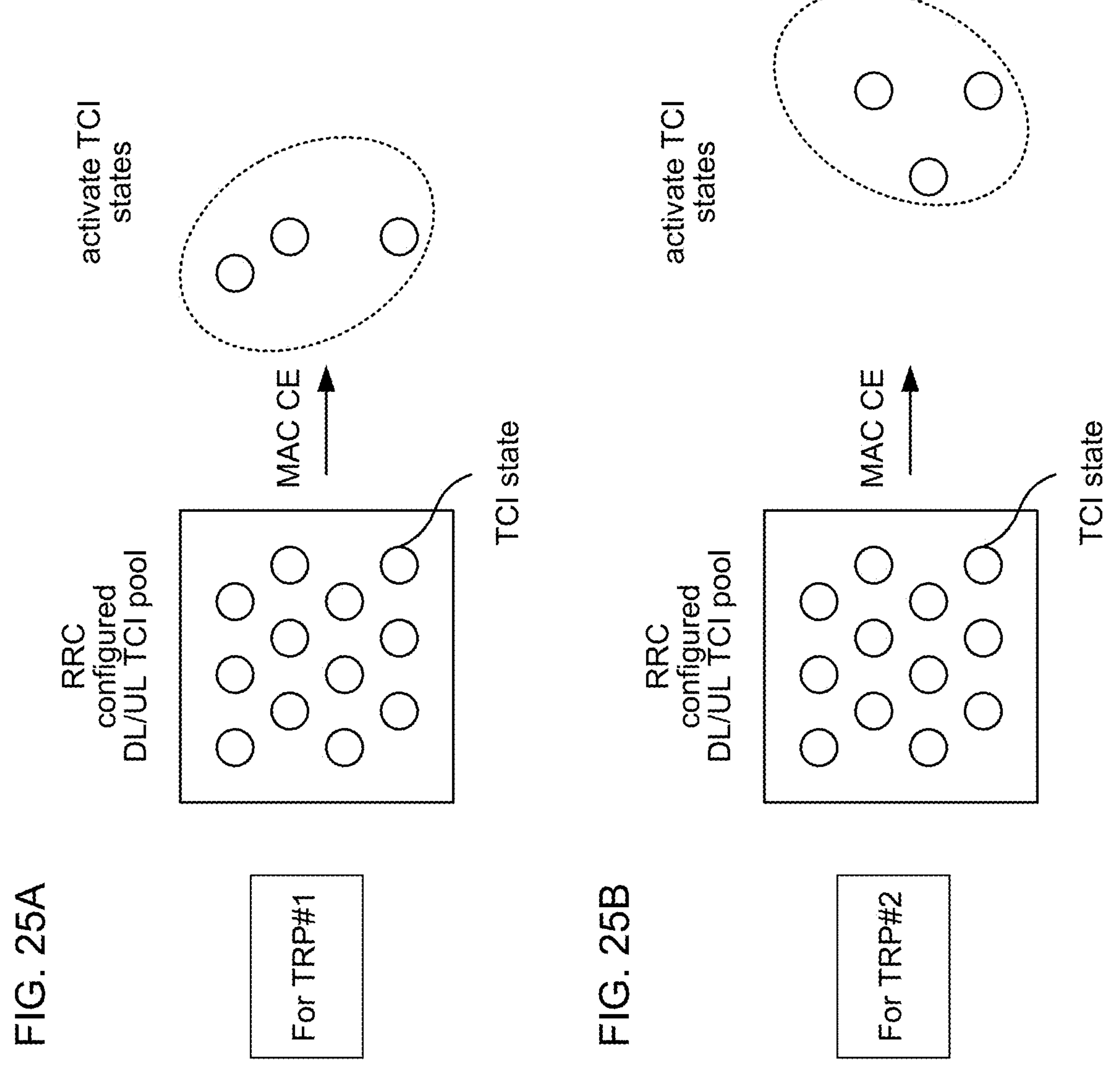
FIGS. 25A and 25B are diagrams to show other examples of the TCI state activation according to the fourth embodiment.

FIGS. 25A and 25B are diagrams to show other examples of the TCI state activation according to the fourth embodiment. In the examples shown in FIGS. 25A and 25B, a separate TCI state list is configured for each of the plurality of CORESET pool indices by using RRC signaling (FIG. 25A shows a list for TRP #1, and FIG. 25B shows a list for TRP #2). Subsequently, a TCI state for a first CORESET pool index (TRP #1) and a TCI state for a second CORESET pool index (TRP #2), from among the TCI state lists, are each activated by a MAC CE.

For the UE, correspondence between (sets of) TCI states separately activated for the respective CORESET pool indices (TRPs) and TCI codepoints may be configured. For example, the above correspondence related to different CORESET pool indices may be different correspondences.

By using one beam indication DCI (for example, a DCI format with/without DL assignment), one TCI state (joint TCI state, separate DL/UL TCI state) for a TRP (CORESET pool index) corresponding to the DCI may be indicated for the UE.

The indicated TCI state may be applied to a plurality of channels/signals associated with the same CORESET pool index (TRP) (at least one of a UL channel/signal and a DL channel/signal).

FIGS. 26A and 26B are diagrams to show the TCI state-related correspondences according to the fourth embodiment. As shown in FIGS. 26A and 26B, correspondence between TCI states related to the first CORESET pool index (TRP #1) and TCI codepoints (see FIG. 26A) and correspondence between TCI states related to the second CORESET pool index (TRP #2) and TCI codepoints (see FIG. 26B) are configured for the UE.

In the examples shown in FIGS. 26A and 26B, for the UE, TCI codepoint “011” and TCI codepoint “101” are indicated by beam indication DCI associated with TRP #1 and beam indication DCI associated with TRP #2, respectively. In this case, the UE applies TCI state #3 to a plurality of channels/signals associated with TRP #1 and applies TCI state #13 to a plurality of channels/signals associated with TRP #2.

According to the fourth embodiment above, it is possible to appropriately indicate a TCI state to be applied to a plurality of channels/signals even when a plurality of beam indications are indicated by using a plurality of TPRs.

Fifth Embodiment

In a fifth embodiment, a BAT will be described.

In the fifth embodiment, beam indication method 2 above may be used.

A UE may judge the BAT for each CORESET pool index.

For beam indication DCI (first beam indication DCI) associated with a first CORESET pool index, the UE may judge that at a timing after at least specific time (for example, after K symbols) from completion of transmission (last symbol) of (PUSCH/PUCCH for communicating) a HARQ-ACK associated with the first beam indication DCI, application of the TCI state is started.

For beam indication DCI (second beam indication DCI) associated with a second CORESET pool index, the UE may judge that at a timing after at least specific time (for example, after K symbols) from completion of transmission (last symbol) of (PUSCH/PUCCH for communicating) a HARQ-ACK associated with the second beam indication DCI, application of the TCI state is started.

In the present disclosure, the HARQ-ACK associated with the beam indication DCI may mean a HARQ-ACK for a PDSCH scheduled by the beam indication DCI or a HARQ-ACK for the beam indication DCI.

For beam indication DCI (first beam indication DCI) associated with a first CORESET pool index, the UE may judge that at a timing after at least specific time (for example, after K symbols) from (start/last symbol for) reception of the first beam indication DCI, application of an indicated TCI state is started.

For beam indication DCI (second beam indication DCI) associated with a second CORESET pool index, the UE may judge that at a timing after at least specific time (for example, after K symbols) from (start/last symbol for) reception of the second beam indication DCI, application of an indicated TCI state is started.

Lengths (values) of BATs associated with different CORESET pool indices (TRPs) may be the same length (value). For example, a length of a BAT in TRP #1 and a length of a BAT in TRP #2 may be the same value.

Lengths (values) of BATs associated with different CORESET pool indices (TRPs) may be separately configured/defined. For example, different values may be supported for a length of a BAT in TRP #1 and a length of a BAT in TRP #2.

When transmitting, to respective TRPs, HARQ-ACKs corresponding to respective CORESET pool indices (TRPs) (when separate HARQ-ACKs are configured by higher layer signaling), the UE may judge that a BAT in each TRP is time until a lapse of specific time (for example, K symbols) from transmission of a HARQ-ACK transmitted to each TRP. The HARQ-ACK may be a HARQ-ACK associated with beam indication DCI.

Figure 27:
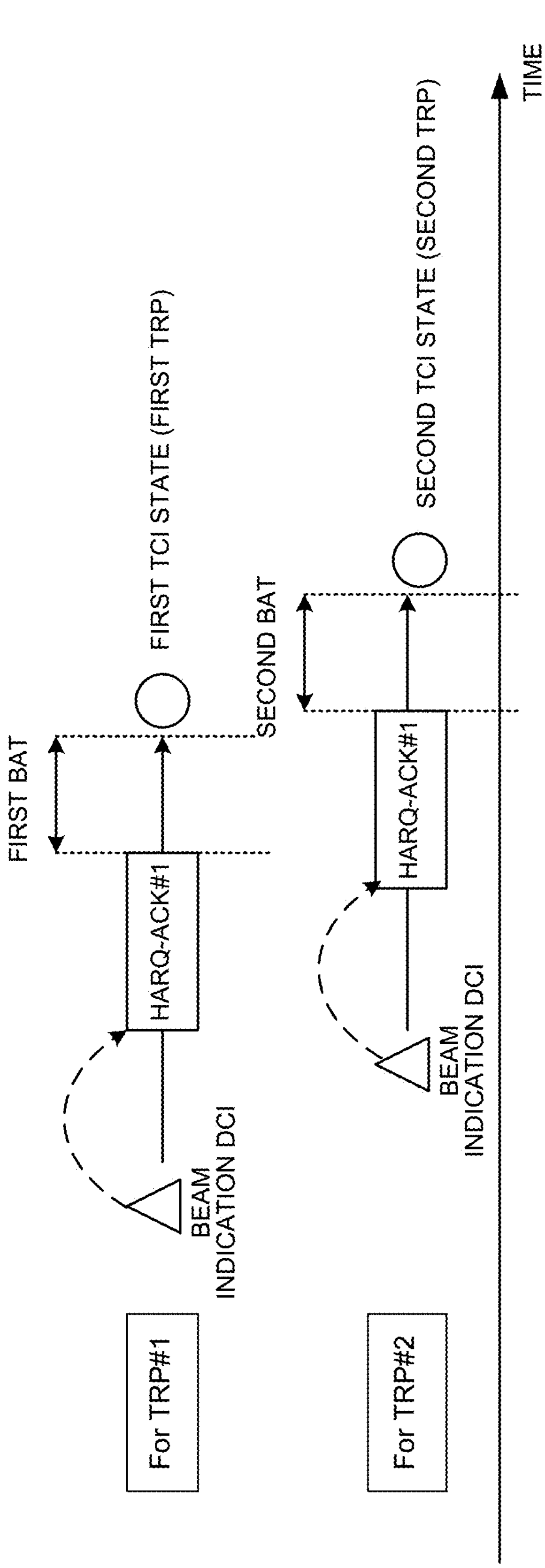
FIG. 27 is a diagram to show an example of a BAT according to a fifth embodiment.

FIG. 27 is a diagram to show an example of the BAT according to the fifth embodiment. In the example shown in FIG. 27, the UE transmits, to each TRP, a HARQ-ACK associated with beam indication DCI transmitted from each TRP.

In the example shown in FIG. 27, the UE may judge that a BAT in each TRP (BAT #1 in TRP #1 and BAT #2 in TRP #2) is a period until a lapse of specific time (for example, K symbols) from transmission of a HARQ-ACK transmitted to each TRP.

Note that BAT #1 and BAT #2 shown in FIG. 27 may be the same length or different lengths.

When transmitting, to a specific TRP, a HARQ-ACK corresponding to respective CORESET pool indices (TRPs) (when a joint HARQ-ACK is configured by higher layer signaling), the UE may judge that a BAT in each TRP is time until a lapse of specific time (for example, K symbols) from transmission of a HARQ-ACK transmitted to the specific TRP. The HARQ-ACK may be a HARQ-ACK associated with beam indication DCI.

Figure 28:
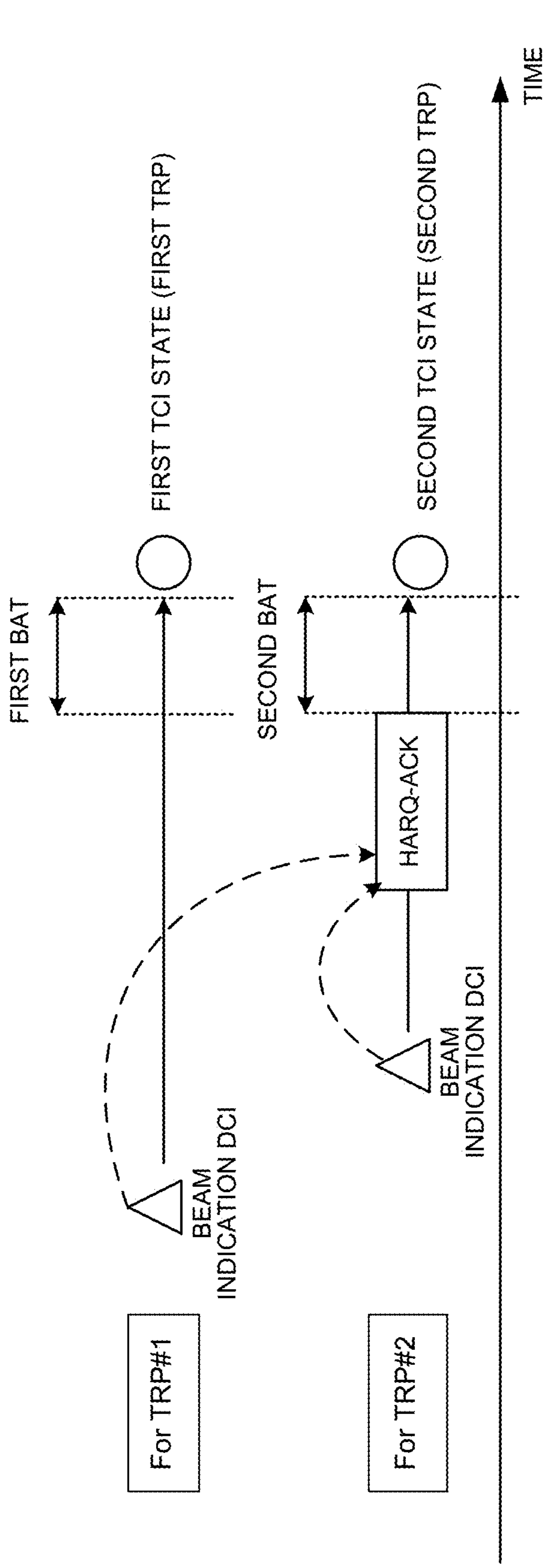
FIG. 28 is a diagram to show another example of the BAT according to the fifth embodiment.

FIG. 28 is a diagram to show another example of the BAT according to the fifth embodiment. In the example shown in FIG. 28, the UE transmits, to a specific TRP (TRP #1), a HARQ-ACK associated with beam indication DCI transmitted from each TRP.

In the example shown in FIG. 28, the UE may judge that a BAT in each TRP (BAT #1 in TRP #1 and BAT #2 in TRP #2) is a period until a lapse of specific time (for example, K symbols) from transmission of a HARQ-ACK transmitted to TRP #2.

Note that BAT #1 and BAT #2 shown in FIG. 28 may be the same length or different lengths.

According to the fifth embodiment above, it is possible to appropriately determine/judge a timing of TCI state application even when a plurality of TCI states are indicated by a plurality of beam indications.

Sixth Embodiment

In a sixth embodiment, a MAC CE for activating a TCI state will be described.

In the sixth embodiment, the MAC CE for activating a TCI state may be a MAC CE for activating at least one of a separate TCI state with N=X, M=Y (for example, X=Y=2) and a joint TCI state with N=M=X (for example, X=2).

The present embodiment below describes a case where X=2 and Y=2, but the N and M values may be 2 or more.

Embodiment 6-1

When a separate TCI state with N=2, M=2 is configured/enabled by using RRC signaling, a MAC CE obtained by enhancing the above-mentioned MAC CE described in FIG. 8 (Enhanced TCI States Activation/Deactivation for UE-specific PDSCH MAC CE) may be used.

The MAC CE may include a field for indicating a UL TCI state or a DL TCI state (link direction). The field may be defined in a location of a reserved bit in a first octet of a MAC CE before the enhancement.

When applying the MAC CE for the separate TCI state with N=2, M=2, the UE may regard a first field (Ci) included in the MAC CE as a reserved bit and ignore the first field. According to this, it is possible to dynamically indicate/change two common TCI states by using DCI.

When applying the MAC CE for the separate TCI state with N=2, M=2, the UE may judge that indication, by a first field (Ci) included in the MAC CE, of whether a second TCI state ID field is present is maintained. According to this, it is possible to dynamically indicate/change one or two common TCI states by using DCI.

The UE may receive separate MAC CEs to indicate/change/update respective ones of the DL TCI state and the UL TCI state.

One piece of DCI (for example, DCI format 1_1/1_2) may include two specific fields for indicating respective ones of a DL common TCI state and a UL common TCI state.

DCI for scheduling a DL channel (for example, DCI format 1_1/1_2) may include fields indicating respective DL common TCI states, and DCI for scheduling a UL channel (for example, DCI format 0_1/0_2) may include fields indicating respective UL common TCI states.

Figure 29:
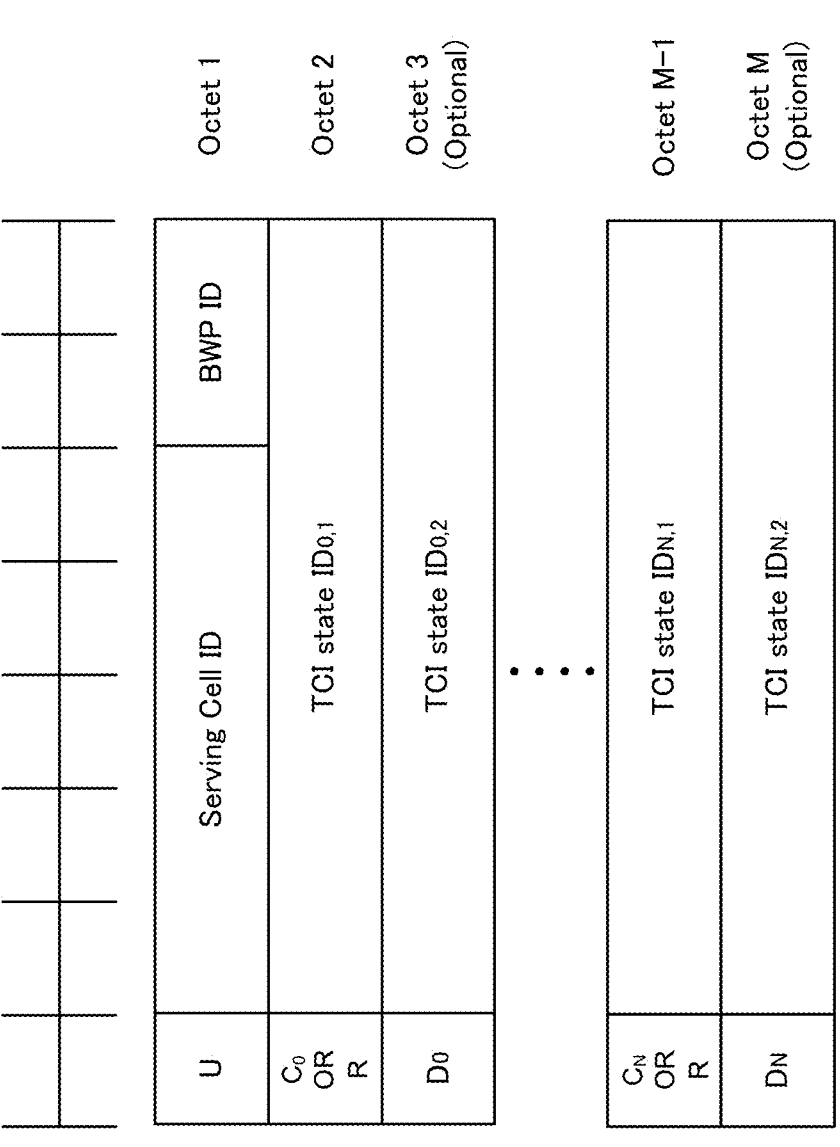
FIG. 29 is a diagram to show an example of a structure of a MAC CE according to Embodiment 6-1.

FIG. 29 is a diagram to show an example of a structure of the MAC CE according to Embodiment 6-1. FIG. 29 shows the MAC CE obtained by enhancing the MAC CE described in FIG. 8.

A third MAC CE described in FIG. 29 includes a field (described as "U") for indicating a UL TCI state or a DL TCI state. The field is defined in a location of a reserved bit in a first octet of a MAC CE before the enhancement.

Embodiment 6-2

When a TCI state with N=2, M=2 (N=M=2) is configured/enabled by using RRC signaling, a specific MAC CE may be used for activating a TCI state.

Embodiment 6-2-1

The above specific MAC CE may include one or more fields indicating any one of only a DL TCI state, only a UL TCI state, or DL and UL TCI states.

Each of the one or more fields may correspond to each of specific codepoints of a TCI field included in DCI.

The field (which may be described hereinafter as $C_i$) may have a specific number of bits (for example, 2 bits).

The field ($C_i$) may correspond to a TCI state ID field ("TCI state $ID_{i,j}$"). The TCI state ID field ("TCI state $ID_{i,j}$") may include a first TCI state ID field ("TCI state $ID_{i,1}$"), a second TCI state ID field ("TCI state $ID_{i,2}$"), a third TCI state ID field ("TCI state $ID_{i,3}$"), and a second TCI state ID field ("TCI state $ID_{i,4}$").

Note that in the present disclosure, i above may be a number represented as a decimal number. A number obtained by representing i above as a binary number may correspond to the number of TCI codepoints.

For the i+1 th codepoint of the TCI field included in the DCI, the UE may judge, based on a specific field (for example, $C_i$) included in the MAC CE, whether the MAC CE includes a DL TCI state and a UL TCI state, whether the MAC CE includes only a DL TCI state, whether the MAC CE includes only a UL TCI state, or whether the MAC CE does not include a TCI state ID.

When the specific field (for example, $C_i$) indicates, for the i+1 th codepoint of the TCI field included in the DCI, that the MAC CE does not include a TCI state ID (for example, a first value (for example, "00")), the MAC CE may not include a corresponding TCI state ID field.

When the specific field (for example, $C_i$) indicates, for the i+1 th codepoint of the TCI field included in the DCI, that the MAC CE includes only a DL TCI state (for example, a second value (for example, "01")), the MAC CE may include two DL TCI state ID fields.

When the specific field (for example, $C_i$) indicates, for the i+1 th codepoint of the TCI field included in the DCI, that the MAC CE includes only a UL TCI state (for example, a third value (for example, "10")), the MAC CE may include two UL TCI state ID fields.

When the specific field (for example, $C_i$) indicates, for the i+1 th codepoint of the TCI field included in the DCI, that the MAC CE includes a DL TCI state and a UL TCI state (for example, a fourth value (for example, "11")), the MAC CE may include two DL TCI state ID fields and two UL TCI state ID fields.

In Embodiment 6-2-1, the number of DL TCI states (IDs)/UL TCI states (IDs) corresponding to i may be a fixed value (for example, 2).

FIG. 30 is a diagram to show an example of a structure of the MAC CE according to Embodiment 6-2-1.

In FIG. 30, when $C_i$ indicates a first value (for example, "00"), the UE judges that the MAC CE does not include a corresponding TCI state ID field.

In FIG. 30, when $C_i$ indicates a second value (for example, "01"), the UE judges that the MAC CE includes two corresponding DL TCI state ID fields.

In FIG. 30, when $C_i$ indicates a third value (for example, "10"), the UE judges that the MAC CE includes two corresponding UL TCI state ID fields.

In FIG. 30, when $C_i$ indicates a fourth value (for example, "11"), the UE judges that the MAC CE includes two corresponding DL TCI state ID fields and two corresponding UL TCI state ID fields.

In the MAC CE for TCI state activation, an octet for the first and second TCI state ID fields with i=0 may always be present, and an octet subsequent to an octet for the third TCI state ID field with i=0 (octet subsequent to octet 6 in the example in FIG. 30) may be present based on a corresponding $C_i$ value.

Embodiment 6-2-2

The above specific MAC CE may include one or more first fields and one or more second fields related to indication of any one of only a DL TCI state, only a UL TCI state, or DL and UL TCI states.

Each of the first field and the second field may correspond to each of specific codepoints of the TCI field included in the DCI.

The first field (which may be described hereinafter as $C_i$) and the second field (which may be described hereinafter as $D_i$) may each have a specific number of bits (for example, 1 bit).

For the i+1 th codepoint of the TCI field included in the DCI, the UE may judge, based on the first field (for example, $C_i$) and the second field (for example, $D_i$) included in the MAC CE, whether the MAC CE includes a DL TCI state and a UL TCI state, whether the MAC CE includes only a DL TCI state, whether the MAC CE includes only a UL TCI state, or whether the MAC CE does not include a TCI state ID.

For example, the UE may judge, based on the first field (for example, $C_i$), whether the MAC CE includes a corresponding DL TCI state and a corresponding UL TCI state or whether the MAC CE includes only a DL/UL TCI state.

For example, the first field ($C_i$) may be 1 bit, and may correspond to the i+1 th codepoint of the TCI field included in the DCI.

When the field ($C_i$) indicates a first value (for example, "0"), the UE may judge that a TCI state ID field corresponding to only a DL TCI state or only a UL TCI state is present in the MAC CE.

When the field ($C_i$) indicates a second value (for example, "1"), the UE may judge that a TCI state ID field corresponding to a DL TCI state and a UL TCI state is present in the MAC CE.

For example, when judging that only a DL/UL TCI state is included, the UE may judge, based on the second field (for example, $D_i$), whether a corresponding TCI state ID included in the MAC CE corresponds to a DL or UL TCI state.

Embodiment 6-2-3

The MAC CE used in Embodiment 6-2-1 may include a field indicating the number of corresponding DL/UL TCI states (IDs).

The field may be included in the same octet as that for a field indicating the first (or second) TCI state of a codepoint of an arbitrary TCI field ("TCI state $ID_N$,1" (or "TCI state $ID_N$,2")).

For example, the field may be defined in a location of a reserved bit of the MAC CE used in Embodiment 3-2-1.

Figure 31:
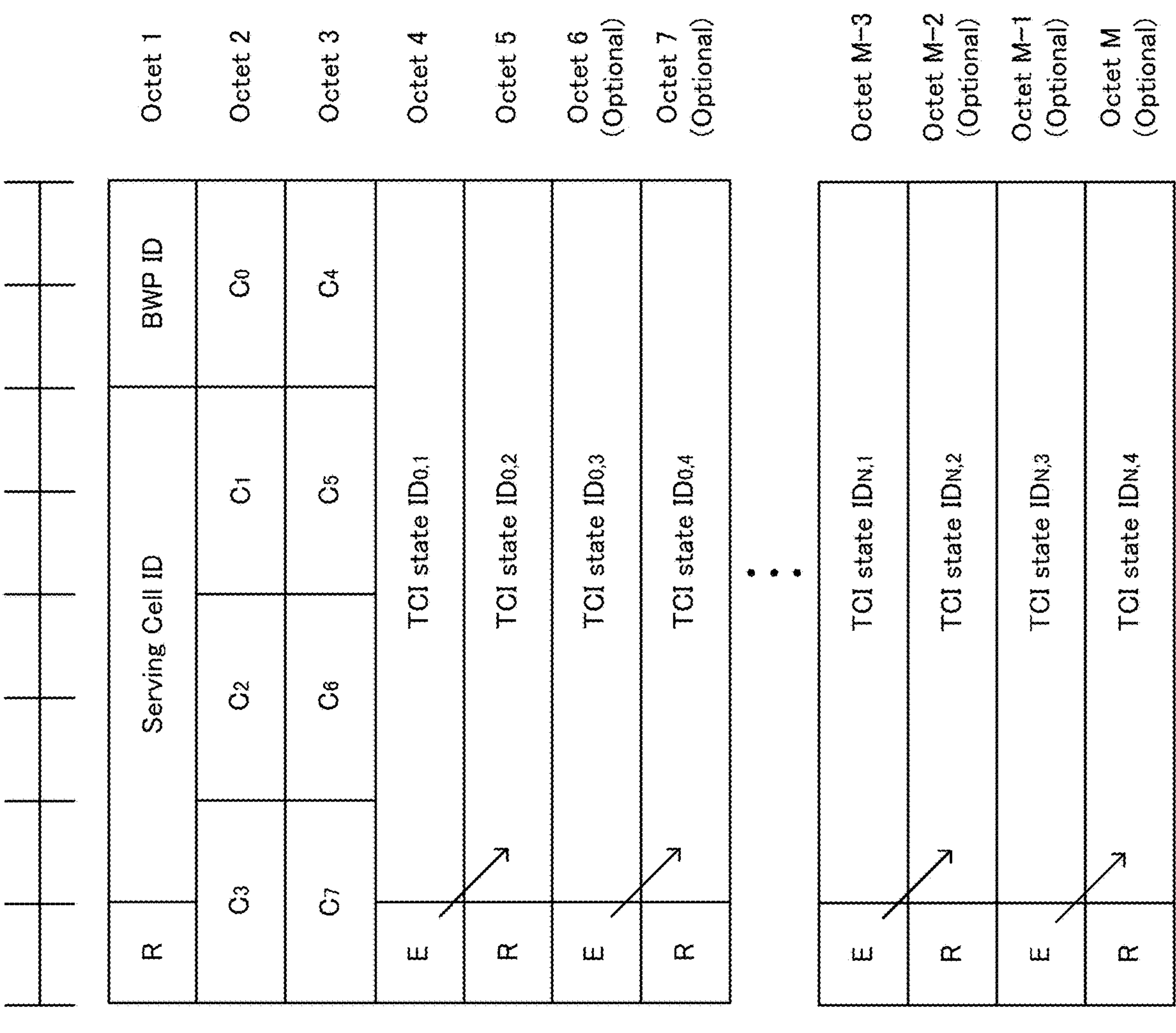
FIG. 31 is a diagram to show an example of a structure of a MAC CE according to Embodiment 6-2-3.

FIG. 31 is a diagram to show an example of a structure of the MAC CE according to Embodiment 6-2-3.

In FIG. 31, when $C_i$ indicates a first value (for example, "00"), the UE judges that the MAC CE does not include a corresponding TCI state ID field.

In FIG. 31, when $C_i$ indicates a second value (for example, "01"), the UE judges that the MAC CE includes a corresponding DL TCI state ID field.

In FIG. 31, when $C_i$ indicates a third value (for example, "10"), the UE judges that the MAC CE includes a corresponding UL TCI state ID field.

In FIG. 31, when $C_i$ indicates a fourth value (for example, "11"), the UE judges that the MAC CE includes a corresponding DL TCI state ID field and a corresponding UL TCI state ID field.

In FIG. 31, a field indicating the number of corresponding DL/UL TCI states (IDs) (described hereinafter as "E") is included.

The field indicates the number of corresponding TCI state ID fields. In other words, the field indicates whether a corresponding TCI state ID field is present in an octet subsequent to an octet for the field.

For example, when E indicates a first value (for example, "0"), the UE may judge that the number of TCI states (IDs) corresponding to E is one. For example, when E indicates a second value (for example, "1"), the UE may judge that the number of TCI states (IDs) corresponding to E is two.

Embodiment 6-2-4

The above specific MAC CE may include a field (E) indicating whether a subsequent octet is present.

The above specific MAC CE may include one or more fields indicating whether a first octet with respective TCI codepoints (first TCI state ID field ("TCI state $ID_{i,1}$") corresponding to the respective TCI codepoints) is present.

The field (which may be described hereinafter as $C_i$) may have a specific number of bits (for example, 1 bits). For example, when a value of the field ($C_i$) indicates a first value (for example, 0), a TCI state ID field ("TCI state $ID_{i,j}$") with smallest j corresponding to the field ($C_i$) may be TCI state $ID_{i,1}$. For example, when a value of the field ($C_i$) indicates a second value (for example, 0), a TCI state ID field ("TCI state $ID_{i,j}$") with smallest j corresponding to the field ($C_i$) may be TCI state $ID_{i,2}$.

The field ($C_i$) may correspond to a TCI state ID field ("TCI state $ID_{i,j}$"). The TCI state ID field ("TCI state $ID_{i,j}$") may include a first TCI state ID field ("TCI state $ID_{i,1}$"), a second TCI state ID field ("TCI state $ID_{i,2}$"), a third TCI state ID field ("TCI state $ID_{i,3}$"), and a second TCI state ID field ("TCI state $ID_{i,4}$").

The field ($C_i$) may not be included in the above specific MAC CE. In this case, the first octet with the respective TCI codepoints may always be present.

For the TCI state ID field ("TCI state $ID_{i,j}$"), j values and a first DL TCI state, a first UL TCI state, a second DL TCI state, and a second UL TCI state may correspond to each other.

For example, j=1, j=2, j=3, and j=4 may correspond to the first DL TCI state, the first UL TCI state, the second DL TCI state, and the second UL TCI state, respectively.

For example, j=1, j=2, j=3, and j=4 may correspond to the second UL TCI state, the first DL TCI state, the second UL TCI state, and the second DL TCI state, respectively.

For example, j=1, j=2, j=3, and j=4 may correspond to the first DL TCI state, the second DL TCI state, the first UL TCI state, and the second UL TCI state, respectively.

For example, j=1, j=2, j=3, and j=4 may correspond to the first UL TCI state, the second UL TCI state, the first DL TCI state, and the second DL TCI state, respectively.

An ordering of the first DL TCI state, the first UL TCI state, the second DL TCI state, and the second UL TCI state corresponding to respective ones of j=1 to 4 may be a fixed ordering.

Figure 32:
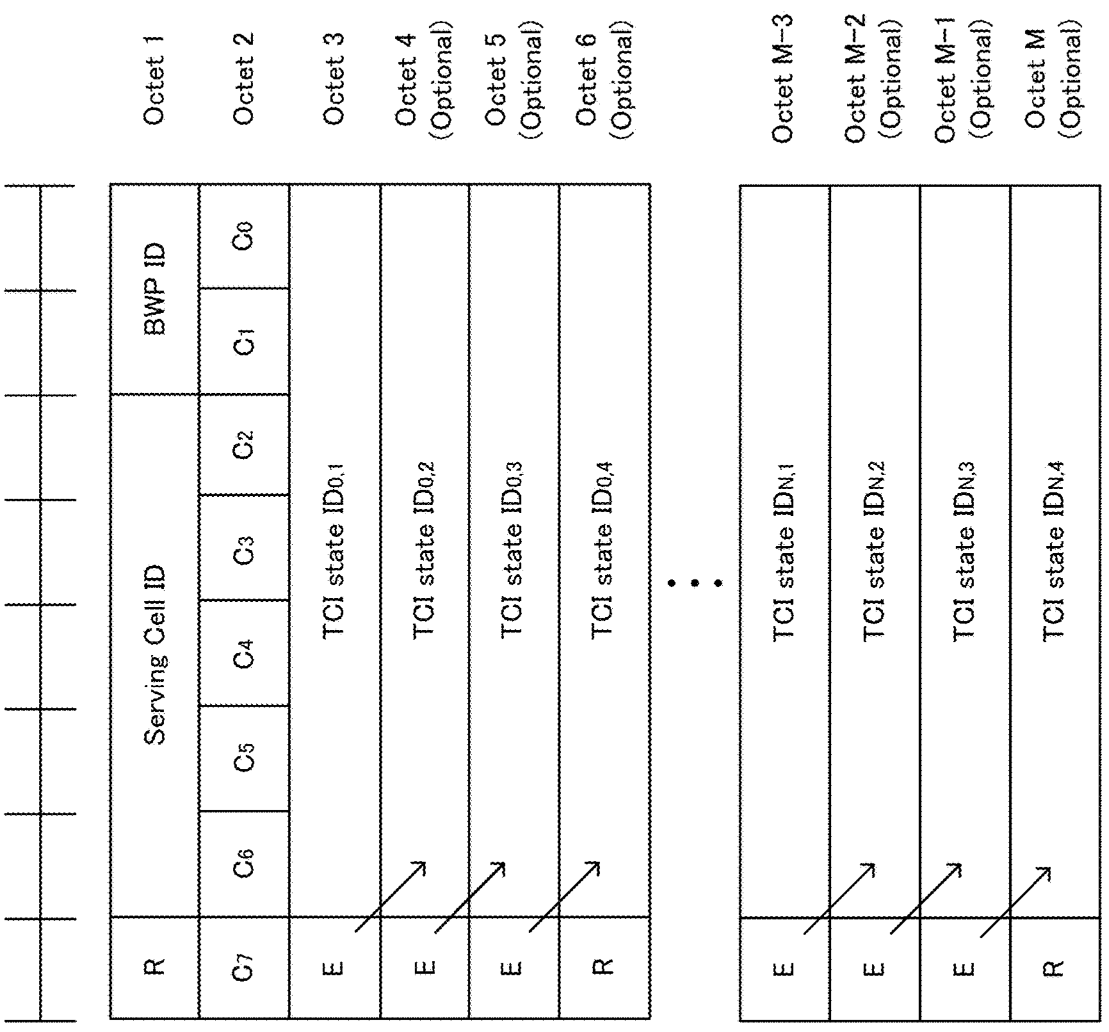
FIG. 32 is a diagram to show an example of a structure of a MAC CE according to Embodiment 6-2-4/6-2-5.

FIG. 32 is a diagram to show an example of a structure of the MAC CE according to Embodiment 6-2-4/6-2-5.

In FIG. 32, when $C_i$ indicates a first value (for example, "0"), the UE judges that the MAC CE does not include (first octet for) a corresponding TCI state ID field.

In FIG. 32, when $C_i$ indicates a second value (for example, "1"), the UE judges that the MAC CE includes (first octet for) a corresponding TCI state ID field.

In FIG. 32, the MAC CE includes a field (E) indicating whether a subsequent octet is present.

According to Embodiment 6-2-4 above, it is possible to perform reduction of overhead by using only one octet (without using two octets), for example, even when performing activation of either a first (or second) DL TCI state or a first (or second) UL TCI state corresponding to a certain TCI codepoint.

Embodiment 6-2-5

The above specific MAC CE may include a field (E) indicating whether a subsequent octet is present.

The above specific MAC CE may include one or more fields indicating an ordering of TCI states for a corresponding TCI state ID field.

The field (which may be described hereinafter as $C_i$) may have a specific number of bits (for example, 1 bits).

The field ($C_i$) may correspond to a TCI state ID field ("TCI state $ID_{i,j}$"). The TCI state ID field ("TCI state $ID_{i,j}$") may include a first TCI state ID field ("TCI state $ID_{i,1}$"), a second TCI state ID field ("TCI state $ID_{i,2}$"), a third TCI state ID field ("TCI state $ID_{i,3}$"), and a second TCI state ID field ("TCI state $ID_{i,4}$").

The first octet with the respective TCI codepoints may always be present. The field ($C_i$) may not be included in the above specific MAC CE. In this case, in this case, correspondence between the TCI state ID field and a TCI state may be the same as that in a case where the $C_i$ field indicates a first value (for example, 0 (or 1)).

For the TCI state ID field ("TCI state $ID_{i,j}$"), j values and a first DL TCI state, a first UL TCI state, a second DL TCI state, and a second UL TCI state may correspond to each other.

For example, when the $C_i$ field indicates a first value (for example, 0 (or 1)), the UE may judge, for an ordering of corresponding TCI state ID fields, that j=1, j=2, j=3, and j=4 correspond to a first DL TCI state, a first UL TCI state, a second DL TCI state, and a second UL TCI state, respectively. In other words, when the $C_i$ field indicates a first value (for example, 0 (or 1)), the UE may judge that the TCI state ID fields and respective TCI states correspond to each other first in order of DL and UL, and subsequently in order of a first and a second of TCI states.

For example, when the $C_i$ field indicates a second value (for example, 1 (or 0)), the UE may judge, for an ordering of corresponding TCI state ID fields, that j=1, j=2, j=3, and j=4 correspond to a first UL TCI state, a first DL TCI state, a second UL TCI state, and a second DL TCI state, respectively. In other words, when the $C_i$ field indicates a second value (for example, 1 (or 0)), the UE may judge that the TCI state ID fields and respective TCI states correspond to each other first in order of UL and DL, and subsequently in order of a first and a second of TCI states.

For example, when the $C_i$ field indicates a first value (for example, 0 (or 1)), the UE may judge, for an ordering of corresponding TCI state ID fields, that j=1, j=2, j=3, and j=4 correspond to a first DL TCI state, a second DL TCI state, a first UL TCI state, and a second UL TCI state, respectively. In other words, when the $C_i$ field indicates a first value (for example, 0 (or 1)), the UE may judge that the TCI state ID fields and respective TCI states correspond to each other first in order of a first and a second of TCI states, and subsequently in order of DL and UL.

For example, when the $C_i$ field indicates a second value (for example, 1 (or 0)), the UE may judge, for an ordering of corresponding TCI state ID fields, that j=1, j=2, j=3, and j=4 correspond to a first UL TCI state, a second UL TCI state, a first DL TCI state, and a second DL TCI state, respectively. In other words, when the $C_i$ field indicates a second value (for example, 1 (or 0)), the UE may judge that the TCI state ID fields and respective TCI states correspond to each other first in order of a first and a second of TCI states, and subsequently in order of UL and DL.

By using FIG. 32 mentioned above, a structure of the MAC CE according to Embodiment 6-2-5 will be described.

In FIG. 32, the UE judges, based on a $C_i$ value, which TCI state (first DL/UL TCI state, second DL/UL TCI state) a TCI state ID field corresponding to the $C_i$ field corresponds to.

In FIG. 32, the MAC CE includes a field (E) indicating whether a subsequent octet is present.

Embodiment 6-2-6

Embodiment 6-2-6 is variations of Embodiment 6-2-5.

The above specific MAC CE may include a field (E) indicating whether a subsequent octet is present.

The above specific MAC CE may include one field indicating an ordering of TCI states for a TCI state ID field.

The field (which may be described hereinafter as C) may have a specific number of bits (for example, 1 bit).

The first octet with the respective TCI codepoints may always be present. The field (C) may not be included in the above specific MAC CE. In this case, in this case, correspondence between the TCI state ID field and a TCI state may be the same as that in a case where the C field indicates a first value (for example, 0 (or 1)).

For the TCI state ID field ("TCI state $ID_{i,j}$"), j values and a first DL TCI state, a first UL TCI state, a second DL TCI state, and a second UL TCI state may correspond to each other.

For example, when the C field indicates a first value (for example, 0 (or 1)), the UE may judge, for an ordering of TCI state ID fields included in the MAC CE, that j=1, j=2, j=3, and j=4 correspond to the first DL TCI state, the first UL TCI state, the second DL TCI state, and the second UL TCI state, respectively. In other words, when the C field indicates a first value (for example, 0 (or 1)), the UE may judge that the TCI state ID fields and respective TCI states correspond to each other first in order of DL and UL, and subsequently in order of a first and a second of TCI states.

For example, when the C field indicates a second value (for example, 1 (or 0)), the UE may judge, for an ordering of TCI state ID fields included in the MAC CE, that j=1, j=2, j=3, and j=4 correspond to the first UL TCI state, the first DL TCI state, the second UL TCI state, and the second DL TCI state, respectively. In other words, when the $C_i$ field indicates a second value (for example, 1 (or 0)), the UE may judge that the TCI state ID fields and respective TCI states correspond to each other first in order of UL and DL, and subsequently in order of a first and a second of TCI states.

For example, when the C field indicates a first value (for example, 0 (or 1)), the UE may judge, for an ordering of TCI state ID fields included in the MAC CE, that j=1, j=2, j=3, and j=4 correspond to the first DL TCI state, the second DL TCI state, the first UL TCI state, and the second UL TCI state, respectively. In other words, when the $C_i$ field indicates a first value (for example, 0 (or 1)), the UE may judge that the TCI state ID fields and respective TCI states correspond to each other first in order of a first and a second of TCI states, and subsequently in order of DL and UL.

For example, when the C field indicates a second value (for example, 1 (or 0)), the UE may judge, for an ordering of TCI state ID fields included in the MAC CE, that j=1, j=2, j=3, and j=4 correspond to the first UL TCI state, the second UL TCI state, the first DL TCI state, and the second DL TCI state, respectively.

In other words, when the $C_i$ field indicates a second value (for example, 1 (or 0)), the UE may judge that the TCI state ID fields and respective TCI states correspond to each other first in order of a first and a second of TCI states, and subsequently in order of UL and DL.

Figure 33:
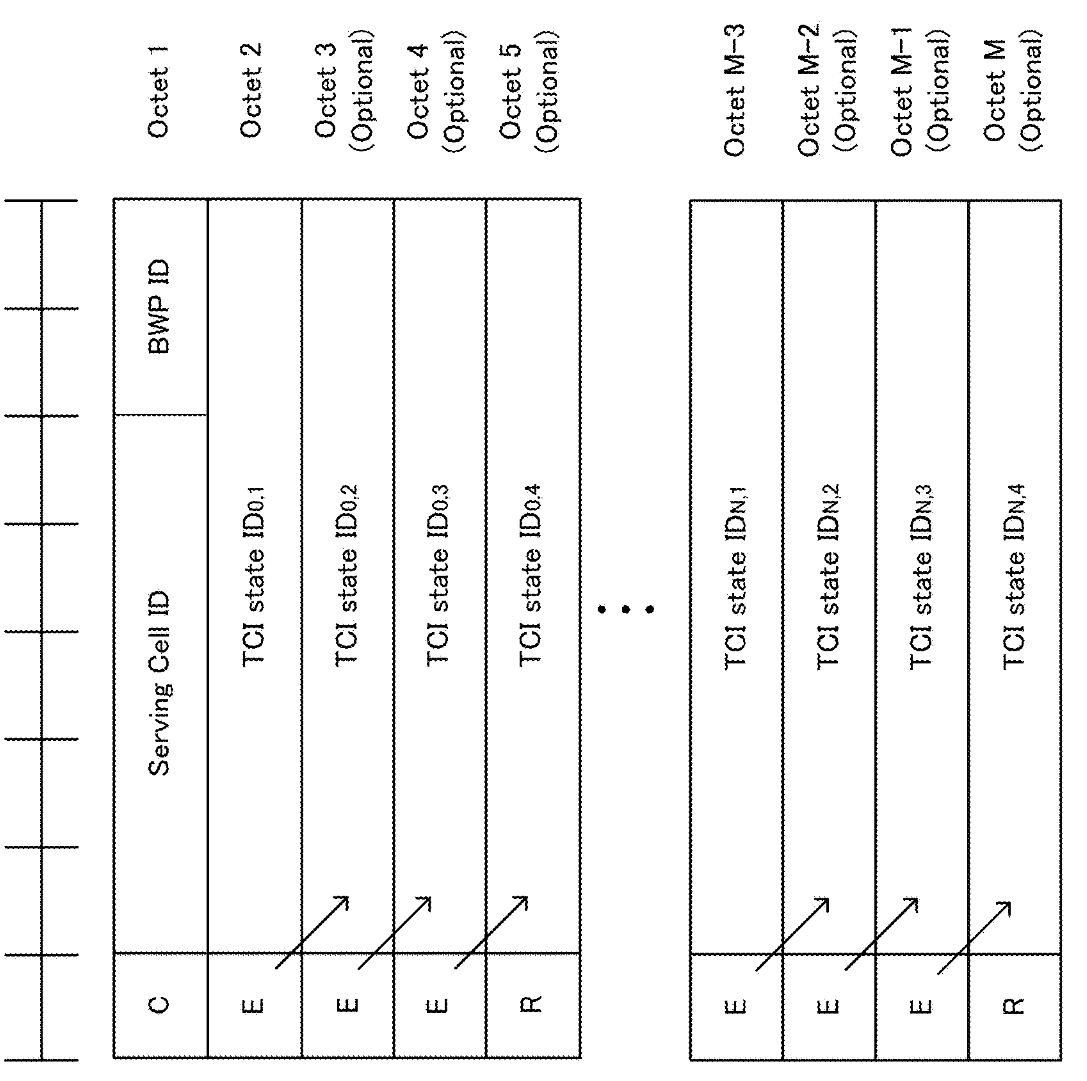
FIG. 33 is a diagram to show an example of a structure of a MAC CE according to Embodiment 6-2-6.

FIG. 33 is a diagram to show an example of a structure of the MAC CE according to Embodiment 6-2-6.

In FIG. 33, the UE judges, based on a C value, which TCI state (first DL/UL TCI state, second DL/UL TCI state) a TCI state ID field included in the MAC CE corresponds to.

In FIG. 33, the MAC CE includes a field (E) indicating whether a subsequent octet is present.

According to Embodiments 6-2-5 and 6-2-6 above, an ordering of TCI states corresponding to a TCI state ID field can be changed, thereby allowing a TCI state not requiring activation notification not to be notified to the UE again, and thus it is possible to reduce overhead.

Embodiment 6-2-7

The above specific MAC CE may include a field (E) indicating whether a subsequent octet is present.

The above specific MAC CE may include one or more fields indicating which of a joint TCI state or a separate TCI state a corresponding TCI state ID field is.

The field (which may be described hereinafter as $C_i$) may have a specific number of bits (for example, 1 bits).

The field ($C_i$) may correspond to a TCI state ID field ("TCI state $ID_{i,j}$"). The TCI state ID field ("TCI state $ID_{i,j}$") may include at least one of a first TCI state ID field ("TCI state $ID_{i,1}$"), a second TCI state ID field ("TCI state $ID_{i,2}$"), a third TCI state ID field ("TCI state $ID_{i,3}$"), and a second TCI state ID field ("TCI state $ID_{i,4}$").

The first octet with the respective TCI codepoints may always be present. The field ($C_i$) may not be included in the above specific MAC CE. In this case, in this case, which of a joint TCI state or a separate TCI state the TCI state ID field is may be the same as that in a case where the $C_i$ field indicates a first value (for example, 0 (or 1)).

For the TCI state ID field ("TCI state $ID_{i,j}$"), j values, and a first DL/UL TCI state and a second DL/UL TCI state may correspond to each other.

For example, when the $C_i$ field indicates a first value (for example, 0 (or 1)), the UE may judge, for a first TCI state and a second TCI state in a TCI state ID field corresponding to the $C_i$ field, that a TCI state with the i+1 th codepoint in a TCI state list related to a joint TCI state is activated.

For example, when the $C_i$ field indicates a second value (for example, 1 (or 0)), the UE may judge, for a first TCI state and a second TCI state in a TCI state ID field corresponding to the $C_i$ field, that a TCI state with the i+1 th codepoint in a TCI state list related to a separate TCI state is activated.

The TCI state list related to a joint TCI state and the TCI state list related to a separate TCI state may be separately configured for the UE.

In this case, if the $C_i$ field indicates a joint TCI state, the UE may judge that a TCI state ID corresponding to the $C_i$ field corresponds to the TCI state list related to a joint TCI state.

In this case, if the $C_i$ field indicates a separate TCI state, the UE may judge that a TCI state ID corresponding to the $C_i$ field corresponds to the TCI state list related to a separate TCI state.

The TCI state list related to a joint TCI state and the TCI state list related to a separate TCI state may be configured in common for the UE.

In this case, the UE may judge that a TCI state ID corresponding to the $C_i$ field corresponds to the common TCI state list, regardless of whether the $C_i$ field indicates a joint/separate TCI state.

FIGS. 34A and 34B are diagrams to show examples of a structure of the MAC CE according to Embodiment 6-2-7.

In FIG. 34A, the UE judges, based on a value of the $C_i$ field, which of the joint TCI state or the separate TCI state a TCI state ID field corresponding to the $C_i$ field indicates.

In an example shown in FIG. 34B, a value of the $C_i$ field being 0 indicates that a first TCI state and a second TCI state to be activated are joint TCI states. In the example shown in FIG. 34B, a value of the $C_i$ field being 1 indicates that a first TCI state and a second TCI state to be activated are separate TCI states.

Note that the correspondence between a value of the $C_i$ field and a joint/separate TCI state is just an example, and is not restrictive. For example, a value of the $C_i$ field being 0 (or 1) may indicate that a first TCI state and a second TCI state to be activated are a joint (or separate) TCI state and a joint (or separate) TCI state, respectively. For example, a value of the $C_i$ field being 1 (or 0) may indicate that a first TCI state and a second TCI state to be activated are a joint (or separate) TCI state and a separate (or joint) TCI state, respectively.

In FIG. 34A, the MAC CE includes a field (E) indicating whether a subsequent octet is present.

Note that Embodiment 6-2-7 above (FIGS. 34A and 34B) shows an example in which 1-bit $C_i$ fields are structured over 1 octet, but the structure of the $C_i$ fields is not limited to this. For example, the $C_i$ fields may each have two or more bits, or may be structured over a plurality of octets. When the $C_i$ fields each has a plurality of bits, the $C_i$ fields may each include the bit indicating an ordering of TCI states corresponding to TCI state IDs, described in Embodiments 6-2-4 and 6-2-5 above.

Embodiment 6-2-8

Embodiment 6-2-8 is variations of Embodiment 6-2-7 above. Thus, in the present embodiment, a difference between Embodiment 6-2-8 and Embodiment 6-2-7 above will be described.

A $C_i$ field included in the specific MAC CE may have a specific number of bits (for example, 2 bits). For example, a first bit of the $C_i$ field may indicate whether a corresponding first TCI state is a joint TCI state or a separate TCI state, and a second bit of the $C_i$ field may indicate whether a corresponding second TCI state is a joint TCI state or a separate TCI state.

For example, when the $C_i$ field indicates a first value (for example, 00 (or 01/10/11)), the UE may judge, for a first TCI state and a second TCI state in a TCI state ID field corresponding to the $C_i$ field, that a TCI state with the i+1 th codepoint in a TCI state list related to a joint TCI state is activated.

For example, when the $C_i$ field indicates a second value (for example, 01 (or 00/10/11)), the UE may judge, for a first TCI state and a second TCI state in a TCI state ID field corresponding to the $C_i$ field, that a TCI state with the i+1 th codepoint in a TCI state list related to a joint TCI state and a TCI state with the i+1 th codepoint in a TCI state list related to a separate TCI state are activated, respectively.

For example, when the $C_i$ field indicates a third value (for example, 10 (or 00/01/11)), the UE may judge, for a first TCI state and a second TCI state in a TCI state ID field corresponding to the $C_i$ field, that a TCI state with the i+1 th codepoint in a TCI state list related to a separate TCI state and a TCI state with the i+1 th codepoint in a TCI state list related to a joint TCI state are activated, respectively.

For example, when the $C_i$ field indicates a fourth value (for example, 11 (or 00/01/10)), the UE may judge, for a first TCI state and a second TCI state in a TCI state ID field corresponding to the $C_i$ field, that a TCI state with the i+1 th codepoint in a TCI state list related to a separate TCI state is activated.

Figure 35:
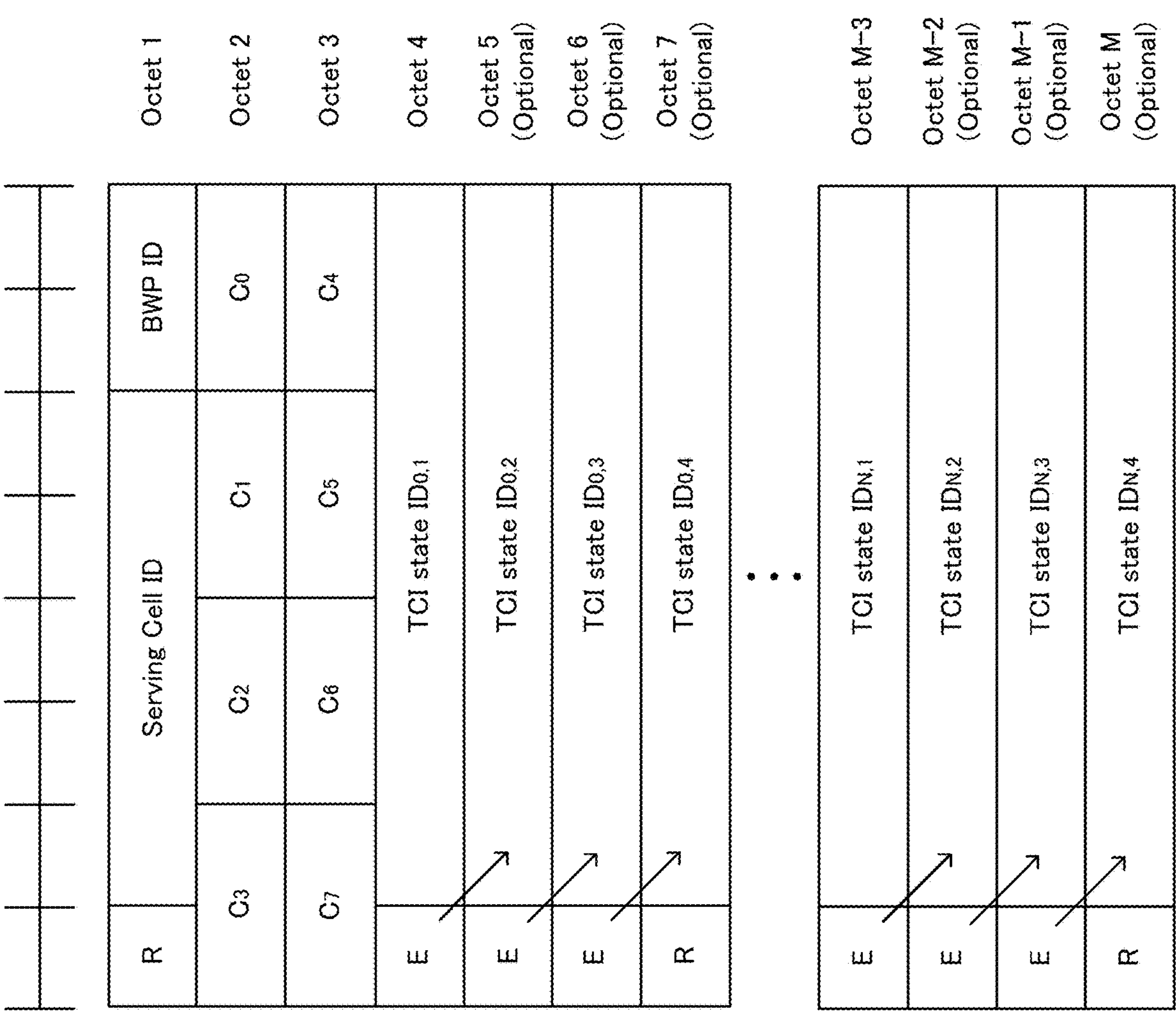
FIG. 35 is a diagram to show an example of a structure of a MAC CE according to Embodiment 6-2-8.

FIG. 35 is a diagram to show an example of a structure of the MAC CE according to Embodiment 6-2-8.

In FIG. 35, the UE judges, based on a value of the $C_i$ field, which of the joint TCI state or the separate TCI state a TCI state ID field corresponding to the $C_i$ field indicates.

FIG. 36 is a diagram to show another example of the structure of the MAC CE according to Embodiment 6-2-8. In an example shown in FIG. 36, a value of the $C_i$ field being 00 indicates that a first TCI state and a second TCI state to be activated are joint TCI states. In the example shown in FIG. 36, a value of the $C_i$ field being 01 indicates that a first TCI state and a second TCI state to be activated are a joint TCI state and a separate TCI state, respectively. In the example shown in FIG. 36, a value of the $C_i$ field being 01 indicates that a first TCI state and a second TCI state to be activated are a separate TCI state and a joint TCI state, respectively. In the example shown in FIG. 36, a value of the $C_i$ field being 11 indicates that a first TCI state and a second TCI state to be activated are separate TCI states.

Note that the correspondence between a value of the $C_i$ field and a joint/separate TCI state is just an example, and is not restrictive.

Note that Embodiment 6-2-8 above (FIGS. 35 and 36) shows an example in which 2-bit $C_i$ fields are structured over 2 octets, but the structure of the $C_i$ fields is not limited to this. For example, the $C_i$ fields may each have three or more bits, or may be structured over a plurality of octets. When the $C_i$ fields each has 3 or more bits, the $C_i$ fields may each include the bit indicating an ordering of TCI states corresponding to TCI state IDs, described in Embodiments 6-2-4 and 6-2-5 above.

According to Embodiments 6-2-7 and 6-2-8 above, it is possible to perform activation of a joint TCI state field and a separate TCI state field by using one MAC CE. Activation of not only a separate TCI state but also a joint TCI state is notified, thereby allowing a TCI state ID field to be reduced.

According to the sixth embodiment above, it is possible to appropriately perform TCI state activation even when multi-TRP is used.

Seventh Embodiment

In a seventh embodiment, a method for applying a TCI state to each channel/signal in a use case defined in Rel. 17 (or later versions) will be described.

In Rel. 17 (or later versions), a PDCCH-related use case may be defined.

For example, the use case may be two PDCCHs linked to each other. With respect to the two PDCCHs linked to each other, one TCI state may be indicated for one CORESET.

For example, the use case may be an SFN PDCCH (for an HST/reliability enhancement). With respect to the SFN PDCCH, one or a plurality of (two) TCI states may be indicated for one CORESET.

In Rel. 17 (or later versions), a PDSCH-related use case may be defined.

For example, the use case may be an SFN PDSCH (for an HST). With respect to the SFN PDSCH, one or a plurality of (two) TCI states may be indicated for one PDSCH by using DCI/MAC CE.

In Rel. 17 (or later versions), a PUSCH-related use case may be defined.

For example, the use case may be PUSCH repetition transmission (repetition) (for reliability enhancement). With respect to the PUSCH repetition transmission, one or a plurality of (two) SRS resource sets for codebook/non-codebook usage may be configured for the UE. With respect to the PUSCH repetition transmission, a plurality of (for example, up to two) at least one of transmitted precoding matrix indicator (TPMI) fields and SRI fields may be configured/indicated for the UE.

In Rel. 17 (or later versions), a PUCCH-related use case may be defined.

For example, the use case may be PUCCH repetition transmission (repetition) (for reliability enhancement). With respect to the PUCCH repetition transmission, one or a plurality of (two) spatial relations may be configured for the UE for each PUCCH resource group.

In at least one of the use cases above, the UE may apply the method described in at least one of the first to sixth embodiments above to perform transmission/reception of each channel/signal (PDCCH/PDSCH/PUSCH/PUCCH).

In at least one of the use cases above, when a plurality of (two) TCI states can be indicated for transmission/reception of each channel/signal (PDCCH/PDSCH/PUSCH/PUCCH), the UE may apply the method described in at least one of the first to sixth embodiments above, and a common TCI state may be indicated for the UE.

For example, the UE may apply, to a first TCI state for a DL channel (for example, a PDCCH/PDSCH) in the use cases above, a first TCI state of a plurality of TCI states indicated by the method described in at least one of the first to sixth embodiments above. The UE may apply, to a second TCI state for a DL channel (for example, a PDCCH/PDSCH) in the use cases above, a second TCI state of a plurality of TCI states indicated by the method described in at least one of the first to sixth embodiments above.

For example, the UE may apply, to at least one of a first spatial relation for a UL channel (for example, a PUCCH/PUSCH) in the use cases above and an SRS resource (SRI) in a first SRS resource set, a first TCI state of a plurality of TCI states indicated by the method described in at least one of the first to sixth embodiments above. The UE may apply, to at least one of a second spatial relation for a UL channel (for example, a PUCCH/PUSCH) in the use cases above and an SRS resource (SRI) in a second SRS resource set, a second TCI state of a plurality of TCI states indicated by the method described in at least one of the first to sixth embodiments above.

Note that the above first/second TCI state may be a joint (DL/UL) TCI state or a separate (DL/UL) TCI state.

Note that a rule may be defined beforehand in relation to application of a TCI state for an SRS resource set. For example, when a plurality of (for example, two) SRS resource sets for codebook-based (CB-based) transmission are configured for the UE, the UE may apply a first TCI state to (transmission of an SRS associated with) a first SRS resource set, and may apply a second TCI state to (transmission of an SRS associated with) a second SRS resource set.

Note that in the present disclosure, the first SRS resource set may mean an SRS resource set for codebook/non-codebook usage, the first SRS resource set having a lower (or higher) SRS resource set ID. In the present disclosure, the second SRS resource set may mean an SRS resource set for codebook/non-codebook usage, the second SRS resource set having a higher (or lower) SRS resource set ID.

In at least one of the use cases above, when one TCI state is indicated for transmission/reception of each channel/signal (PDCCH/PDSCH/PUSCH/PUCCH), the UE may determine/apply one TCI state of two indicated TCI states. The method described in the second embodiment above may be appropriately applied to a method for the determination of one TCI state.

According to the seventh embodiment above, it is possible to appropriately perform configuration/indication/application of a common TCI state corresponding to a use case of each channel/signal.

Other Embodiments

A higher layer parameter (RRC IE)/UE capability corresponding to a function (characteristics, feature) in at least one of the plurality of embodiments above may be defined. The UE capability may indicate that the UE supports this function.

The UE configured with the higher layer parameter (for enabling the function) corresponding to the function may perform the function. "The UE not configured with the higher layer parameter corresponding to the function does not perform the function (for example, follows Rel. 15/16)" may be defined.

The UE that has reported the UE capability indicating support of the function may perform the function. "The UE that has not reported the UE capability indicating support of the function does not perform the function (for example, follows Rel. 15/16)" may be defined.

When the UE reports the UE capability indicating support of the function and is configured with the higher layer parameter corresponding to the function, the UE may perform the function. "When the UE does not report the UE capability indicating support of the function or when the UE is not configured with the higher layer parameter corresponding to the function, the UE does not perform the function (for example, follows Rel. 15/16)" may be defined.

The UE capability may indicate whether the UE supports this function.

The function may be application of a common/unified TCI state.

The function may be application of a joint DL/UL TCI state.

The function may be application of a separate DL/UL TCI state.

The UE capability may be defined as whether the UE supports a joint DL/UL TCI state (mode).

The UE capability may be defined as whether the UE supports a joint DL/UL TCI state (mode) with M=1, N=2.

The UE capability may be defined as whether the UE supports a joint DL/UL TCI state (mode) with M=2, N=1.

The UE capability may be defined as whether the UE supports a joint DL/UL TCI state (mode) with M=2, N=2.

The UE capability may be defined as whether the UE supports a separate DL/UL TCI state (mode).

The UE capability may be defined as whether the UE supports a separate DL/UL TCI state with M=1, N=2.

The UE capability may be defined as whether the UE supports a separate DL/UL TCI state with M=2, N=1.

The UE capability may be defined as whether the UE supports a separate DL/UL TCI state with M=2, N=2.

The UE capability may be defined as the number (total number) of reports of TCI states configured by RRC signaling for a first/second TCI state.

The UE capability may be defined as the number (total number) of reports of TCI states activated by a MAC CE for a first/second TCI state.

The UE capability may be defined as whether the UE supports a common TCI state for single DCI-based multi-TRP.

The UE capability may be defined as whether the UE supports a common TCI state for multi-DCI-based multi-TRP.

The UE capability may be defined as whether the UE supports a common TCI state for single DCI-based multi-TRP and a common TCI state for multi-DCI-based multi-TRP.

The UE capability may be defined as whether the UE supports at least one of at least one method described in the first embodiment above and at least one method described in the fourth embodiment above.

The UE capability may be defined as whether the UE supports separate BATs in different TRPs (CORESET pool indices).

According to the other embodiments above, the UE can implement the above functions while maintaining compatibility with an existing specification.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 37:
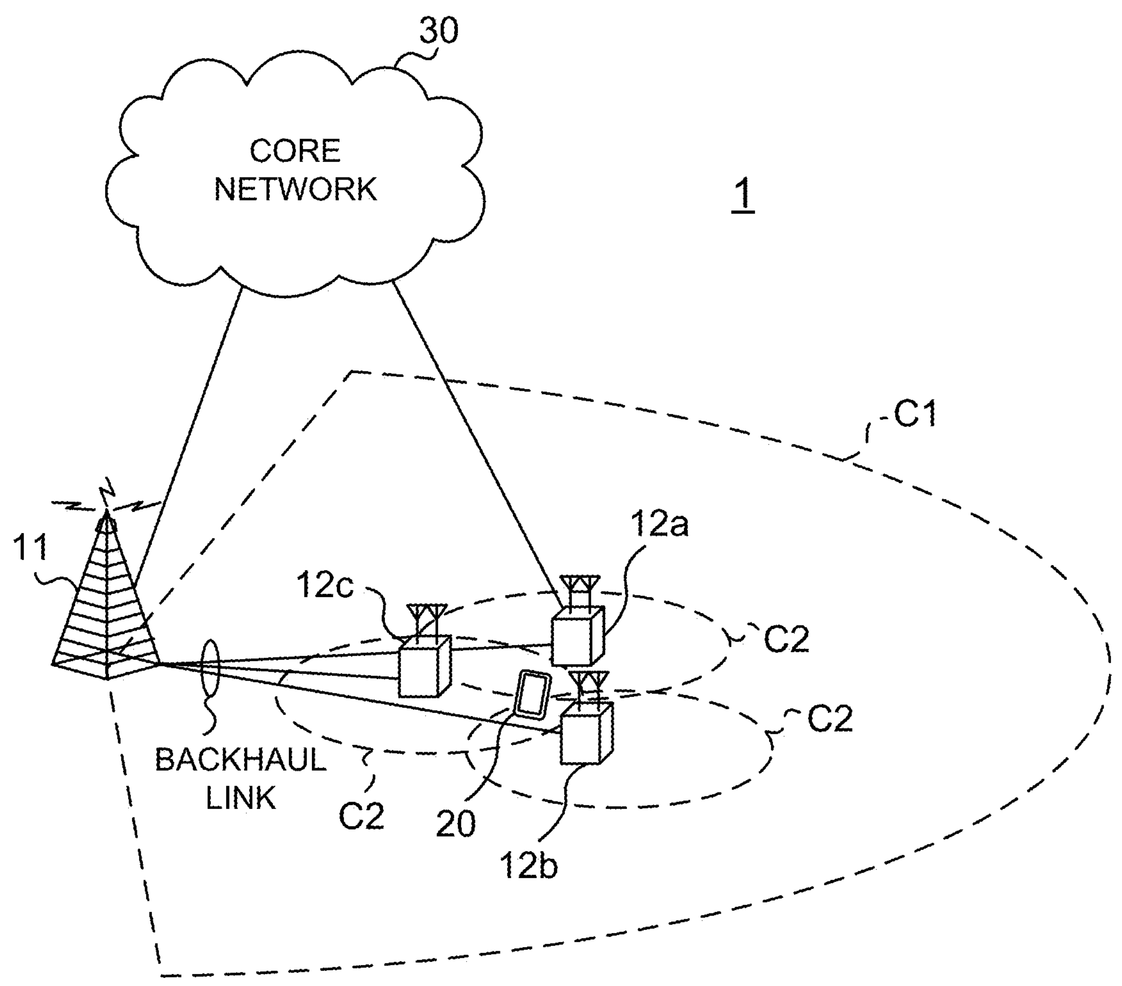
FIG. 37 is a diagram to show an example of a schematic structure of a radio communication system according to one embodiment.

FIG. 37 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12_a_ to 12_c_) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 38:
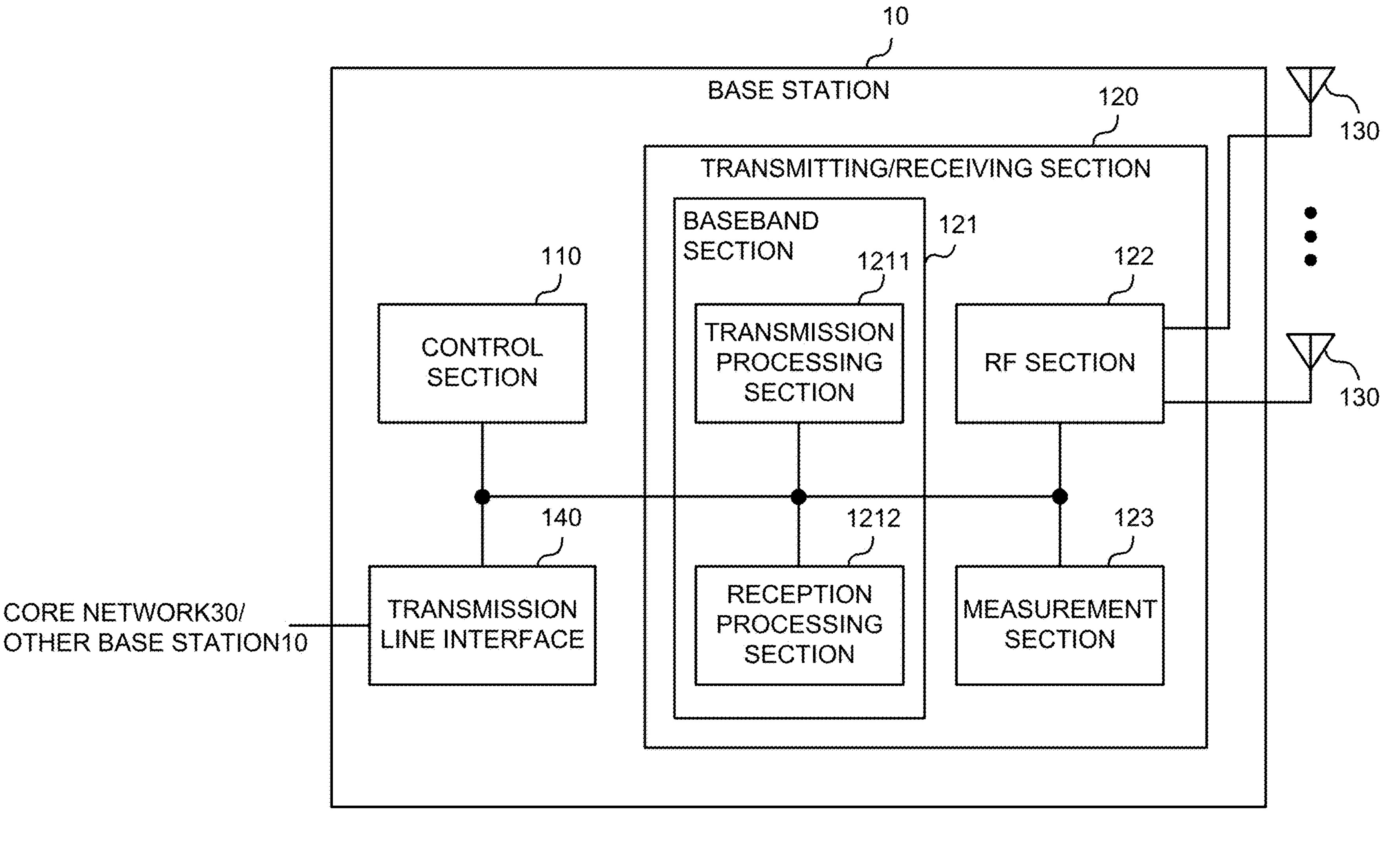
FIG. 38 is a diagram to show an example of a structure of a base station according to one embodiment.

FIG. 38 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit control information (correspondence) for mapping one or more TCI states to a codepoint of one transmission configuration indication (TCI) field, and may transmit one piece of downlink control information (DCI, beam indication DCI) for indicating a first TCI state applicable to a plurality of types of first signals and a second TCI state applicable to a plurality of types of second signals. The control section 110 may indicate the first TCI state to be applied to the first signals and indicate the second TCI state to be applied to the second signals, by using the control information and the codepoint of the TCI field included in the DCI (first and second embodiments).

The transmitting/receiving section 120 may transmit first control information (correspondence) for mapping one or more TCI states to a codepoint of a first transmission configuration indication (TCI) field, may transmit second control information (correspondence) for mapping one or more TCI states to a codepoint of a second TCI field, and may transmit first downlink control information (DCI, beam indication DCI) for indicating a first TCI state corresponding to a first control resource set (CORESET) pool index and applicable to a plurality of types of first signals, and second DCI (beam indication DCI) for indicating a second TCI state corresponding to a second control resource set (CORESET) pool index and applicable to a plurality of types of second signals.

The control section 110 may indicate the first TCI state to be applied to the first signals, by using the first control information and the codepoint of the first TCI field included in the first DCI, and may indicate the second TCI state to be applied to the second signals, by using the second control information and the codepoint of the second TCI field included in the second DCI (fourth embodiment).

The transmitting/receiving section 120 may transmit a Medium Access Control (MAC) control element (CE) for indicating activation of a plurality of transmission configuration indication (TCI) states applicable to a plurality of types of channels. The control section 110 may indicate, by using a first field and a second field included in the MAC CE, which of a first downlink (DL) TCI state, a first uplink (UL) TCI state, a first common TCI state common to DL and UL, a second DL TCI state, a second UL TCI state, or a second common TCI state common to DL and UL one or more TCI state ID fields included in the MAC CE indicate (sixth embodiment).

The transmitting/receiving section 120 may transmit control information for mapping one or more TCI states to a codepoint of one transmission configuration indication (TCI) field, and may transmit one or more pieces of downlink control information (DCI) for indicating a first TCI state applicable to a plurality of types of first signals and a second TCI state applicable to a plurality of types of second signals. The control section 110 may indicate the first TCI state to be applied to the first signals and indicate the second TCI state to be applied to the second signals, by using the control information and the codepoint of the TCI field included in the DCI. The first signals and the second signals may be at least one of two physical downlink control channels (PDCCHs) linked to each other, a single frequency network (SFN) PDCCH, an SFN physical downlink shared channel (PDSCH), physical uplink shared channel (PUSCH) repetition transmission, and physical uplink control channel (PUCCH) repetition transmission (seventh embodiment).

(User Terminal)

Figure 39:
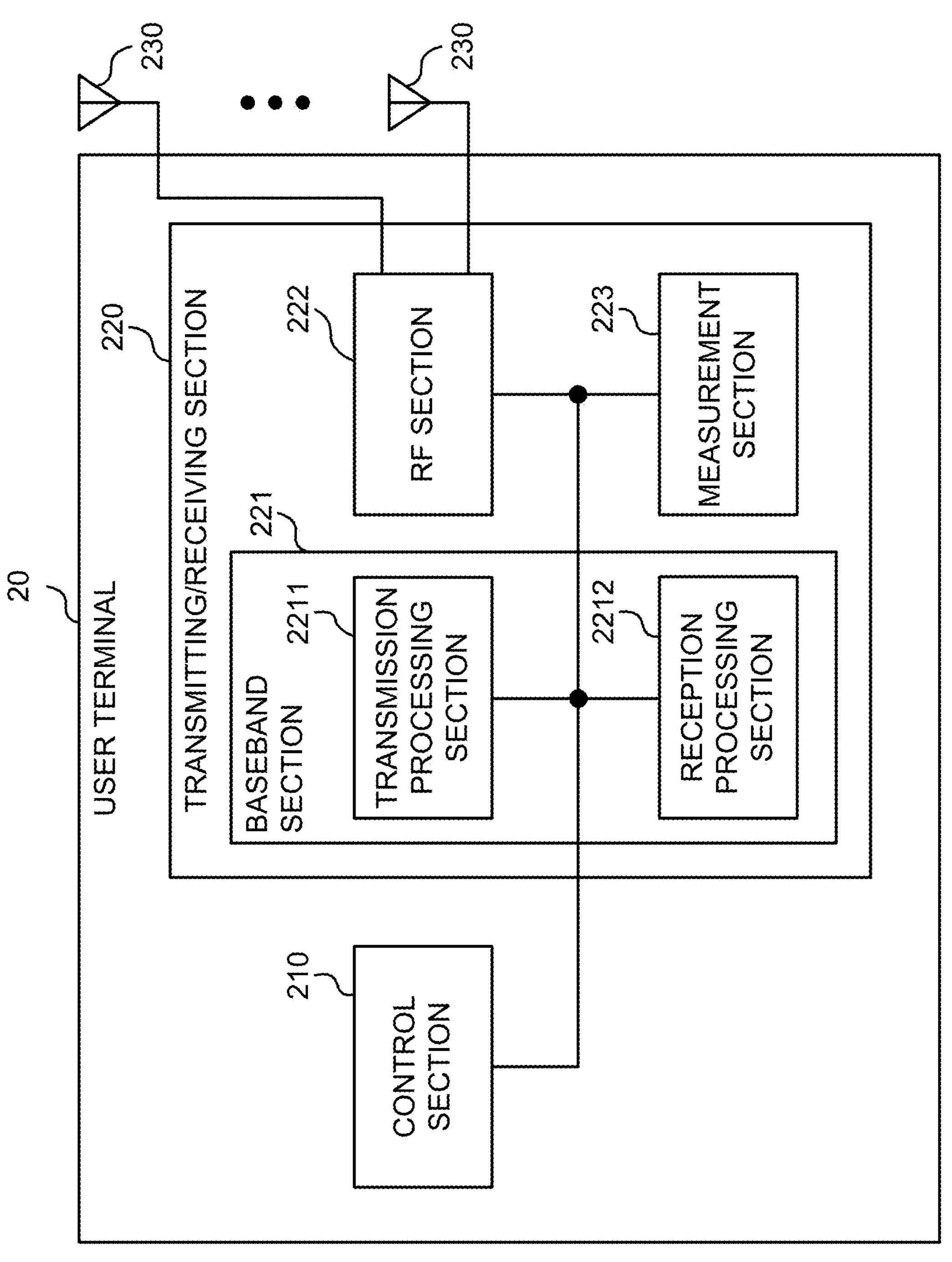
FIG. 39 is a diagram to show an example of a structure of a user terminal according to one embodiment.

FIG. 39 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive control information (correspondence) for mapping one or more TCI states to a codepoint of one transmission configuration indication (TCI) field, and may receive one piece of downlink control information (DCI, beam indication DCI) for indicating a first TCI state applicable to a plurality of types of first signals and a second TCI state applicable to a plurality of types of second signals. The control section 210 may apply the first TCI state to the first signals and apply the second TCI state to the second signals, based on the control information and the codepoint of the TCI field included in the DCI (first and second embodiments).

The first TCI state may be either a TCI state common to downlink (DL) and uplink (UL) or separate TCI states for DL and UL, and the second TCI state may be either the TCI state common to DL and UL or the separate TCI states for DL and UL (first and second embodiments).

The transmitting/receiving section 220 may further receive, by using higher layer signaling, first configuration information (RRC information) indicating a resource (CORESET/resource/resource set/resource group/BWP/CC) for the first signals and second configuration information (RRC information) indicating a resource (CORESET/resource/resource set/resource group/BWP/CC) for the second signals. The control section 210 may judge the first TCI state, based on the first configuration information, for each resource for the first signals, and may judge the second TCI state, based on the second configuration information, for each resource for the second signals (second embodiment).

The control section 210 may control transmission of a Hybrid Automatic Repeat reQuest ACKnowledgement (HARQ-ACK) associated with the DCI. The control section 210 may start application of the first TCI state after at least a lapse of a first period from transmission of the HARQ-ACK, and may start application of the second TCI state after at least a lapse of a second period from the transmission of the HARQ-ACK (third embodiment).

The transmitting/receiving section 220 may receive first control information (correspondence) for mapping one or more TCI states to a codepoint of a first transmission configuration indication (TCI) field, may receive second control information (correspondence) for mapping one or more TCI states to a codepoint of a second TCI field, and may receive first downlink control information (DCI, beam indication DCI) for indicating a first TCI state corresponding to a first control resource set (CORESET) pool index and applicable to a plurality of types of first signals, and second DCI (beam indication DCI) for indicating a second TCI state corresponding to a second control resource set (CORESET) pool index and applicable to a plurality of types of second signals. The control section 210 may apply the first TCI state to the first signals, based on the first control information and the codepoint of the first TCI field included in the first DCI, and may apply the second TCI state to the second signals, based on the second control information and the codepoint of the second TCI field included in the second DCI (fourth embodiment).

The first TCI state may be either a TCI state common to downlink (DL) and uplink (UL) or separate TCI states for DL and UL, and the second TCI state may be either the TCI state common to DL and UL or the separate TCI states for DL and UL (fourth embodiment).

The transmitting/receiving section 220 may further receive, by using higher layer signaling, first configuration information (RRC information) indicating a resource for the first signals and second configuration information (RRC information) indicating a resource for the second signals. The control section 210 may judge the first TCI state, based on the first configuration information, for each resource (CORESET/resource/resource set/resource group/BWP/CC) for the first signals, and may judge the second TCI state, based on the second configuration information, for each resource (CORESET/resource/resource set/resource group/BWP/CC) for the second signals (fourth embodiment).

The control section 210 may control transmission of a first Hybrid Automatic Repeat reQuest ACKnowledgement (HARQ-ACK) associated with the first DCI and a second HARQ-ACK associated with the second DCI. The control section 210 may start application of the first TCI state after at least a lapse of a first period from transmission of the first HARQ-ACK, and may start application of the second TCI state after at least a lapse of a second period from transmission of the second HARQ-ACK (fifth embodiment).

The transmitting/receiving section 220 may receive a Medium Access Control (MAC) control element (CE) for indicating activation of a plurality of transmission configuration indication (TCI) states applicable to a plurality of types of channels. The control section 210 may judge, based on, a first field and a second field included in the MAC CE, which of a first downlink (DL) TCI state, a first uplink (UL) TCI state, a first common TCI state common to DL and UL, a second DL TCI state, a second UL TCI state, or a second common TCI state common to DL and UL one or more TCI state ID fields included in the MAC CE indicate (sixth embodiment).

The first field (for example, the above C field/$C_i$ field) may indicate an ordering of TCI states indicated by the one or more TCI state ID fields (sixth embodiment).

The second field (for example, the above E field) may indicate whether an octet subsequent to the second field is present.

The transmitting/receiving section 220 may receive control information (correspondence) for mapping a value of the first field, a first TCI state, and a second TCI state. The control section 210 may judge, based on the value of the first field and the control information, which of the first DL TCI state, the first UL TCI state, the first common TCI state common to DL and UL, the second DL TCI state, the second UL TCI state, or the second common TCI state common to DL and UL the one or more TCI state ID fields indicate (sixth embodiment).

The transmitting/receiving section 220 may receive control information (correspondence) for mapping one or more TCI states to a codepoint of one transmission configuration indication (TCI) field, and may receive one or more pieces of downlink control information (DCI, beam indication DCI) for indicating a first TCI state applicable to a plurality of types of first signals and a second TCI state applicable to a plurality of types of second signals. The control section 210 may apply the first TCI state to the first signals and apply the second TCI state to the second signals, based on the control information and the codepoint of the TCI field included in the DCI. The first signals and the second signals may be at least one of two physical downlink control channels (PDCCHs) linked to each other, a single frequency network (SFN) PDCCH, an SFN physical downlink shared channel (PDSCH), physical uplink shared channel (PUSCH) repetition transmission, and physical uplink control channel (PUCCH) repetition transmission (seventh embodiment).

The first TCI state may be either a TCI state common to downlink (DL) and uplink (UL) or separate TCI states for DL and UL. The second TCI state may be either the TCI state common to DL and UL or the separate TCI states for DL and UL (seventh embodiment).

The transmitting/receiving section 220 may further receive, by using higher layer signaling, first configuration information indicating a resource (CORESET/resource/resource set/resource group/BWP/CC) for the first signals and second configuration information indicating a resource (CORESET/resource/resource set/resource group/BWP/CC) for the second signals. The control section 210 may judge the first TCI state, based on the first configuration information, for each resource for the first signals, and may judge the second TCI state, based on the second configuration information, for each resource for the second signals (seventh embodiment).

The control section 210 may control transmission of a Hybrid Automatic Repeat reQuest ACKnowledgement (HARQ-ACK) associated with the DCI. The control section 210 may start application of the first TCI state after at least a lapse of a first period from transmission of the HARQ-ACK, and may start application of the second TCI state after at least a lapse of a second period from the transmission of the HARQ-ACK (seventh embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 40:
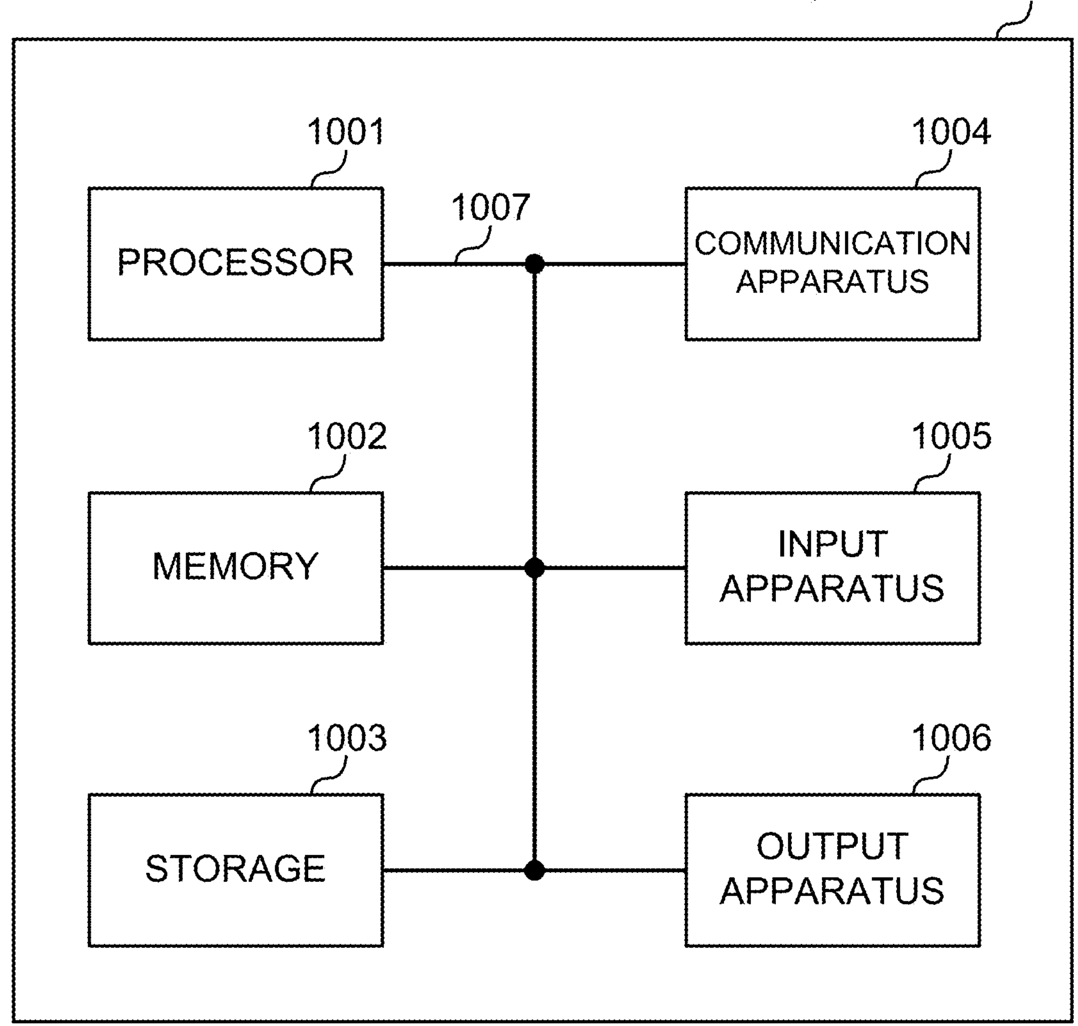
FIG. 40 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 40 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell,"a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be a device mounted on a moving object or a moving object itself, and so on.

The moving object is a movable object with any moving speed, and naturally a case where the moving object is stopped is also included. Examples of the moving object include a vehicle, a transport vehicle, an automobile, a motorcycle, a bicycle, a connected car, a loading shovel, a bulldozer, a wheel loader, a dump truck, a fork lift, a train, a bus, a trolley, a rickshaw, a ship and other watercraft, an airplane, a rocket, a satellite, a drone, a multicopter, a quadcopter, a balloon, and an object mounted on any of these, but these are not restrictive. The moving object may be a moving object that autonomously travels based on a direction for moving.

The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor.

Figure 41:
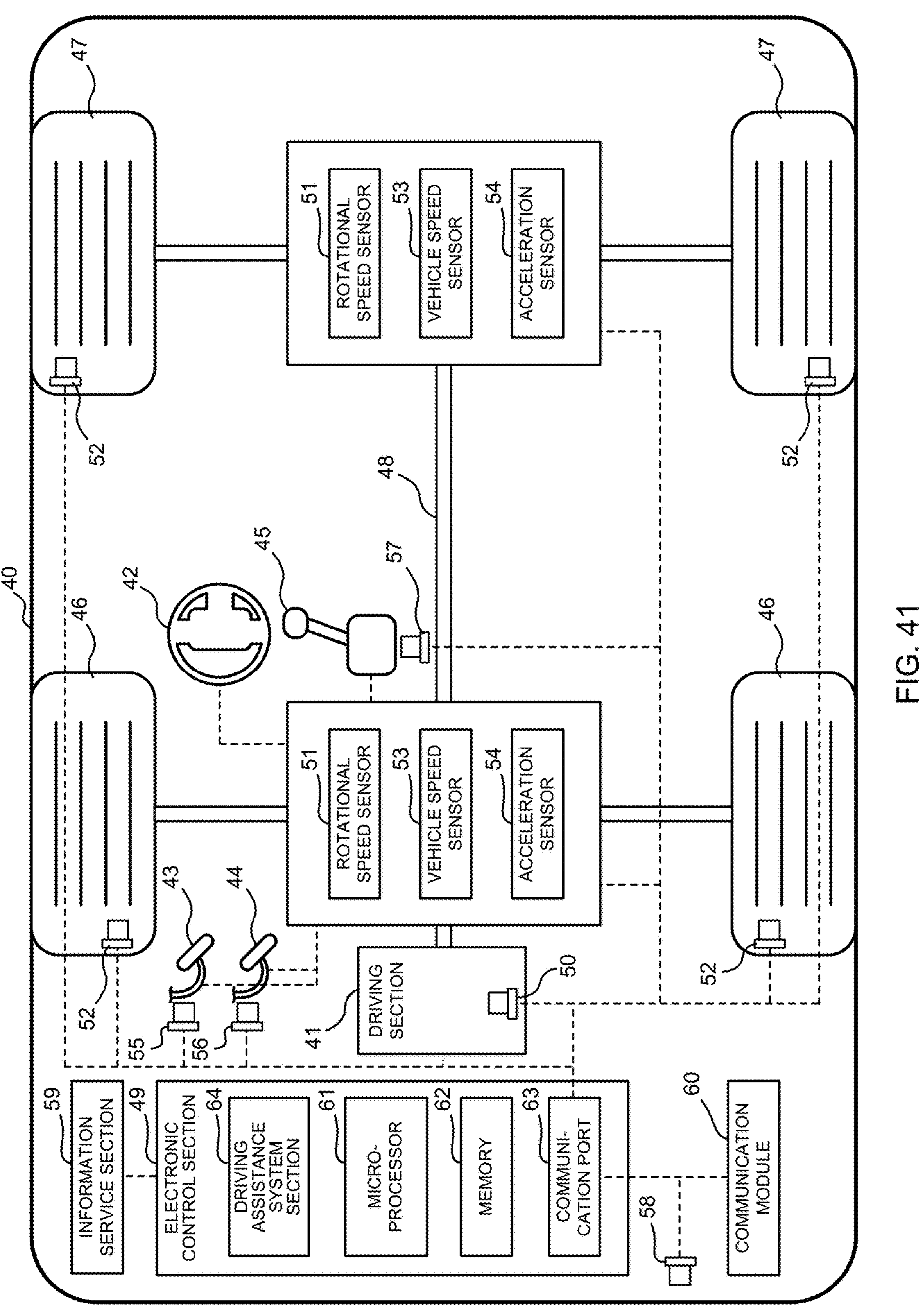
FIG. 41 is a diagram to show an example of a vehicle according to one embodiment.

FIG. 41 is a diagram to show an example of a vehicle according to one embodiment. A vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, a rotational speed sensor 51, a pneumatic sensor 52, a vehicle speed sensor 53, an acceleration sensor 54, an accelerator pedal sensor 55, a brake pedal sensor 56, a shift lever sensor 57, and an object detection sensor 58), an information service section 59, and a communication module 60.

The driving section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, an input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, a rotational speed signal of the front wheels 46/rear wheels 47 acquired by the rotational speed sensor 51, a pneumatic signal of the front wheels 46/rear wheels 47 acquired by the pneumatic sensor 52, a vehicle speed signal acquired by the vehicle speed sensor 53, an acceleration signal acquired by the acceleration sensor 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing (outputting) various pieces of information such as drive information, traffic information, and entertainment information, such as a car navigation system, an audio system, a speaker, a display, a television, and a radio, and one or more ECUs that control these devices. The information service section 59 provides various pieces of information/services (for example, multimedia information/multimedia service) for an occupant of the vehicle 40, using information acquired from an external apparatus via the communication module 60 and the like.

The information service section 59 may include an input device (for example, a keyboard, a mouse, a microphone, a switch, a button, a sensor, a touch panel, and the like) for receiving input from the outside, or may include an output device (for example, a display, a speaker, an LED lamp, a touch panel, and the like) for implementing output to the outside.

A driving assistance system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUs that control these devices. The driving assistance system section 64 transmits and receives various pieces of information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the driving section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various pieces of information to and from the external apparatus via radio communication. The communication module 60 may be either inside or outside the electronic control section 49. The external apparatus may be, for example, the base station 10, the user terminal 20, or the like described above. The communication module 60 may be, for example, the above-describe base station 10 or user terminal 20 or the like (may function as the base station 10 or user terminal 20 or the like).

The communication module 60 may transmit at least one of signals from the various sensors 50 to 58 described above input to the electronic control section 49, information obtained based on the signals, and information based on an input from the outside (a user) obtained via the information service section 59, to the external apparatus via radio communication. The electronic control section 49, the various sensors 50 to 58, the information service section 59, and the like may be referred to as input sections that receive input. For example, the PUSCH transmitted by the communication module 60 may include information based on the input.

The communication module 60 receives various pieces of information (traffic information, signal information, inter-vehicle distance information, and the like) transmitted from the external apparatus, and displays the various pieces of information on the information service section 59 included in the vehicle. The information service section 59 may be referred to as an output section that outputs information (for example, outputs information to devices, such as a display and a speaker, based on the PDSCH received by the communication module 60 (or data/information decoded from the PDSCH)).

The communication module 60 stores the various pieces of information received from the external apparatus in the memory 62 that can be used by the microprocessor 61. Based on the pieces of information stored in the memory 62, the microprocessor 61 may perform control of the driving section 41, the steering section 42, the accelerator pedal 43, the brake pedal 44, the shift lever 45, the right and left front wheels 46, the right and left rear wheels 47, the axle 48, the various sensors 50 to 58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel, and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes of the base station. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation.

The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (M4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods, next-generation systems that are enhanced, modified, created, or defined based on these, and the like. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives:

first downlink control information (DCI) being associated with a first value of a control resource set (CORESET) pool index and indicating a first transmission configuration indication (TCI) state;

second DCI being associated with a second value of a CORESET pool index and indicating a second TCI state;

first radio resource control (RRC) signaling associating one of the first TCI state and the second TCI state to a first resource; and second RRC signaling associating one of the first TCI state and the second TCI state to a second resource; and a processor that applies, based on the first RRC signaling, one of the first TCI state and the second TCI state to the first resource, and applies, based on the second RRC signaling, one of the first TCI state and the second TCI state to the second resource.

2. A radio communication method for a terminal, comprising:

receiving:

first downlink control information (DCI) being associated with a first value of a control resource set (CORESET) pool index and indicating a first transmission configuration indication (TCI) state;

second DCI being associated with a second value of a CORESET pool index and indicating a second TCI state;

first radio resource control (RRC) signaling associating one of the first TCI state and the second TCI state to a first resource; and second RRC signaling associating one of the first TCI state and the second TCI state to a second resource; and applying, based on the first RRC signaling, one of the first TCI state and the second TCI state to the first resource, and applying, based on the second RRC signaling, one of the first TCI state and the second TCI state to the second resource.

3. A base station comprising:

a transmitter that transmits:

first downlink control information (DCI) being associated with a first value of a control resource set (CORESET) pool index and indicating a first transmission configuration indication (TCI) state;

second DCI being associated with a second value of a CORESET pool index and indicating a second TCI state;

first radio resource control (RRC) signaling associating one of the first TCI state and the second TCI state to a first resource; and second RRC signaling associating one of the first TCI state and the second TCI state to a second resource; and a processor that controls to transmit the first resource to which one of the first TCI state and the second TCI state is applied and the second resource to which one of the first TCI state and the second TCI state is applied.

4. A system comprising a terminal and a base station, wherein the terminal comprises:

a receiver that receives:

first downlink control information (DCI) being associated with a first value of a control resource set (CORESET) pool index and indicating a first transmission configuration indication (TCI) state;

second DCI being associated with a second value of a CORESET pool index and indicating a second TCI state;

first radio resource control (RRC) signaling associating one of the first TCI state and the second TCI state to a first resource; and second RRC signaling associating one of the first TCI state and the second TCI state to a second resource; and a processor that applies, based on the first RRC signaling, one of the first TCI state and the second TCI state to the first resource, and applies, based on the second RRC signaling, one of the first TCI state and the second TCI state to the second resource, and the base station comprises:

a transmitter that transmits the first DCI, the second DCI, the first RRC signaling, and the second RRC signaling.

* * * * *